(12) United States Patent
Sun et al.

(10) Patent No.: US 12,140,032 B2
(45) Date of Patent: Nov. 12, 2024

(54) METHODS AND SYSTEMS FOR ULTRASONIC ROCK BOLT CONDITION MONITORING

(71) Applicant: National Research Council of Canada, Ottawa (CA)

(72) Inventors: Zhigang Sun, Greenfield Park (CA); Kuo-Ting Wu, Brossard (CA); Silvio Elton Kruger, Brossard (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 18/108,444

(22) Filed: Feb. 10, 2023

(65) Prior Publication Data

US 2023/0184114 A1 Jun. 15, 2023

Related U.S. Application Data

(63) Continuation of application No. 16/326,136, filed as application No. PCT/CA2017/050972 on Aug. 16, 2017, now Pat. No. 11,619,132.

(Continued)

(51) Int. Cl.
*G01N 29/07* (2006.01)
*E21D 21/02* (2006.01)
(Continued)

(52) U.S. Cl.
CPC ............ *E21D 21/02* (2013.01); *G01L 5/0004* (2013.01); *G01M 5/0041* (2013.01); *G01N 3/00* (2013.01);
(Continued)

(58) Field of Classification Search
CPC .... E21D 21/02; G01L 5/0004; G01M 5/0041; G01N 2203/0055; G01N 2291/011;
(Continued)

(56) References Cited

U.S. PATENT DOCUMENTS 4,062,229 A 12/1977 Godfrey et al.
4,308,751 A 1/1982 Thurner et al.
(Continued)

FOREIGN PATENT DOCUMENTS

CN 1793898 A 6/2006
CN 102636307 A 8/2012
(Continued)

OTHER PUBLICATIONS

Beard, M. D. et al., "Development of a guided wave inspection technique for rock bolts," *Insight: Non-Destructive Testing and Condition Monitoring*, vol. 44, No. 1, Jan. 2002, pp. 19-24.
(Continued)

*Primary Examiner* — David L Singer
(74) *Attorney, Agent, or Firm* — Klarquist Sparkman, LLP

(57) ABSTRACT

Methods and systems for determining a change in condition of a rock bolt. Some methods may comprise, at a first point in time, propagating shear and longitudinal ultrasonic waves along the rock bolt to measure a first time of flight for each of the shear and longitudinal waves, at a second point in time after the first point in time, propagating shear and longitudinal ultrasonic waves along the rock bolt to measure a second time of flight for each of the shear and longitudinal waves, and using the relative changes of the first and second time of flights, determining the change in condition of the rock bolt section.

6 Claims, 38 Drawing Sheets

Related U.S. Application Data

(60) Provisional application No. 62/375,717, filed on Aug. 16, 2016.

(51) Int. Cl.
*G01L 5/00* (2006.01)
*G01M 5/00* (2006.01)
*G01N 3/00* (2006.01)
*G01N 3/02* (2006.01)
*G01N 29/32* (2006.01)

(52) U.S. Cl.
CPC ............. *G01N 3/02* (2013.01); *G01N 29/07* (2013.01); *G01N 29/326* (2013.01); *G01N 2203/0055* (2013.01); *G01N 2291/011* (2013.01); *G01N 2291/0232* (2013.01); *G01N 2291/0258* (2013.01); *G01N 2291/0421* (2013.01); *G01N 2291/0422* (2013.01)

(58) Field of Classification Search
CPC ... G01N 2291/0232; G01N 2291/0258; G01N 2291/0421; G01N 2291/0422; G01N 29/07; G01N 29/326; G01N 3/00; G01N 3/02
See application file for complete search history.

(56) References Cited

U.S. PATENT DOCUMENTS

| | | | |
|---|---|---|---|
| 4,601,207 A | | 7/1986 | Steblay |
| 4,602,511 A | * | 7/1986 | Holt ........................ G01N 29/07 73/581 |
| 5,631,424 A | | 5/1997 | Nieters et al. |
| 5,929,341 A | | 7/1999 | Bawden et al. |
| 6,116,094 A | | 9/2000 | Andersson |
| 7,614,303 B2 | | 11/2009 | McInerney et al. |
| 2004/0085550 A1 | | 5/2004 | Okuno et al. |
| 2006/0123917 A1 | * | 6/2006 | Kibblewhite ........... G01L 5/246 73/761 |
| 2006/0136152 A1 | | 6/2006 | Takahashi |
| 2013/0054156 A1 | | 2/2013 | Hyett |

FOREIGN PATENT DOCUMENTS

| | | | |
|---|---|---|---|
| CN | 202693170 U | | 1/2013 |
| CN | 203847139 U | | 9/2014 |
| DE | 2806785 A1 | | 8/1978 |
| EP | 0605811 A1 | | 7/1994 |
| EP | 2248951 A1 | | 11/2010 |
| GB | 2304417 A | | 3/1997 |
| JP | 2649837 B2 | * | 9/1997 |
| JP | 2000074764 A | * | 3/2000 |
| JP | 2006003323 A | | 1/2006 |
| JP | 2006003324 A | | 1/2006 |
| JP | 2006292482 A | | 10/2006 |
| JP | 2006292483 A | | 10/2006 |
| JP | 2007308990 A | | 11/2007 |
| JP | 2007308991 A | | 11/2007 |
| JP | 2011013177 A | | 1/2011 |
| KR | 20140049407 A | | 4/2014 |
| RU | 2240553 C1 | | 11/2004 |
| WO | WO 2015/018559 A1 | | 2/2015 |
| ZA | 980161 B | | 7/1998 |

OTHER PUBLICATIONS

Beard, M. D. et al., "Non-destructive testing of rock bolts using guided ultrasonic waves," *International Journal of Rock Mechanics & Mining Sciences*, vol. 40, Issue 4; Jun. 2003; pp. 527-536.

Beard, M. D. et al., "Ultrasonic Guided Waves for Inspection of Grouted Tendons and Bolts," *Journal of Materials in Civil Engineering*, vol. 15, Jun. 2003, pp. 212-218.

Carlson et al., "Measurement of the Clamping Force Applied by Load-Bearing Bolts Using a Combination of Compression and Shear Ultrasonic Waves," 2015 IEEE International Ultrasonics Symposium Proceedings, Oct. 21, 2015, 4 pages.

Chaki, S. et al., "Combination of Longitudinal and Transverse Ultrasonic Waves for In Situ Control of the Tightening of Bolts," *Journal of Pressure Vessel Technology*, vol. 129, Aug. 2007, pp. 383-390.

Charette, F. et al., "Monitoring of Dynamic Energy Resistant Rockbolts: Laboratory and Field Results," *World Mining Congress*, Montreal, 2013, 9 pages.

Ding, X. et al., "Bolt axial stress measurement based on a mode-converted ultrasound method using an electromagnetic acoustic transducer," *Ultrasonics*, vol. 54, Nov. 2013, pp. 914-920.

Fishman, K.L., "Barron Mountain Rock Reinforcement Evaluation—Phase I," U.S. Department of Transportation, Federal Highway Administration, Concord, New Hampshire, Feb. 2004, 54 pages.

Fishman, K.L., "Barron Mountain Rock Reinforcement Evaluation—Phase II," U.S. Department of Transportation, Federal Highway Administration, Concord, New Hampshire, Sep. 2005, 43 pages.

Greve, D. W. et al., "An inductively coupled lamb wave transducer," *IEEE Sensors Journal*, vol. 27, No. 2, Feb. 2007, pp. 295-301.

Hartmann, G., "Potentials and Limitations of Ultrasonic Clamp Load," *SAE International*, Apr. 2007, 8 pages.

Hirao, M. et al., "Contactless measurement of bolt axial stress using a shear-wave electromagnetic acoustic transducer," *NDT&E International*, vol. 34, 2001, pp. 179-183.

International Search Report and Written Opinion of the International Searching Authority, mailed Nov. 16, 2017, for corresponding International Application No. PCT/CA2017/050972, 12 pages.

Ivanović, A. et al., "Non-destructive testing of rockbolts for estimating total bolt length," *International Journal of Rock Mechanics and Mining Sciences*, vol. 64, Sep. 2013, pp. 36-43.

Jen, C.-K. et al., "Ultrasonic probes having three orthogonal polarizations," IEEE *Transactions on Ultrasonics, Ferroelectrics, and Frequency Control*, vol. 57, No. 1, Jan. 2010, pp. 189-192.

Johnson, et al., "An Ultrasonic Method for Determining Axial Stress in Bolts," *Journal of Testing and Evaluation*, JTEVA, vol. 14, No. 5, Sep. 1, 1986, pp. 253-259.

Pan et al., "A Method of Testing Residual Stress by Ultrasonic Shear and Longitudinal Waves," Proceedings of 2016 IEEE International Conference on Mechatronics and Automation, Harbin, China, Aug. 7-10, 2016, pp. 1295-1299.

Stepinski, T. et al., "Instrument for Rock Bolt Inspection by Means of Ultrasound," 2015 IEEE International Ultrasonics Symposium (IUS); Oct. 21-24, 2015; pp. 1-4.

Stresstel, "Guide to Ultrasonic Inspection of Fasteners," Available online at: http://fliphtml5.com/hpah/jovv 2003, 46 pages.

Tadolini, S.C., "Evaluation of Ultrasonic Measurement Systems for Bolt Load Determinations," Bureau of Mines, United States Department of the Interior, Denver, Colorado, 1990, 15 pages.

Wu, B. et al., "Application of High Frequency Ultrasonic Guided Waves to Inspection of Full-Length-Bonding Bolt," *Chinese Journal of Rock Mechanics and Engineering*, vol. 26, No. 2, Feb. 2007, pp. 397-403 (English abstract provided).

Yu, J.-D. et al., "Nongrouted Ratio Evaluation of Rock Bolts by Reflection of Guided Ultrasonic Waves," *Journal of Geotechnical and Geoenvironmental Engineering*, vol. 139, Feb. 2013, pp. 298-307.

Zheng, P. et al., "Crack detection with wireless inductively-coupled transducers," Proceedings of SPIE, Sensors and Smart Structures Technologies for Civil, Mechanical and Aerospace Systems, Apr. 8, 2008, 11 pages.

Zou, D.S. et al., "Grout quality and its impact on guided ultrasonic waves in grouted rock bolts," *Journal of Applied Geophysics*, vol. 72, 2010, pp. 102-106.

"Communication—extended European search report" from the European Patent Office for European Application No. EP17840671.6-1020, dated Mar. 13, 2020, 9 pages.

First Notification of Office Action from National Intellectual Property Administration, People's Republic of China (including English Translation), for Chinese Patent Application No. 201780063958.7, dated Jan. 5, 2022, 11 pages.

(56) References Cited

OTHER PUBLICATIONS

Office Action from Brazil National Institute of Industrial Property, for Brazilian Patent Application No. BR122022020567-04, Feb. 15, 2023, 10 pages (including English translation).

* cited by examiner

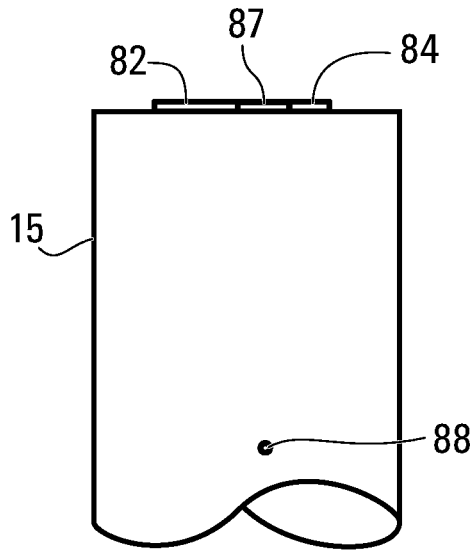
FIG. 21E
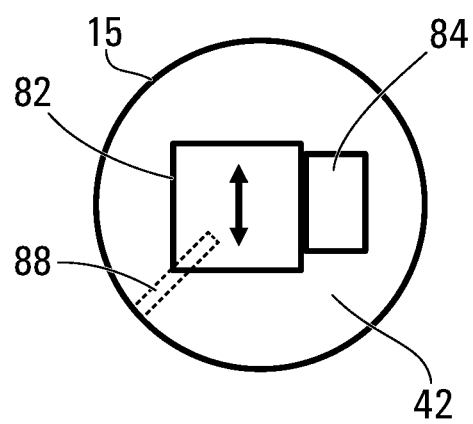
FIG. 21F
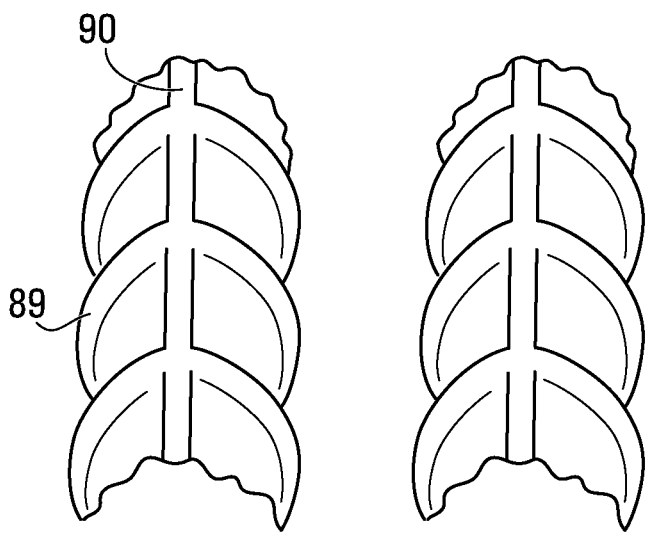
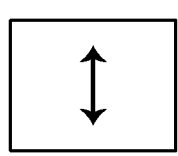 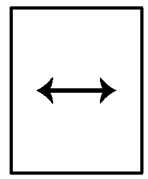
FIG. 22

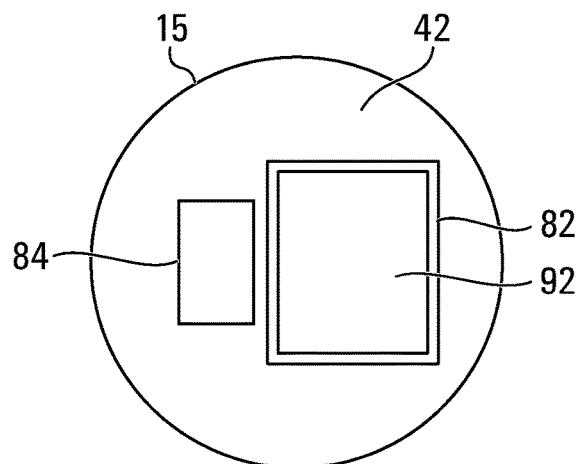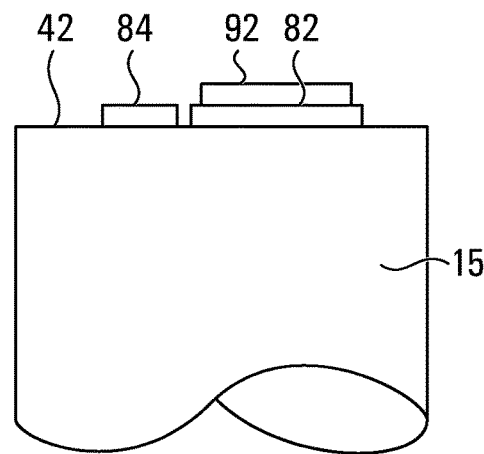
FIG. 23A  FIG. 23B
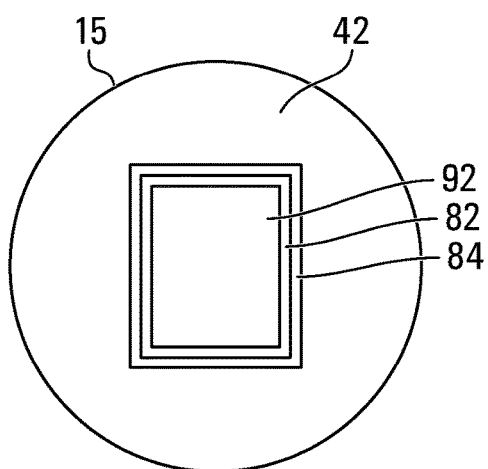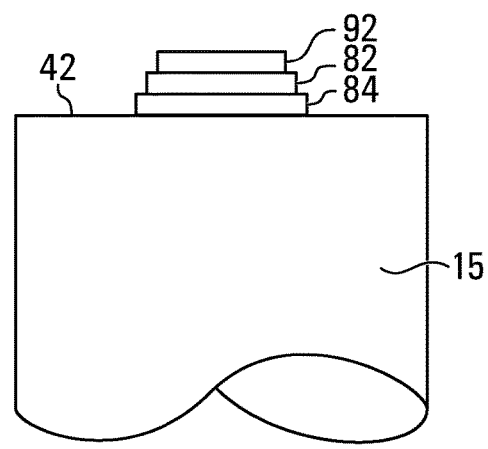
FIG. 24A  FIG. 24B

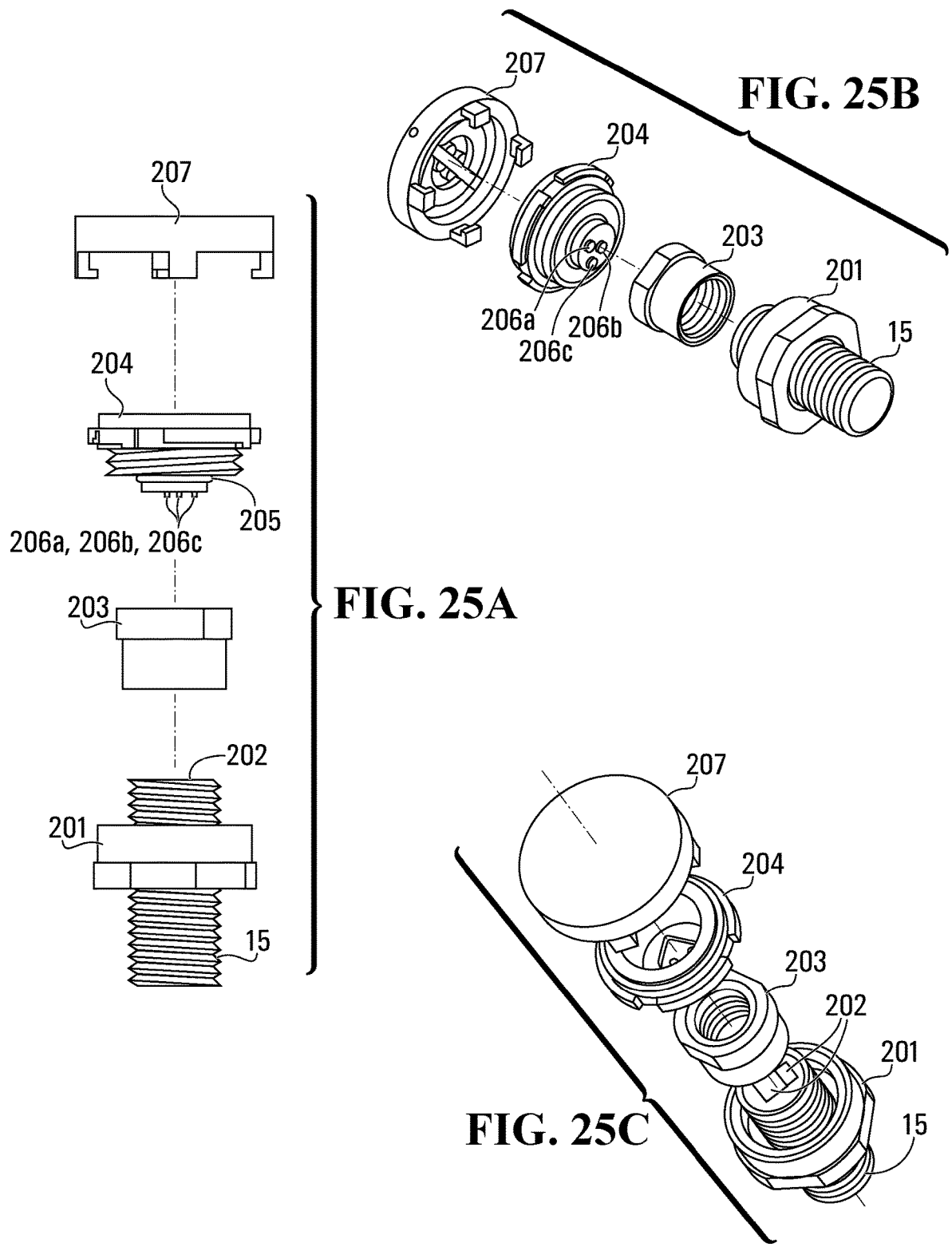

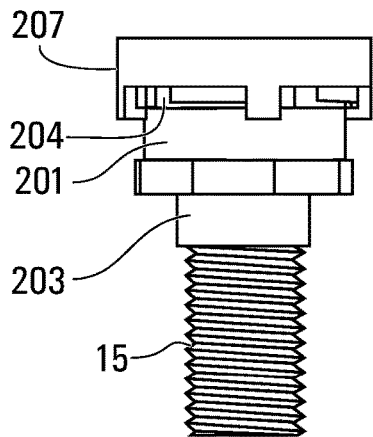
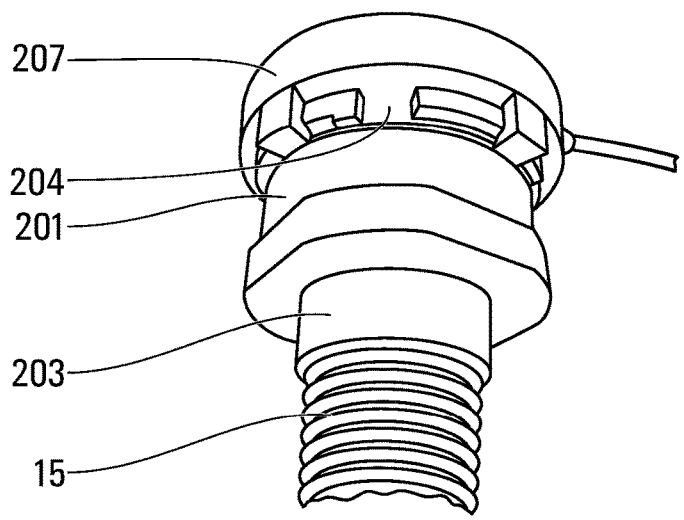
FIG. 25H  FIG. 25I
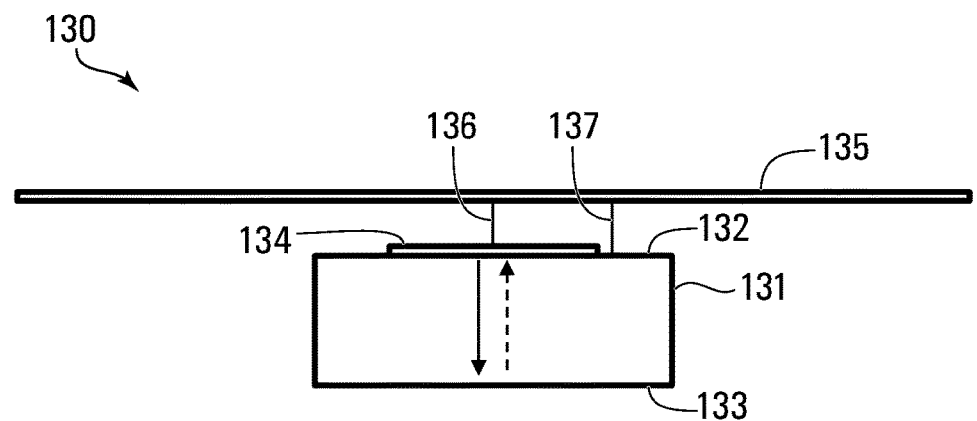
FIG. 26A

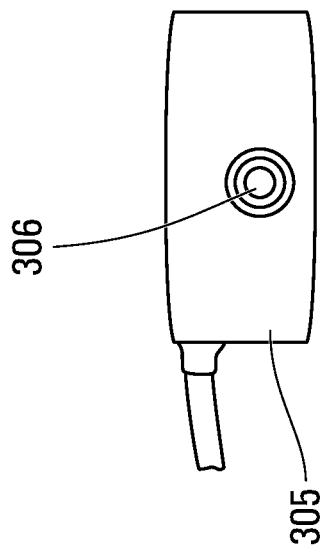
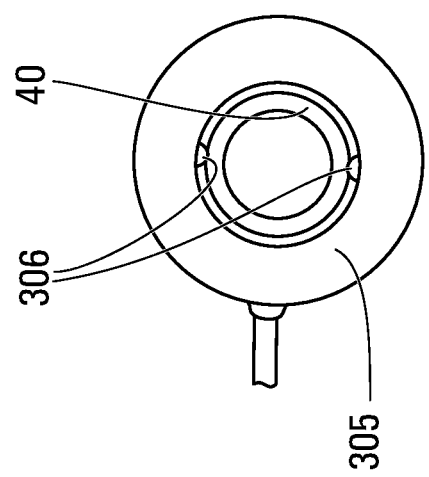
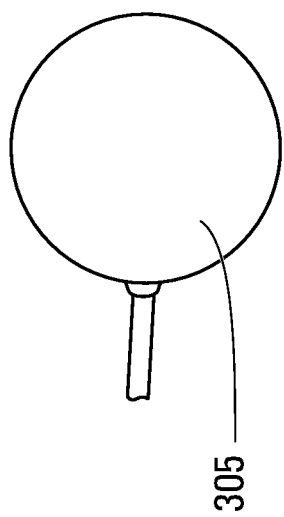
FIG. 28E

METHODS AND SYSTEMS FOR ULTRASONIC ROCK BOLT CONDITION MONITORING

CROSS REFERENCE TO RELATED APPLICATIONS

This is a Continuation of U.S. patent application Ser. No. 16/326,136, filed Feb. 15, 2019, which is the U.S. National Stage of International Application No. PCT/CA2017/050972, filed Aug. 16, 2017, which in turn claims the benefit of U.S. Provisional Patent Application No. 62/375,717, filed Aug. 16, 2016, all of which prior applications are incorporated by reference herein in their entireties.

FIELD OF THE INVENTION

This disclosure relates generally to rock bolt condition monitoring and, in particular, to ultrasonic rock bolt condition monitoring and its application in ground control.

BACKGROUND

Rock bolts are anchor bolts for stabilizing tunnels, such as mining tunnels, and other rock excavations. They transfer load from the generally more unstable exposed rock surface in the excavation to the generally stronger, confined interior of the rock mass. It may be desirable to monitor and maintain the condition of rock bolts during their life span. It may also be desirable to monitor loads being exerted on a network of rock bolts in order to provide information about ground activities, for example, seismic events caused by blasting.

One set of techniques for rock bolt condition monitoring are known as non-destructive techniques because they permit a rock bolt to be monitored without causing damage to the rock bolt. Such techniques may permit in situ condition monitoring of a rock bolt.

SUMMARY

In some embodiments, there is provided a method for determining a change in condition of a rock bolt. The method comprises, at a first point in time, propagating shear and longitudinal ultrasonic waves along the rock bolt to measure a first time of flight for each of the shear and longitudinal waves; at a second point in time after the first point in time, propagating shear and longitudinal ultrasonic waves along the rock bolt to measure a second time of flight for each of the shear and longitudinal waves; determining a temperature correction value; using the first and second time of flights and the temperature correction value to calculate a temperature-corrected relative change between the first and second time of flights for each of the shear and longitudinal ultrasonic waves at the first and second points in time; and using the temperature-corrected relative changes of the first and second time of flights, determining the change in condition of the rock bolt.

In some embodiments there is provided a method for determining whether a rock bolt has yielded. The method comprises, at a first point in time, when the rock bolt is an elastic deformation regime, propagating shear and longitudinal ultrasonic waves along the rock bolt to measure a first time of flight for each of the shear and longitudinal ultrasonic waves; at a second point in time after the first point in time, propagating shear and longitudinal ultrasonic waves along the rock bolt to measure a second time of flight for each of the shear and longitudinal ultrasonic waves; using the first and second time of flights for each of the shear and longitudinal waves to calculate an estimated temperature variation of the rock bolt between the first and second points in time; comparing the estimated temperature variation with an expected temperature variation of the rock bolt between the first and second points in time; and based on the comparing, determining whether the rock bolt has yielded.

In some embodiments, there is provided a method for determining a change in condition of a yielding-type rock bolt. The method comprises, at a reference point in time when the rock bolt is an elastic deformation regime, propagating shear and longitudinal ultrasonic waves along the rock bolt to measure a reference time of flight for each of the shear and longitudinal waves; at further points in time after the reference point in time, propagating shear and longitudinal ultrasonic waves along the rock bolt to measure a further time of flight for each of the shear and longitudinal waves at each further point in time; based on the reference and further time of flights, determining the change in condition of the rock bolt.

In some embodiments, there is provided a method for determining a change in axial stress in a rock bolt. The method comprises, at a first point in time, when the rock bolt is an elastic deformation regime, propagating shear and longitudinal ultrasonic waves along the rock bolt to measure a first time of flight for each of the shear and longitudinal waves; at a second point in time after the first point in time, when the rock bolt is an elastic deformation regime, propagating shear and longitudinal ultrasonic waves along the rock bolt to measure a second time of flight for each of the shear and longitudinal waves; and based on the first and second time of flights, determining the change in axial stress in the rock bolt between the first and second points in time.

In some embodiments, there is provided a method for determining a change in axial stress in a rock bolt. The method comprises at a first point in time, when the rock bolt is an elastic deformation regime, propagating shear or longitudinal ultrasonic waves along the rock bolt to measure a first time of flight of the waves; at a second point in time after the first point in time, when the rock bolt is an elastic deformation regime, propagating the same type of waves as at the first point in time along the rock bolt to measure a second time of flight of the waves; determining a temperature correction value; using the first and second time of flights and the temperature correction term to calculate a temperature-corrected relative change between the first and second time of flights at the first and second points in time; and determining the change in axial stress in the rock bolt between the first and second points in time.

In some embodiments, there is provided a system for use in rock bolt condition monitoring. The system comprises a first component for fixing to a rock bolt; a first ultrasound transducer configured to emit shear ultrasonic waves at a first frequency; and a second ultrasound transducer configured to emit longitudinal ultrasonic waves at a second frequency, wherein, in use, the first and second ultrasound transducers are arranged in a side-by-side configuration between the first component and the rock bolt, and wherein the first component includes one or more excitation means operably connected to the first and second transducers for exciting the first and second ultrasound transducers.

In some embodiments, there is provided a system for use in rock bolt condition monitoring. The system comprises a first component for fixing to a rock bolt, wherein the first component includes a transducer induction coil; one or more ultrasound transducers, wherein, in use, the one or more ultrasound transducers are arranged between the first component and the rock bolt and are operably connected to the transducer induction coil; and a second component for bringing into proximity with the first component, the second component including an induction coil.

In some embodiments, there is provided a method for determining grouting quality of a grouted rock bolt. The method comprises at a first point in time propagating shear or longitudinal ultrasonic waves along the rock bolt to measure a respective first time of flight of the waves for each of two or more sections of the rock bolt; at a second point in time after the first point in time, propagating the same type of waves as at the first point in time along the rock bolt to measure a respective second time of flight of the waves for each of the two or more sections; comparing the respective first and second times of flights for each of the two or more sections of the rock bolt; and based on the comparing, determining the grouting quality.

In some embodiments, there is provided a method for determining a change in condition of a section of a rock bolt between two anchor points of the rock bolt, load being freely transferrable between the anchor points. The method comprises at a first point in time, propagating shear or longitudinal ultrasonic waves along the rock bolt to measure a first time of flight for the section; at a second point in time after the first point in time, propagating the same type of waves as at the first point in time along the rock bolt to measure a second time of flight for the section; determining a temperature correction value; using the first and second time of flights and the temperature correction value to calculate a temperature-corrected relative change between the first and second time of flights at the first and second points in time; and using the temperature-corrected relative changes of the first and second time of flights, determining the change in condition of the rock bolt.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings, in which:

FIGS. 21A to 21F are schematics of transducer configurations of a system according to another embodiment of the present disclosure;

FIG. 22 is a schematic of a transducer polarization according to another embodiment of the present disclosure;

FIGS. 23A and 23B are top and side schematic views of a transducer configuration of a system according to another embodiment of the present disclosure;

FIGS. 24A and 24B are top and side schematic views of a transducer configuration of a system according to another embodiment of the present disclosure;

FIGS. 25A to 25C are exploded views of a system according to another embodiment of the present disclosure;

FIGS. 25H and 25I are views of the system of FIGS. 25A to 25C in the assembled state;

FIG. 26A is a schematic view of a temperature measurement assembly that may form part of a system according to embodiments of the present disclosure;

FIG. 28E is a view of an assembled cap of the system of FIGS. 28A to 28C;

DETAILED DESCRIPTION

Figure 1:
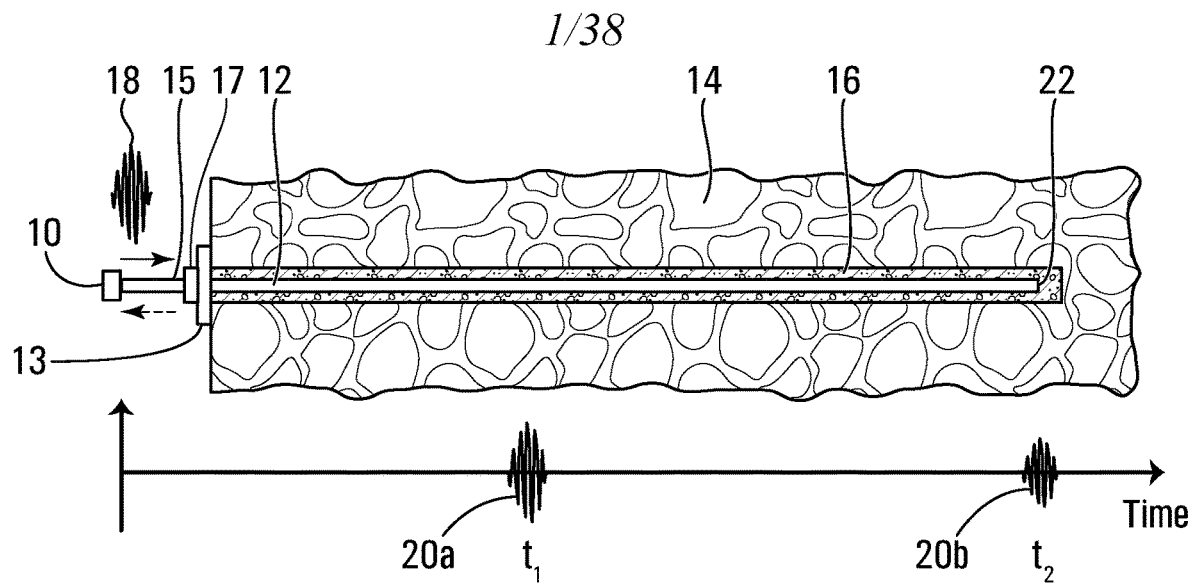
FIG. 1 is a schematic of a rock bolt installed in rock.

Some embodiments of the present disclosure relate to methods for determining a change in condition of a rock bolt.

In some embodiments, a method for determining a change in condition of a rock bolt may include, at first and second points in time, propagating shear and longitudinal ultrasonic waves along the rock bolt in order to measure time of flights of the ultrasonic waves at first and second points in time, determining a temperature correction value and then, using the time of flights and the temperature correction value to calculate temperature-corrected relative changes in the time of flights. The temperature-corrected relative changes in the time of flights may then be used to determine the change in condition of the rock bolt.

In some embodiments, a method for determining whether a rock bolt has yielded may include, at first and second points in time, propagating shear and longitudinal ultrasonic waves along the rock bolt in order to measure time of flights of the ultrasonic waves, using the time of flights to calculate an estimated temperature variation of the rock bolt between the first and second points in time and comparing the estimated temperature variation with an expected temperature variation of the rock bolt. The comparison may then be used to determine whether the rock bolt has yielded.

In some embodiments, a method for determining a change in condition of a yielding-type rock bolt may include, at a reference point in time, propagating shear and longitudinal ultrasonic waves along the rock bolt to measure a reference time of flight and, at further points in time after the reference point in time, propagating shear and longitudinal ultrasonic waves along the rock bolt to measure further time of flights. The change in condition of the yielding-type rock bolt may then be determined from the measured time of flights.

In some embodiments, a method for determining a change in axial stress in a rock bolt may include, at first and second points in time, propagating shear and longitudinal ultrasonic waves along the rock bolt to measure time of flights for each of the shear and longitudinal waves. The change in axial stress of a rock bolt may then be determined from the time of flights.

In some embodiments, a method for determining a change in axial stress in a rock bolt, may include, at first and second points in time, propagating shear or longitudinal ultrasonic waves along the rock bolt to measure time of flights of the waves, determining a temperature correction value and using the time of flights and the temperature correction term to calculate a temperature-corrected relative change between the time of flights. The change in axial stress may then be determined.

Some embodiments of the present disclosure relate to a system for use in rock bolt condition monitoring.

In some embodiments, a system for use in rock bolt condition monitoring may include a first component for fixing to a rock bolt and first and second ultrasound transducers configured to emit shear and longitudinal ultrasonic waves at first and second frequencies, respectively. In use, the first and second ultrasound transducers are arranged in a side-by-side configuration between the first component and the rock bolt. Furthermore, the first component includes one or more excitation means operably connected to the first and second transducers for exciting the first and second ultrasound transducers.

In some embodiments, a system for use in rock bolt condition monitoring may include a first component for fixing to a rock bolt, one or more ultrasound transducers, and a second component for bringing into proximity with the first component. The first component includes a transducer induction coil and the second component includes an induction coil. In use, the one or more ultrasound transducers are arranged between the first component and the rock bolt and are operably connected to the transducer induction coil.

Having regard to FIG. 1, some principles of ultrasonic rock bolt condition monitoring will now be discussed. As shown in FIG. 1, an ultrasound transducer (UT) 10 may be mounted onto a rock bolt 12, which has been installed in rock 14 using grout or resin 16. The rock bolt 12 is anchored to the rock 14 by an anchor plate 13, which is in turn held in place by an anchor nut 17. A head 15 of the rock bolt is defined as the portion of the rock bolt 12 extending out from the rock 14 past the nut 17. The UT 10 transmits and propagates an ultrasonic wave 18 into the rock bolt 12 and listens to echoes 20a and 20b reflected from discontinuities inside. Echoes 20a and 20b are reflected and return to the UT 10 at different times $t_1$ and $t_2$. The solid and stippled arrows show the directions in which the wave 18 and its echoes 20a and 20b propagate, respectively.

The ultrasonic wave 18 could be a longitudinal ultrasonic wave or a shear ultrasonic wave (also known as a transverse wave). In longitudinal ultrasonic waves, the particles of the medium through which the waves propagate are displaced in parallel to the propagation direction of the waves. In shear ultrasonic waves, the particles of the medium through which the waves propagate are displaced perpendicular to the propagation direction of the waves. It is noted that, throughout this disclosure, if it is not specified which wave form is being referred to, it is to be understood that both shear and longitudinal ultrasonic wave types are being referred to.

The time of flight (TOF) is herein defined as the time it takes for an ultrasonic wave, such as the wave 18, to travel the round trip between the UT 10 and a reflective surface, for example the toe end 22 of the rock bolt 12. In FIGS. 1, $t_1$ and $t_2$ represent the TOFs of echoes from a rupture (not shown) in the rock bolt 12 and the toe end 22 of the rock bolt, respectively.

For example, if the rock bolt 12 were ruptured in the middle, the rupture could reflect the incident ultrasonic wave 18 to form an echo captured by UT. The appearance of this echo would indicate a rock bolt rupture.

The TOF is affected by the length of and the load being experienced by the rock bolt 12, as well as temperature. As an example, for a 19-mm diameter steel bolt made of AISI 1020, a temperature change of 1.7° C. would cause the same change in TOF of longitudinal ultrasonic waves as would a load change of 5 kN. For shear ultrasonic waves, a temperature change of 0.9° C. would cause the same effect on TOF as a 5 kN load variation.

Figure 2:
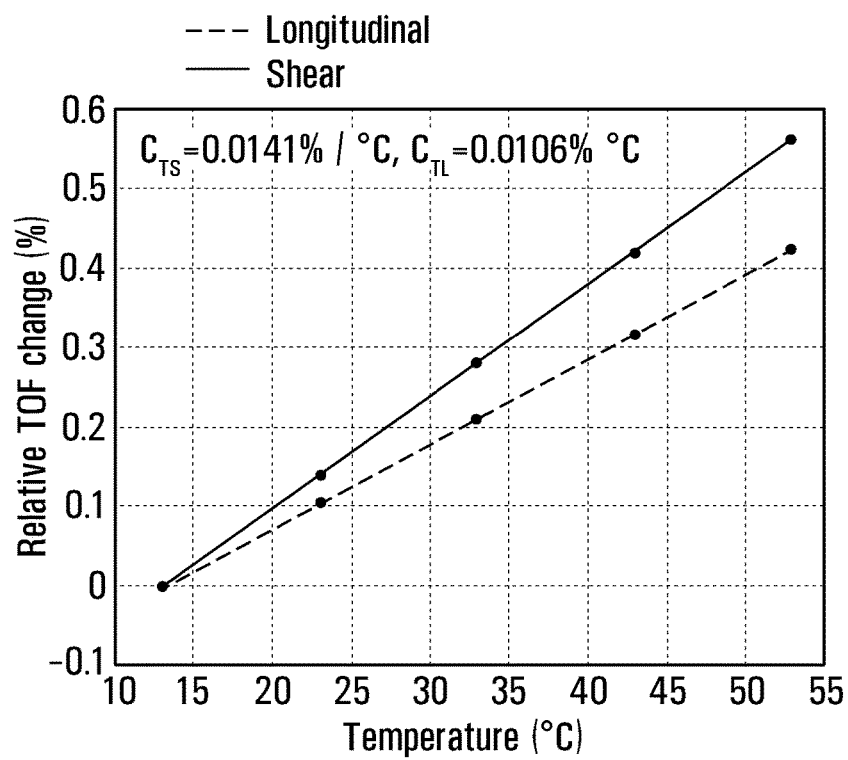
FIG. 2 is a plot showing the relative change in the time of flight of ultrasonic waves as a function of temperature of a rock bolt.

As an example of the linear relationship between TOF and temperature, a lab test result on an AISI 1020 steel rod was conducted. FIG. 2 shows the linear relationship between relative change in TOF vs. temperature for both longitudinal and shear ultrasonic waves. In this case, relative change in TOF refers to the percentage change in TOF as compared to an initial reference measurement.

From the plot in FIG. 2, temperature coefficients describing the relationship between TOF and temperature for the AISI 1020 steel rod may be determined. For example, based on the results shown in FIG. 2, the temperature coefficient for shear ultrasonic waves was determined to be $C_{TS}=0.0141\%/°$ C. and the temperature coefficient for longitudinal ultrasonic waves was determined to be $C_{TL}=0.0106\%/°$ C.

Temperature coefficients may be determined in lab calibration tests as desired for various types of materials, rods, rock bolts, etc. Thus, calibration tests may be conducted to determine temperature coefficients for a variety of commercially available and used rock bolts.

Figure 3A:
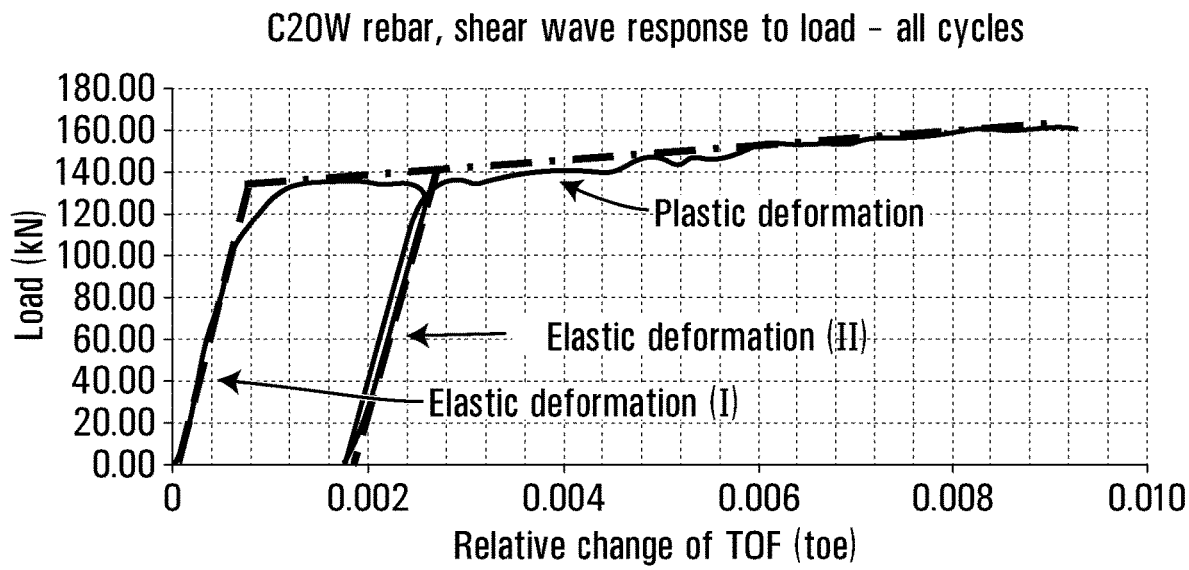
FIGS. 3A and 3B are graphs showing the effect of load experienced by a rock bolt on the relative change of the time of flights of shear and longitudinal ultrasonic waves, respectively.
Figure 3B:
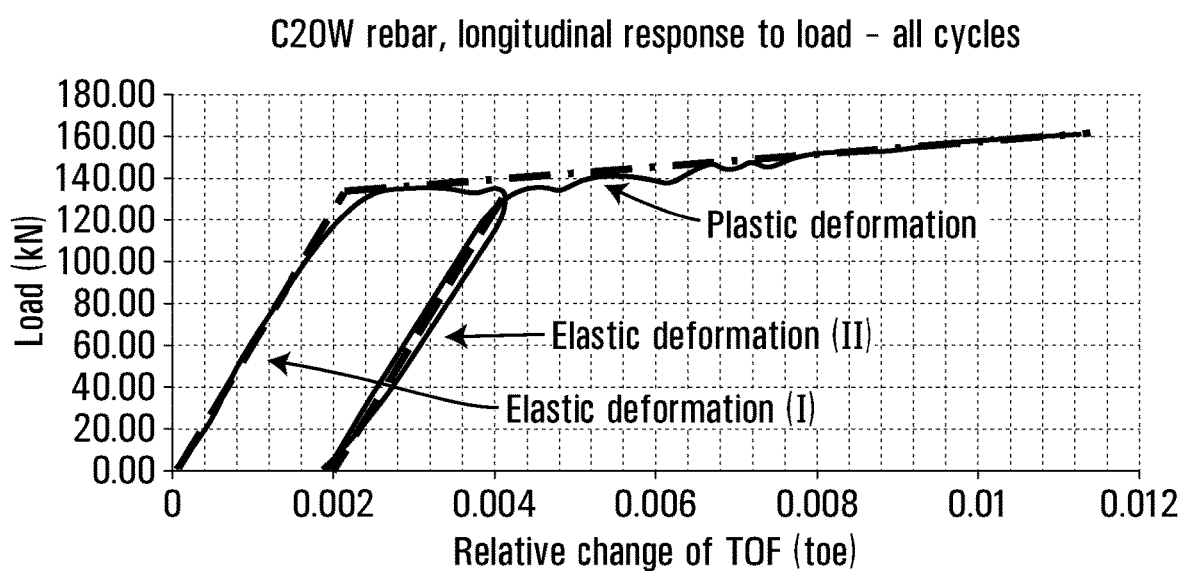

Referring to FIGS. 3A and 3B, another lab test result on a C20W type rebar has shown that the relationship between relative change in TOF vs. axial load (stress) exerted on a rock bolt presents line segments of two very distinct slopes. The steeper slope indicates an elastic deformation regime and the less steep slope indicates a plastic deformation regime, as labelled in FIGS. 3A and 3B. The dot-dash-dot lines are straight lines fitted to the data. It is noted that FIG. 3A presents the results of the test using shear ultrasonic waves and FIG. 3B presents the results of the test using longitudinal ultrasonic waves.

According to the present disclosure, a linear model can be developed to relate the TOFs of both longitudinal and shear ultrasonic waves to stress in an elastic deformation regime and temperature. This linear model will be described with reference to FIG. 4.

Figure 4:
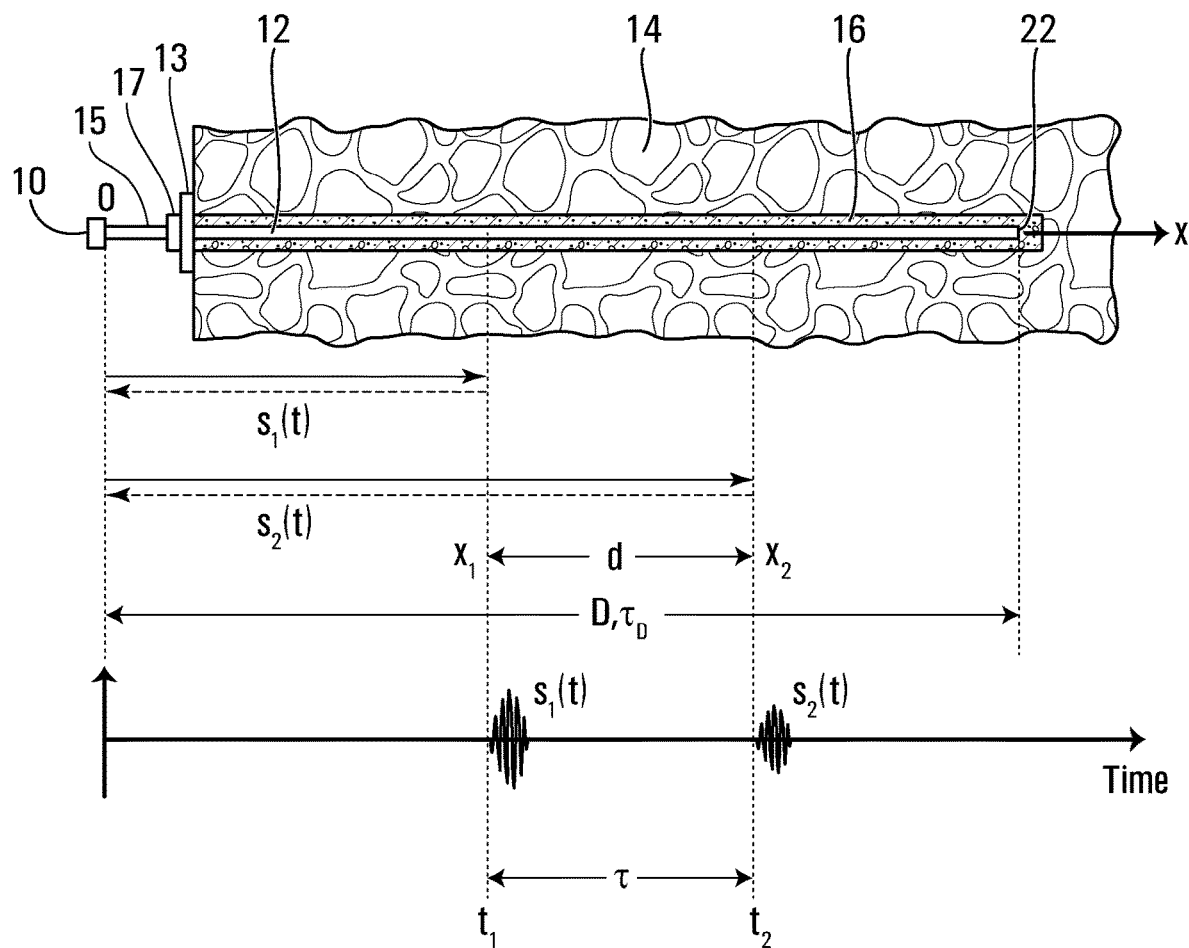
FIG. 4 is a further schematic of a rock bolt installed in rock illustrating various quantities related to embodiments of the present disclosure.

FIG. 4 shows the same rock bolt 12 from FIG. 1. In addition, there exist two reflector points (not shown) inside the rock bolt 12 at locations $x_1$ and $x_2$. $s_1(t)$ and $s_2(t)$ are echo signals from the $1^{st}$ and $2^{nd}$ reflectors, respectively. $t_1$ and $t_2$ are the corresponding arrival times of these echo signals. d is the distance between $x_1$ and $x_2$ and $\tau$ is the time duration between $t_1$ and $t_2$, respectively. $\tau_D$ is the round trip TOF to travel the entire rock bolt length D.

For each elastic deformation segment displayed in FIGS. 3A and 3B, the relationship between any changes in stress and temperature and resulting change in the relative TOF with respect to a reference state may be governed approximately by the following equations:

$$\frac{\tau_L^e - \tau_{L0}^e}{\tau_{L0}^e} = C_{\sigma L}^e * [\langle \sigma^e \rangle - \langle \sigma_0^e \rangle] + C_{TL} * [\langle T^e \rangle - \langle T_0^e \rangle] \quad (1)$$

$$\frac{\tau_S^e - \tau_{S0}^e}{\tau_{S0}^e} = C_{\sigma S}^e * [\langle \sigma^e \rangle - \langle \sigma_0^e \rangle] + C_{TS} * [\langle T^e \rangle - \langle T_0^e \rangle] \quad (2)$$

In the above equations, superscript e denotes the elastic deformation regime; subscripts L and S denote values or coefficients associated with longitudinal and shear ultrasonic waves, respectively; subscript 0 denotes a value taken in the reference state, i.e. at a first point in time; z-denotes TOF and was defined above; $C_{\sigma L}^e$ and $C_{\sigma S}^e$ are stress coefficients for longitudinal and shear waves respectively in the elastic deformation regime; $C_{TL}$ and $C_{TS}$ are temperature coefficients for longitudinal and shear waves, respectively.

It is noted that the stress coefficients may be determined in laboratory calibration tests in a similar manner to the temperature coefficients described above. Thus, calibration tests may be conducted to determine stress coefficients for a variety of rock bolts, for example, commercially available and used rock bolts. $\langle \sigma \rangle$ and $\langle T \rangle$ with associated superscript and subscript denote spatial averages of axial stress and temperature, respectively, of the rock bolt 12 over the section between the two reflectors in a specified deformation regime and are defined as follows:

$$\langle \sigma \rangle = \frac{1}{d} \int_{x_1}^{x_2} \sigma(x) dx \quad (3)$$

$$\langle T \rangle = \frac{1}{d} \int_{x_1}^{x_2} T(x) dx \quad (4)$$

It is noted that when reference is made to a rock bolt section between $x_1$ and $x_2$, it is understood that the discussion is applicable to any other section between two reference reflectors. In some embodiments, the distance between $x_1$ and $x_2$ may be the entire length of the rock bolt 12, i.e. D.

In other words, by using a plurality of reflectors, distributional information about rock bolt condition along the entire rock bolt can be obtained.

Thus, by solving Eqs. (1) and (2) for $\langle \sigma^e \rangle - \langle \sigma_0^e \rangle$ it may be possible to obtain average axial stress change with respect to the reference state as:

$$\langle \sigma^e \rangle - \langle \sigma_0^e \rangle = \frac{\beta_T \frac{\tau_S^e - \tau_{S0}^e}{\tau_{S0}^e} - \frac{\tau_L^e - \tau_{L0}^e}{\tau_{L0}^e}}{\beta_T C_{\sigma S}^e - C_{\sigma L}^e} \quad (5)$$

in which $$\beta_T = \frac{C_{TL}}{C_{TS}} \quad (6)$$

It is noted that, in Eq. (5), $\beta_T$, $C_{\sigma S}{}^e$ and $C_{\sigma L}{}^e$ are coefficients whose values may be determined in lab calibration tests, as discussed above, whereas $\tau_{S0}{}^e$ and $\tau_{L0}{}^e$ may be measured in the reference state at a first point in time, either before or after the rock bolt has been installed, and $\tau_S{}^e$ and $\tau_L{}^e$ may be measured at a second point in time when, for example, it is desirable to determine a change in condition of the rock bolt.

Based on Eqs. (1) and (2), it is also possible to define a temperature-corrected relative change of TOF, as follows:

$$\Delta_{Tc}^{rel}\tau_L = \frac{\tau_L - \tau_{L0}}{\tau_{L0}} - C_{TL} * [\langle T \rangle - \langle T_0 \rangle] \quad (7)$$

$$\Delta_{Tc}^{rel}\tau_S = \frac{\tau_S - \tau_{S0}}{\tau_{S0}} - C_{TS} * [\langle T \rangle - \langle T_0 \rangle] \quad (8)$$

In Eqs. (7) and (8), $\tau_{L0}$ and $\tau_{S0}$ may be taken in the reference state at a first point in time, regardless of the deformation regime the rock bolt is in, $\tau_L$ and $\tau_S$ may be measured at a second point in time when a user wishes to monitor the rock bolt or when a change in condition of the rock bolt is to be determined, It is noted that $\langle T \rangle - \langle T_0 \rangle$ is the difference of average temperatures over the rock bolt section of interest between the second point in time and the reference, or first, point in time, respectively. Subscript Tc and superscript rel are used in $\Delta_{Tc}^{rel}$ to denote temperature-corrected and relative change.

It may be possible to determine a relationship between the temperature-corrected relative change between the TOFs for each of the shear and longitudinal ultrasonic waves at each measurement time point, as will be described in relation to FIGS. 5 and 6.

Figure 5:
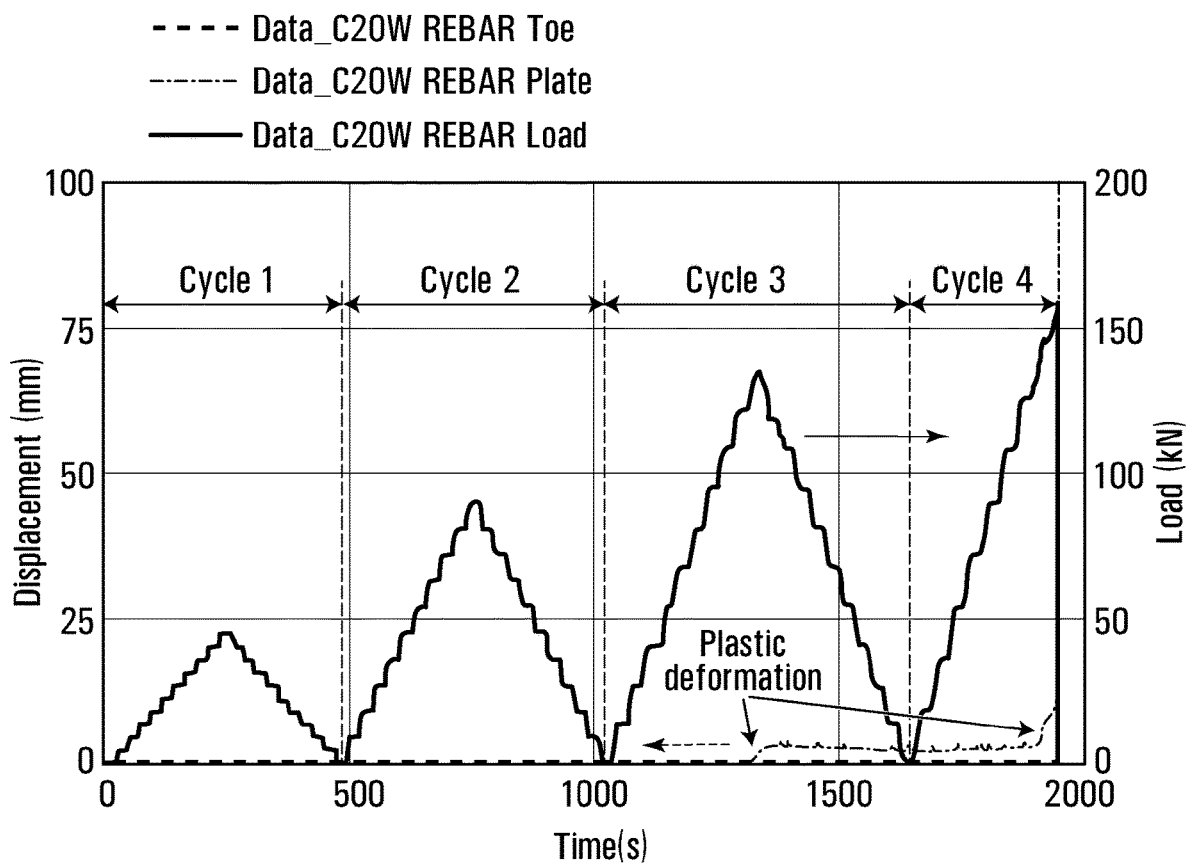
FIG. 5 showing results of a pull test on a C20W rebar bolt.

FIG. 5 shows load variation on a fully grouted C20W rebar rock bolt and associated displacement of the face plate (which is equivalent to rock bolt elongation in this particular test) during four load and unload cycles of a pull test. The displacement data show that the rock bolt entered plastic deformation regime twice, once in cycle 3 and another time in cycle 4.

Figure 6:
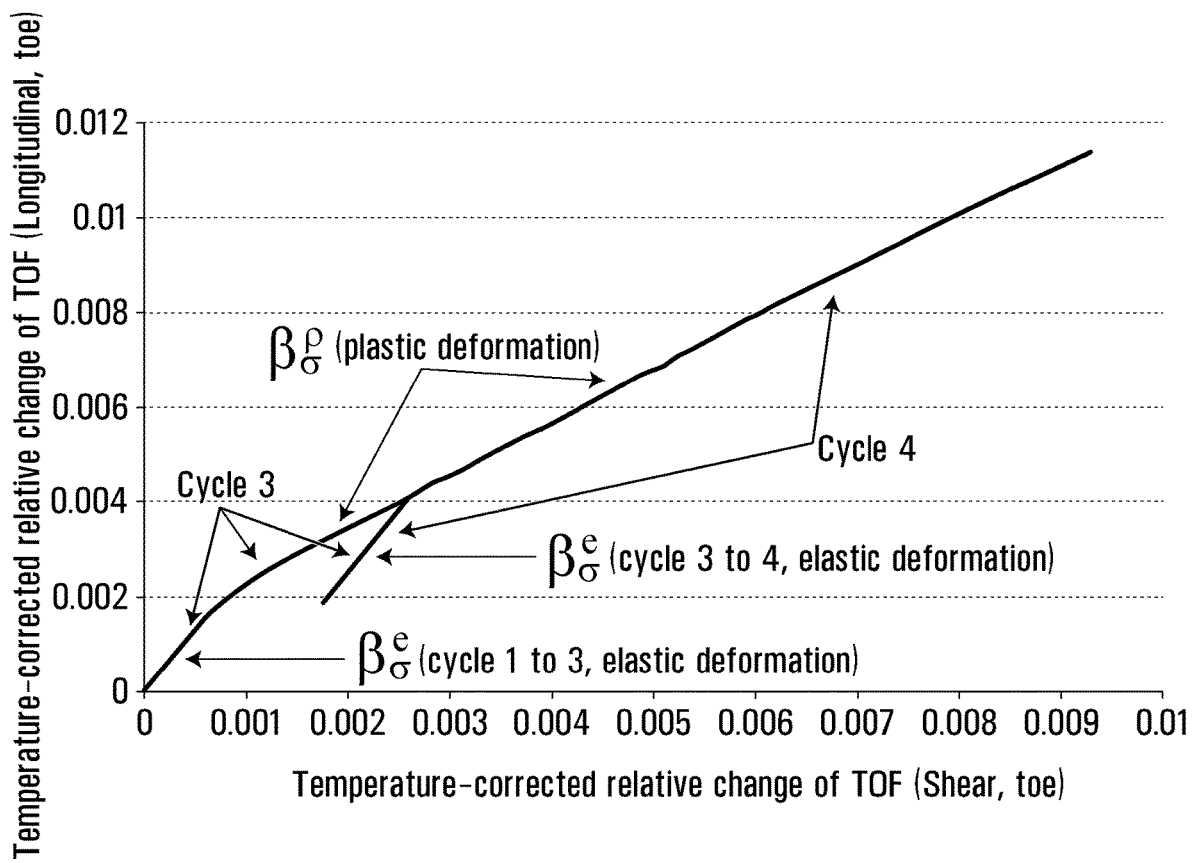
FIG. 6 is a plot of the relationship between the temperature-corrected relative changes of the time of flights of longitudinal and shear ultrasonic waves during the pull test of FIG. 5.

FIG. 6 displays a plot of temperature-corrected relative change of TOF of longitudinal ultrasonic wave echo from the rock bolt toe vs that of shear ultrasonic wave echo from the toe for a load variation test on a fully grouted C20W rebar rock bolt.

In FIG. 6, the change in condition of the rock bolt, from deformation in the elastic regime to deformation in the plastic regime, are clearly distinguishable with each regime manifesting in a distinct slope, i.e., $\beta_\sigma{}^e$ for the elastic deformation regime and $\beta_\tau{}^p$ for the plastic deformation regime.

Thus, based on the relationship between the temperature-corrected relative change in the TOFs of the longitudinal and shear ultrasonic waves at both the first and second points in time, it may be possible to determine whether the rock bolt is in the elastic or plastic deformation regime.

Figure 7:
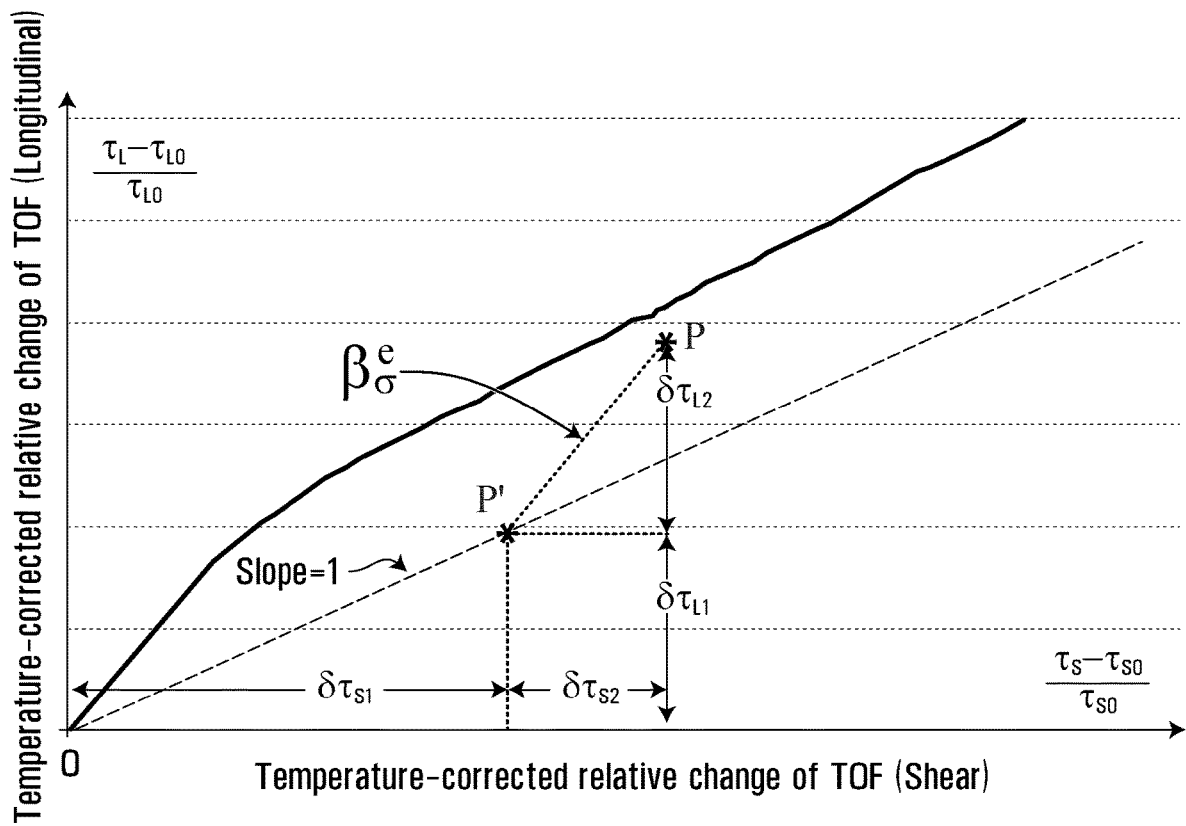
FIG. 7 is a schematic plot of the relationship between the temperature-corrected relative changes of the time of flights of longitudinal and shear ultrasonic waves.

It may also be possible to determine the permanent elongation that the rock bolt has experienced. Referring to FIG. 7, let P be the current state point of a rock bolt and O an earlier state point of the rock bolt chosen as reference. Let $\tau_L(\bullet)$ and $\tau_S(\bullet)$ be the temperature-corrected TOFs of longitudinal and shear ultrasonic waves at a state point, respectively. Let $\langle \sigma(\bullet) \rangle$ be the spatial average of stress experienced by the rock bolt at a state point. Let $\iota(P)$ and $\iota(O)$ be would-be stress-free lengths of the rock bolt if the rock bolt were allowed to relax to stress-free conditions from state points P and O, respectively.

If the stress being experienced by the rock bolt at state P were to be released, the rock bolt would transit from the state point P to a state point P' along an elastic deformation path, which is a straight line connecting the two points. Thus, as labelled in FIG. 7, one may define $\beta_\sigma{}^e$ to be the slope of this line in the coordinate system of relative change of TOF of longitudinal ultrasonic waves vs. that of shear ultrasonic waves in which the state point O was taken as reference. Let P' be a state point at which the rock bolt has the same spatial average stress as the state point O, i.e., $$\langle \sigma(P') \rangle = \langle \sigma(O) \rangle \quad (9)$$

Furthermore, let $\delta\tau_{S1}$ and $\delta\tau_{L1}$ be the relative changes of TOFs of longitudinal and shear ultrasonic waves at the state point P' with respect to the state point O. Since state points O and P' have the same spatial average stress, $\delta\tau_{S1}$ and $\delta\tau_{L1}$ are solely attributable to a plastic deformation between the two states, therefore $$\delta\tau_{S1} = \delta\tau_{L1} = \frac{l(P) - l(O)}{l(O)}, \quad (10)$$

and $\delta\tau_{S1}$ and $\delta\tau_{L1}$ are solely attributable to stress change between state points O (or P') and P.

Therefore, one may derive the following:

$$\langle \sigma(P) \rangle - \langle \sigma(O) \rangle = \delta\tau_{L2}/C_{\sigma L}^e, \quad (11)$$

$$\frac{\delta\tau_{L2}}{\delta\tau_{S2}} = \beta_\sigma^e, \quad (12)$$

$$\delta\tau_{S1} + \delta\tau_{S2} = \frac{\tau_S(P) - \tau_S(O)}{\tau_S(O)} \quad (13)$$

$$\delta\tau_{L1} + \delta\tau_{L2} = \frac{\tau_L(P) - \tau_L(O)}{\tau_L(O)} \quad (14)$$

From Eqs. (10) to (14), one may obtain $$\frac{l(P) - l(O)}{l(O)} = \frac{\beta_\sigma^e \frac{\tau_S(P) - \tau_S(O)}{\tau_S(O)} - \frac{\tau_L(P) - \tau_L(O)}{\tau_L(O)}}{\beta_\sigma^e - 1} \quad (15)$$

and $$\langle \sigma(P) \rangle - \langle \sigma(O) \rangle = \frac{\beta_\sigma^e \left[ \frac{\tau_L(P) - \tau_L(Q)}{\tau_L(O)} - \frac{\tau_S(P) - \tau_S(O)}{\tau_S(O)} \right]}{\beta_\sigma^e - 1} \Big/ C_{\sigma L}^e \quad (16)$$

Eqs. (15) and (16) may be rewritten in more general forms as follows:

$$\frac{l - l_0}{l_0} = \frac{\beta_\sigma^e \times \Delta_{Tc}^{rel}\tau_S - \Delta_{Tc}^{rel}\tau_L}{\beta_\sigma^e - 1} \quad (17)$$

$$\langle \sigma \rangle - \langle \sigma_0 \rangle = \frac{\beta_\sigma^e (\Delta_{Tc}^{rel}\tau_L - \Delta_{Tc}^{rel}\tau_S)}{\beta_\sigma^e - 1} \Big/ C_{\sigma L}^e \quad (18)$$

where $l_0$ and $\langle \sigma_0 \rangle$ represent the length of the rock bolt and the spatial average of stress on the rock bolt, respectively, at the reference state (i.e. the first point of time), $\iota$ and $\langle \sigma \rangle$ are respective values of the rock bolt at the current state, and $\Delta_{Tc}^{rel}\tau_L$ and $\Delta_{Tc}^{rel}\tau_S$ were defined in Eqs. (7) and (8) and may be measured in-situ, e.g. at the second point in time.

It is noted that in place of Eq. (11), the following equation may also be used in determining $\langle\sigma\rangle - \langle\sigma_0\rangle$ in a similar way that Eq. (18) was obtained:

$$\langle\sigma(P)\rangle - \langle\sigma(O)\rangle = \delta_{\tau_{S2}} C_{\sigma S}^e \quad (19)$$

The resulting equation will apparently have a different form that has the same root as Eq. (18) and may easily be converted to Eq. (18).

Thus, permanent elongation of the rock bolt may be determined according to Eq. (17) and axial stress that the rock bolt is experiencing may be determined according to Eq. (18). $\beta_\sigma^e$ may be determined as follows.

Because plastic deformation of a metal is a result of displacements of crystal lattice structures and does not change the base crystalline structure of the metal, the stress coefficients, $C_{\sigma L}^e$ and $C_{\sigma S}^e$, determined before the rock bolt has ever yielded, may be applicable to later elastic deformations regardless of the yield history of the rock bolt. Therefore, according to Eqs. (1) and (2), the following equations may apply to the elastic deformation path from state point P to state point P':

$$\frac{\tau_L(P) - \tau_L(P')}{\tau_L(P)} = C_{\sigma L}^e * [\langle\sigma(P)\rangle - \langle\sigma(P')\rangle] \quad (20)$$

$$\frac{\tau_S(P) - \tau_S(P')}{\tau_S(P)} = C_{\sigma S}^e * [\langle\sigma(P)\rangle - \langle\sigma(P')\rangle] \quad (21)$$

Thus, the slope of the elastic deformation path from point P to P' may be given by $$\beta_\sigma^3 = \frac{\tau_L(P) - \tau_L(P')}{\tau_L(O)} \Big/ \frac{\tau_S(P) - \tau_S(P')}{\tau_S(O)} \quad (22)$$

$$= \left[\frac{\tau_L(P) - \tau_L(P')}{\tau_L(O)} \Big/ \frac{\tau_S(P) - \tau_S(P')}{\tau_S(O)}\right] \frac{\tau_S(O)\tau_L(P)}{\tau_L(O)\tau_S(P)}$$

Therefore, taking into consideration Eqs. (20) and (21) and letting $$\beta_\sigma^E C_{\sigma L}^e / C_{\sigma S}^e, \quad (23)$$

Eq. (22) reduces to $$\beta_\sigma^e = \beta_\sigma^E \frac{\tau_S(O)\tau_L(P)}{\tau_L(O)\tau_S(P)} \quad (24)$$

As can be seen in the above equation, the slope value of an elastic deformation path may depend on both the current state and the coordinate system (i.e., the reference state) chosen.

Figure 8:
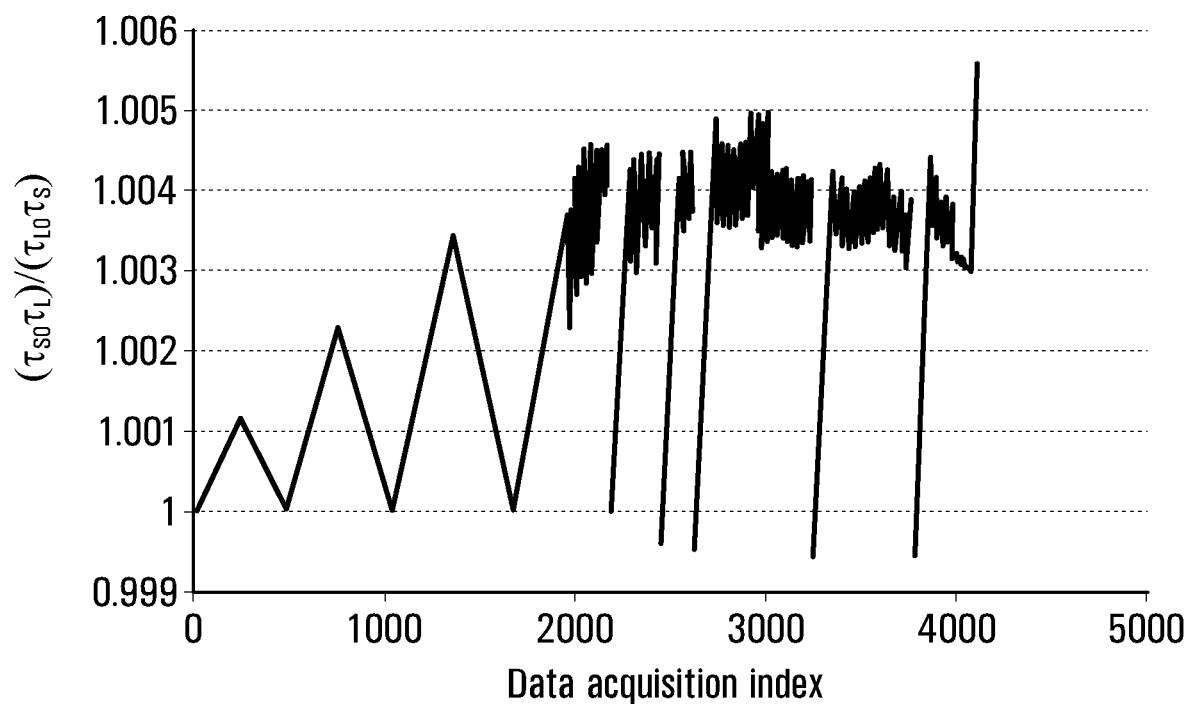
FIG. 8 shows the result of a pull test on a Garford™ dynamic bolt.

FIG. 8 shows variations of $(\tau_{S0}\tau_L)/(\tau_{L0}\tau_S)$ during a pull test on a Garford Dynamic™ rock bolt till bolt rupture, with $\tau_{S0}$, $\tau_{L0}$ representing the TOFs of longitudinal and shear ultrasonic waves before load was applied, and $\tau_S$ and $\tau_L$ representing the corresponding TOFs during the test. As seen in FIG. 8, the values of $(\tau_{S0}\tau_L)/(\tau_{L0}\tau_S)$ are close to 1, with variations of less than 1%. Accordingly, one may define the following relationship:

$$(\tau_{S0}\tau_L)/(\tau_{L0}\tau_S) \cong 1 \quad (25)$$

Referring to Eq. (22), this means that the slope of an elastic deformation path may be approximated with $\beta_\sigma^E$ to within 1% regardless of the reference state taken. Therefore, one may define the following relationship:

$$\beta_\sigma^e \cong \beta_\sigma^E \quad (26)$$

While the value of $\beta_\sigma^E$ may be obtained in a laboratory, the value of $\beta_\sigma^E$ may be determined in-situ either using Eq. (24) and a predetermined value of $\beta_\sigma^E$ or by calculating the slope of $\Delta_{Tc}^{rel}\tau_L$ vs. $\Delta_{Tc}^{rel}\tau_S$ in the elastic deformation regime, as shown in FIG. 6. Eventually, the value of $\beta_\sigma^E$ may be used in place of $\beta_\sigma^e$ as suggested by Eq. (26).

It may be possible to further use temperature-corrected relative change of TOF of longitudinal waves and that of shear waves to determine the total elongation that the rock bolt is experiencing.

If E is the Young's modulus of the rock bolt, elastic deformation dE caused by stress $\sigma(x)$ over a length dx may be obtained as:

$$d\varepsilon = \frac{\sigma(x)}{E} dx \quad (27)$$

Thus, referring to the schematic illustrated in FIG. 4 and Eqs. (27) and (3), the elastic deformation caused by stress distribution $\sigma(x)$ over a bolt section between points $x_1$ and $x_2$ may be defined as:

$$\varepsilon = \int_{x_1}^{x_2} \frac{\sigma(x)}{E} dx = \frac{d}{E} \langle\sigma\rangle \quad (28)$$

Therefore, when the average stress over the same bolt section has changed from a reference state $\langle\sigma_0\rangle$ to a state $\langle\sigma\rangle$, the elastic deformation with respect to the reference state may then be determined using the following equation:

$$\varepsilon - \varepsilon_0 = \frac{d}{E} [\langle\sigma\rangle - \langle\sigma_0\rangle] \quad (29)$$

Referring again to FIG. 7, the total deformation is the sum of plastic deformation at point P' and the elastic deformation from P' to point P. Thus, if one lets $\Delta^P\iota$, $\Delta^e\iota$ and $\Delta\iota$ be the plastic, elastic and total deformations (elongations), respectively, with respect to the reference state, then one may combine Eqs. (17), (18) and (29) to obtain:

$$\frac{\Delta l}{l_0} = \quad (30)$$

$$\frac{\Delta^P l + \Delta^e l}{l_0} = \frac{\beta_\sigma^3 \times \Delta_{Tc}^{rel}\tau_S - \Delta_{Tc}^{rel}\tau_L}{\beta_\sigma^e - 1} + \frac{1}{E} \frac{\beta_\sigma^3(\Delta_{Tc}^{rel}\tau_L - \Delta_{Tc}^{rel}\tau_S)}{\beta_\sigma^e - 1} \Big/ C_{\sigma L}^e$$

In this regards, if the rock bolt had not experienced a plastic deformation by the time the reference was taken, i.e. by the first point in time, the length of the rock bolt measured prior to rock bolt installation may be used as the value of $\iota_0$ in the above equation.

It may also be possible to use the temperature-corrected relative change of TOF of either the longitudinal or shear ultrasonic waves to determine axial stress change in a rock bolt. This may be desirable if, for example, only one type of ultrasonic wave may be effectively detected for a rock bolt. Specifically, depending on a variety of factors, including the rock bolt length, geometry and construction material, it could happen that only longitudinal or only shear ultrasonic wave echoes may be efficiently detected.

If the rock bolt has always stayed within the elastic deformation limit, the axial stress may be determined from Eq. (1) or (2) if it is possible to correct for temperature effects. Specifically, by rearranging these equations and adopting the temperature-corrected relative change of TOF defined in Eqs. (7) and (8), one may obtain:

$$\langle \sigma^e \rangle - \langle \sigma_0^e \rangle = \Delta_{Tc}^{rel} \tau_j / C_{oj}^e \tag{31}$$

where the subscript j stands for either L for longitudinal waves or S for shear waves.

It may also be possible to detect plastic deformation without correcting for the temperature effect on the TOF. This may be desirable in certain situations where merely being able to tell whether a rock bolt has already yielded may provide valuable information, for example for monitoring and ensuring mine safety. For instance, this may be applicable when rebar bolts are deployed, as these bolts are not made to sustain large plastic deformation.

Accordingly, by solving Eqs. (1) and (2) for $\langle T^e \rangle - \langle T_0^e \rangle$, one may obtain:

$$\langle T^e \rangle - \langle T_0^e \rangle = \frac{\beta_\sigma^e \frac{\tau_S - \tau_{S0}}{\tau_{S0}} - \frac{\tau_L - \tau_{L0}}{\tau_{L0}}}{\beta_\sigma^e C_{TS} - C_{TL}} \tag{32}$$

Eq. (32) holds when i) the state of the rock bolt at the second point in time, i.e. when the change in condition of the rock bolt is being determined, and ii) the state of the rock bolt at the reference, or first point in time, are in the same elastic deformation regime. If for some reason the rock bolt has yielded since the first point in time when the reference measurement was taken, Eq. (32) may no longer be valid and its use will result in an overly estimated temperature variation with respect to the reference state.

As such, by comparing the estimated temperature variation with an expected temperature variation of the rock bolt between the first and second points in time, it may be possible to determine if the rock bolt has yielded. Specifically, if the estimated temperature variation is larger than the expected temperature variation, one may determine that the rock bolt has yielded. How big of a difference between the estimated and expected temperature variations is needed to determine whether the rock bolt has yielded may depend on the specific characteristics of the rock bolt being monitored. A desired threshold may be set in advance of monitoring.

Figure 9:
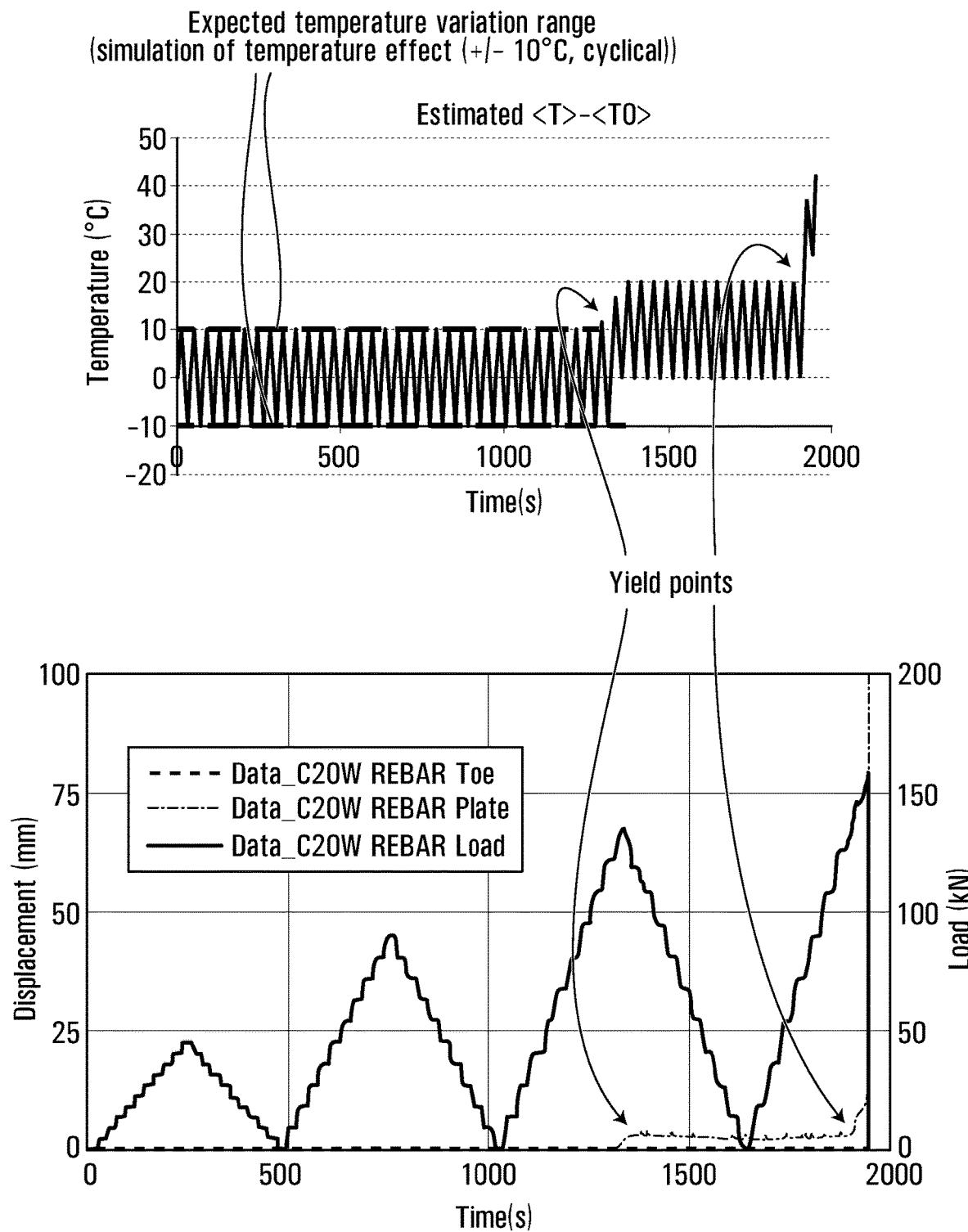
FIG. 9 shows a correlation between estimated temperature variation and load for the pull test of FIG. 5.

To illustrate how the difference between the estimated and expected temperature variations may be used, the top of FIG. 9 includes a temperature variation calculated from Eq. (32) after imposing the effect of ±10° C. cyclical temperature variation on TOF measured during the pull test presented in FIG. 5 (shown also at the bottom of FIG. 9). At the yield points, where the transition from the elastic deformation regime to plastic deformation regime occurs, the estimated temperature variation begins to increase above the expected temperature variation.

Moreover, given that the temperature variation on a rock bolt section inside the rock is usually smaller than that of ambient air or of the rock bolt head, which is partially or completely exposed, a comparison of temperature variation estimated from Eq. (32) with the expected temperature variation range of ambient air or of the rock bolt head may provide a conservative value for detection of whether or not the rock bolt has entered the plastic deformation regime and has therefore yielded.

Furthermore, to increase detection sensitivity, the temperature at the second point in time may be compared with that of a reference temperature taken at an ambient temperature close to that of the ongoing state. This means that a plurality of references for both longitudinal and shear ultrasonic waves may need to be taken to cover a large temperature range.

It may also be possible to determine a change in condition for a specific type of yielding rock bolt. Here, "yielding rock bolt" refers to a rock bolt that has been designed to yield under predetermined conditions so as to avoid certain outcomes, for example rupture, in response to predetermined stress inducing events. One such rock bolt is sold under the trade-name Garford Dynamic™ and is manufactured by Garford Pty Ltd. of Australia. This type of yielding rock bolt exhibits an oscillatory plastic deformation regime, in part in order to absorb seismic events.

For such a yielding type rock bolt, it may be possible to determine a transition from the elastic deformation regime to the oscillatory plastic deformation regime or to determine imminent failure of the yielding rock bolt. This may be achieved by determining a rock bolt behavior value and monitoring its progression over time. The rock bolt behavior value may be determined according to the following formula:

$$\gamma = \frac{\tau_L - \tau_{L0}^e}{\tau_{L0}^e} - \beta_T \frac{\tau_S - \tau_{S0}^e}{\tau_{S0}^e} \tag{33}$$

In Eq. (33), $\tau_L$ and $\tau_S$ are the TOFs of longitudinal and shear ultrasonic waves, respectively, over a section of the rock bolt, regardless of whether it is in the elastic or plastic deformation regime. The use of $\beta_T$ in the equation may allow temperature effects on TOF to be cancelled out and thereby ignored.

Figure 10:
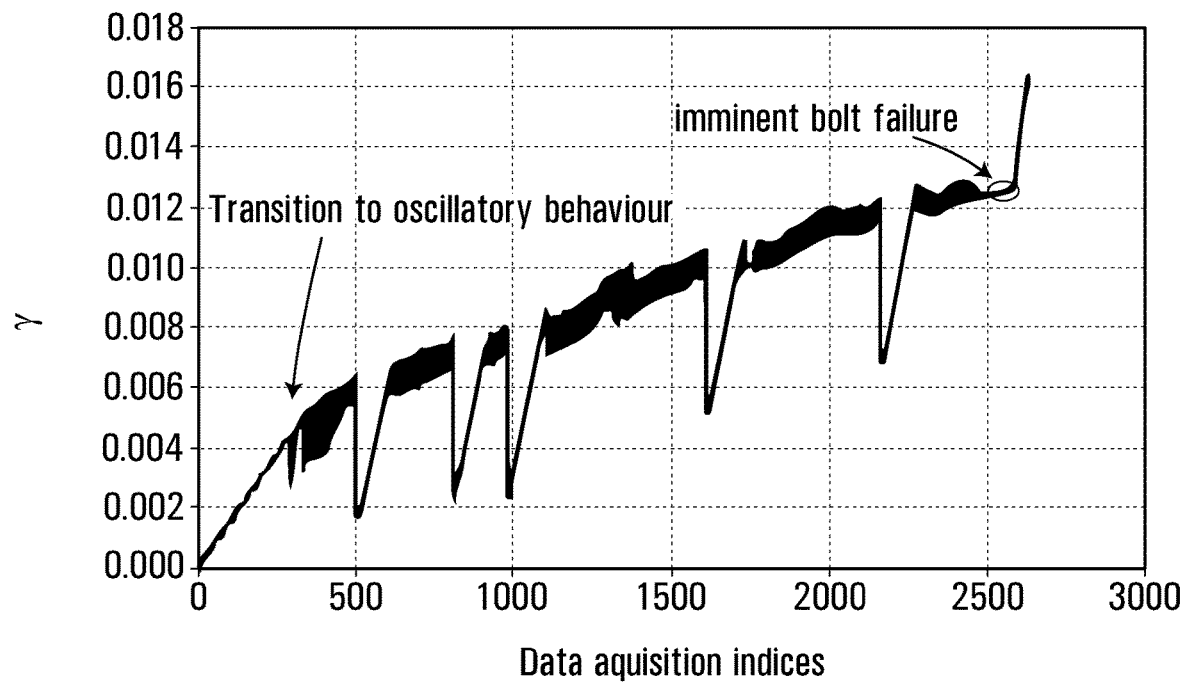
FIG. 10 shows the progression of a yielding rock bolt behaviour value over time.

FIG. 10 shows the evolution of the rock behavior value, $\gamma$, as defined in Eq. (33), during a pull-test on a Garford™ type yielding rock bolt. Load and unload cycles were applied to the rock bolt in the test. An oscillatory plastic deformation behavior as well as the onset of imminent bolt failure may be identifiable by observing the progression of $\gamma$. These changes in condition are labelled in FIG. 10, where sudden dips in the value of $\gamma$ are due to interruptions of loading in the test. As seen in FIG. 10, the absence of the oscillatory plastic deformation regime may indicate imminent failure of the rock bolt.

Embodiments of methods according to the present disclosure that have been discussed above, may use the temperature-corrected relative change in the TOFs of longitudinal and shear ultrasonic waves between two or more points in time. Thus, some embodiments may involve determining a temperature correction value in order to determine the temperature-corrected relative change in the TOFs. This will now be described in more detail.

At the outset, for the purpose of simplification, the following description will use a unified form of temperature-corrected relative change of TOF for both longitudinal and shear ultrasonic waves:

$$\Delta_{Tc}^{rel} \tau_j = \frac{\tau_j - \tau_{j0}}{\tau_{j0}} - C_{Tj} * [\langle T \rangle - \langle T_0 \rangle] \tag{34}$$

where the subscript j stands for either L for longitudinal ultrasonic waves or S for shear ultrasonic waves.

Referring to the annotations in the schematic of FIG. 4, one may assume a linear temperature distribution along the rock bolt 12 section of interest for an ongoing state of the rock bolt 12, for example at the second point of time when the change in condition of the rock bolt is to be determined. This linear distribution may be described as follows:

$$T(x) = T_{head} + \frac{T_{toe} - T_{head}}{D} x \quad (35)$$

Similarly, one may assume a linear distribution for the reference state at the first point in time, described as follows:

$$T_0(x_0) = T_{0,head} + \frac{T_{0,toe} - T_{0,head}}{D_0} x_0 \quad (36)$$

In the above equation, $T_{0,head}$, $T_{0,toe}$, $D_0$, and $x_0$ denote the temperatures at the rock bolt head and toe, the rock bolt length, and the location of a point on the rock bolt, respectively, when the reference was taken at the first point in time, and $T_{head}$, $T_{toe}$, D and x are the corresponding values in the ongoing state of the rock bolt, e.g. at the second point in time. Furthermore, one may assume that $$\frac{x}{D} \cong \frac{x_0}{D_0}. \quad (37)$$

Thus, by applying Eqs. (4) and (37) to Eqs. (35) and (36) for the section between $x_1$ and $x_2$, one may obtain:

$$\langle T \rangle - \langle T_0 \rangle \cong (T_{head} - T_{0,head})\left(1 - \frac{x_{10} + x_{20}}{2D_0}\right) + (T_{toe} - T_{0,toe})\frac{x_{10} + x_{20}}{2D_0} \quad (38)$$

$$\cong (T_{head} - T_{0,head})\left(1 - \frac{t_{10} + t_{20}}{2\tau_{D0}}\right) + (T_{toe} - T_{0,toe})\frac{t_{10} + t_{20}}{2\tau_{D0}}$$

where $x_{10}$, $x_{20}$, $t_{10}$, $t_{20}$ and $\tau_{D0}$ are the values of $x_1$, $x_2$, $t_1$, $t_2$ and $\tau_D$, respectively, when the reference was taken at the first point in time. Either longitudinal ultrasonic waves or shear ultrasonic waves may be used and may be chosen depending on which of the two wave types offers a better signal quality. Eq. (38) provides an approximate estimate of $\langle T \rangle - \langle T_0 \rangle$ when the bolt is stressed. When the bolt is stress-free, the equal sign holds.

To determine $\langle T \rangle - \langle T_0 \rangle$, temperatures at the rock bolt head and toe may be measured. Once $\langle T \rangle - \langle T_0 \rangle$ is determined, the temperature-corrected relative change of TOF may be obtained from Eq. (34).

However, if the rock bolt toe end 22 is deeply embedded in the rock 14, the temperature change or variation at the toe end 22 might be negligible, in which case Eq. (38) reduces to:

$$\langle T \rangle - \langle T_0 \rangle \cong (T_{head} - T_{0,head})\left(1 - \frac{t_{10} + t_{20}}{2\tau_{D0}}\right) \quad (39)$$

Therefore, applying Ea. (39) to Eq. (34) one may obtain:

$$\Delta_{Tc}^{rel} \tau_j = \frac{\tau_j - \tau_{j0}}{\tau_{j0}} - C_{Tj} * (T_{head} - T_{0,head})\left(1 - \frac{t_{10} + t_{20}}{2\tau_{D0}}\right) \quad (40)$$

Moreover, if the section of interest is the entire length of the rock bolt 12, the factor $$\left(1 - \frac{t_{10} + t_{20}}{2\tau_{D0}}\right)$$

in equation (40) reduces to ½.

Thus, in some embodiments, only the temperature at the rock bolt head may need to be measured or determined in order to obtain the temperature corrected relative change in TOF.

In some embodiments, it may also be possible to determine the temperature-corrected relative change of TOF by assuming a linear temperature distribution and by using reference reflectors in stress-stable zones of the rock bolt 12.

Figure 11A:
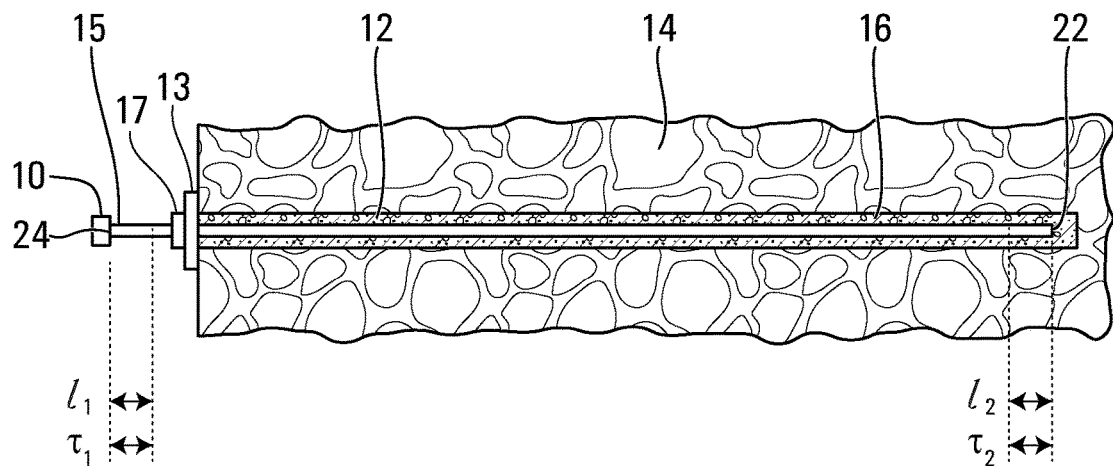
FIG. 11A is a schematic of a rock bolt installed in rock illustrating various quantities related to embodiments of the present disclosure.

Referring to the schematic in FIG. 11A, it is noted that a stress-free, and therefore stress-stable, zone may exist in the portion of the rock bolt head 15 between the ultrasound transducer 10 and the anchor nut 17, as this portion of the rock bolt 12 is not loaded.

Moreover, another stress-stable zone may exist in the toe section of the fully grouted rock bolt 12. Specifically, it may be possible to make the toe section a stress-stable zone by covering it with a sheath or an anti-adhesion wrap to prevent this section from bonding to the surrounding grout 16.

Reference reflectors (not shown) may be provided, one in each of the stress-stable zones. In some embodiments, the reflectors may be small holes perpendicular to the rock bolt shank. The diameter and depth of the holes may be customized to provide required signal quality. For example, a half-depth 0.5 mm diameter hole may be drilled in the stress-free zone at the head 15 and a thru hole of 1 mm diameter may be drilled in the toe section. The hole in the toe section may need to be larger because stronger reflection from that zone may be needed to compensate for larger loss of ultrasonic wave energy through a longer propagation distance. The hole in the stress-free zone at the head 15 may need to be smaller in order not to block too much incident ultrasonic waves.

Furthermore, in some embodiments, echo signals from the reference hole in the stress-free zone at the head 15 may be used to check the performance of UTs and electronics (such as the signal processing means discussed below) before proceeding with any data processing and interpretation.

Referring to FIG. 11A, $\iota_1$ may be defined as the distance between the rock bolt head end 24 and reflector 1 and $\iota_2$ as the distance between reflector 2 and the toe end 22, $\tau_1$ and $\tau_2$ as the ultrasonic round trip TOF over $\iota_1$ and $\iota_2$, respectively, and $\iota_{10}$, $\iota_{20}$, $\tau_{10}$ and $\tau_{20}$ as the values of $\iota_1$, $\iota_2$, $\tau_1$ and $\tau_2$ when the reference was taken at the first point in time.

Since the reflectors are in stress-stable zones, any change in $\tau_1$ and $\tau_2$ may be solely attributable to a temperature variation. Thus, it may be possible to determine the temperature correction value by measuring additional time of flights of the shear and longitudinal ultrasonic waves over a first and a second stress-stable zone of the rock bolt at each of the first and second points of time. Namely, by applying Eq. (38) to the two stress-stable zones, one may obtain:

$$\frac{\tau_1 - \tau_{10}}{\tau_{10}} \cong C_{Tj}\left[(T_{head} - T_{0,head})\left(1 - \frac{\tau_{10}}{2\tau_{D0}}\right) + (T_{toe} - T_{0,toe})\frac{\tau_{10}}{2\tau_{D0}}\right] \quad (41)$$

and $$\frac{\tau_2 - \tau_{20}}{\tau_{20}} \cong C_{Tj}\left[(T_{head} - T_{0,head})\frac{\tau_{20}}{2\tau_{D0}} + (T_{toe} - T_{0,toe})\left(1 - \frac{\tau_{20}}{2\tau_{D0}}\right)\right] \quad (42)$$

Solving the above two equations for $T_{head} - T_{0,head}$ and $T_{toe} - T_{0,toe}$, one may obtain:

$$T_{head} - T_{0,head} = \frac{1}{C_{Tj}} \frac{(2\tau_{D0} - \tau_{20})\frac{\tau_1 - \tau_{10}}{\tau_{10}} - \tau_{10}\frac{\tau_2 - \tau_{20}}{\tau_{20}}}{2\tau_{D0} - \tau_{10} - \tau_{20}} \quad (43)$$

and $$T_{toe} - T_{0,toe} = \frac{1}{C_{Tj}} \frac{(2\tau_{D0} - \tau_{10})\frac{\tau_2 - \tau_{20}}{\tau_{20}} - \tau_{20}\frac{\tau_1 - \tau_{10}}{\tau_{10}}}{2\tau_{D0} - \tau_{10} - \tau_{20}} \quad (44)$$

Furthermore, combining Eq. (38) with Eq. (34) and taking into account Eqs. (43) and (44), one may obtain:

$$\Delta_{Tc}^{rel}\tau_j \cong \\ \frac{\tau_j - \tau_{j0}}{\tau_{j0}} - \frac{(2\tau_{D0} - \tau_{20})\frac{\tau_1 - \tau_{10}}{\tau_{10}} - \tau_{10}\frac{\tau_2 - \tau_{20}}{\tau_{20}}}{2\tau_{D0} - \tau_{10} - \tau_{20}}\left(1 - \frac{t_{10} + t_{20}}{2\tau_{D0}}\right) - \\ \frac{(2\tau_{D0} - \tau_{10})\frac{\tau_2 - \tau_{20}}{\tau_{20}} - \tau_{20}\frac{\tau_1 - \tau_{10}}{\tau_{10}}}{2\tau_{D0} - \tau_{10} - \tau_{20}}\left(\frac{t_{10} + t_{20}}{2\tau_{D0}}\right) \quad (45)$$

Thus, if the section of interest is the entire rock bolt, Eq. (45) reduces to:

$$\Delta_{Tc}^{rel}\tau_j \cong \frac{\tau_j - \tau_{j0}}{\tau_{j0}} - \frac{(\tau_{D0} - \tau_{20})\frac{\tau_1 - \tau_{10}}{\tau_{10}} + (\tau_{D0} - \tau_{10})\frac{\tau_2 - \tau_{20}}{\tau_{20}}}{2\tau_{D0} - \tau_{10} - \tau_{20}} \quad (46)$$

Furthermore, as discussed above, because the temperature variation at the toe section may be negligible because the toe end 22 is deeply embedded into the rock 14, one may solve Eq. (41) for $T_{head} - T_{0,head}$ by letting $T_{toe} - T_{0,toe} = 0$ and one may obtain:

$$T_{head} - T_{0,head} = \frac{1}{C_{Tj}} \frac{2\tau_{D0}\frac{\tau_1 - \tau_{10}}{\tau_{10}}}{2\tau_{D0} - \tau_{10}} \quad (47)$$

Consequently, bringing Eq. (38) into Eq. (34), taking into account Eq. (47) and setting $T_{toe} - T_{0,toe} = 0$, one may obtain:

$$\Delta_{Tc}^{rel}\tau_j \cong \frac{\tau_j - \tau_{j0}}{\tau_{j0}} - \frac{2\tau_{D0}\frac{\tau_1 - \tau_{10}}{\tau_{10}}}{2\tau_{D0} - \tau_{10}}\left(1 - \frac{t_{10} + t_{20}}{2\tau_{D0}}\right) \quad (48)$$

Thus, based on Eq. (48), when temperature variation at the toe section may be negligible, only one reference reflector, i.e., the one in the head zone, may be needed for determination of the temperature-correction value and, thus, the temperature-corrected relative change in the TOF.

If the section of interest is the entire rock bolt, Eq. (48) reduces to:

$$\Delta_{Tc}^{rel}\tau_j \cong \frac{\tau_j - \tau_{j0}}{\tau_{j0}} - \frac{\tau_{D0}\frac{\tau_1 - \tau_{10}}{\tau_{10}}}{2\tau_{D0} - \tau_{10}} \quad (49)$$

Moreover, $\tau_{D0}$ may be equated to $\tau_{j0}$ in equation (49) if the same type of ultrasonic waves are used for measuring $\tau_{D0}$ and $\tau_{j0}$.

Accordingly, it may also be possible to determine permanent elongation of a rock bolt without the need for prior lab calibration of the rock bolt to determine, for example, the temperature coefficients $C_{TL}$ and $C_{TS}$. In some embodiments, a method for determining permanent elongation may include determining $\Delta_{Tc}^{rel}\tau_L$ and $\Delta_{Tc}^{rel}\tau_S$ by using one of equations (45), (46), (48) and (49), determining a relationship between $\Delta_{Tc}^{rel}\tau_L$ and $\Delta_{Tc}^{rel}\tau_S$, for example by plotting $\Delta_{Tc}^{rel}\tau_L$ vs. $\Delta_{Tc}^{rel}\tau_S$ for a desired number of data points in the elastic regime, calculating $\beta_\sigma^e$ (as shown in FIG. 6) by calculating the slope of $\Delta_{Tc}^{rel}\tau_L$ vs $\Delta_{Tc}^{rel}\tau_S$ in the elastic deformation regime, and using Eq. (17) to determine permanent elongation of the rock bolt. In such embodiments, calibrated or laboratory data may not be needed and necessary measurements may all be made in situ or in the field.

The above-described embodiments have been described with reference to two points in time when measurements may be taken: at a first point in time, i.e. the reference state, and at a second point in time, i.e. the ongoing state. Measurements at only two points in time may be sufficient for a number of the above-described embodiments to determine various conditions and change of conditions of a rock bolt. However, additional measurements at further points in time may be taken, i.e. additional information about the ongoing state may be determined and used in embodiments described herein.

In some embodiments, additional measurements at further points in time may be necessary to obtain relevant results. For example, when determining the rock bolt behavior value for a yielding type rock bolt, such as a Garford™ dynamic bolt, multiple measurements at further points in time may be necessary to monitor the ongoing state of the rock bolt.

Additional measurements of the ongoing state may aid in detecting anomalies in the rock bolt being monitored sooner. However, additional measurements beyond the second point in time are not required in all embodiments. Measurements may also be taken at a desired frequency or at predetermined intervals. A desired frequency of the measurements may depend on stability of the ground or rock face in which the rock bolts are installed.

Moreover, it is noted that a reference state, i.e. at the first point in time, may be taken at any point in time during the service life of the rock bolt regardless of load or deformation history and embodiments of methods described herein may be used to determine relative plastic deformation and stress change with respect to this reference state. If the reference was taken at a point in time when the rock bolt was in a stressed state, a stress change measured later, for example at the second point in time, may be either positive or negative with respect to the reference state.

Furthermore, if the reference state is taken after the rock bolt is tensioned, then, as long as the reference state has never yielded, embodiments of methods described herein may be used to measure or determine plastic deformation with respect to the original unstressed state.

The above-noted embodiments of methods for rock bolt condition monitoring, may be applied to obtain additional information about the condition of a rock bolt's installation and/or the rock into which the rock bolts have been installed.

For example, when instrumented rock bolts, i.e. rock bolts set up to have their condition monitored, are deployed as a network in a mine or excavation and an individual rock bolt senses much less stress than neighboring rock bolts, one may be able to determine if that rock bolt is adequately grouted or otherwise installed in the rock face.

In another example, when instrumented rock bolts are deployed as a network in a mine or other excavation and all the instrumented rock bolts in an area of the rock face experience the same trend in load changes, one may be able to detect and determine the presence and nature of ground activity in the area. Moreover, the information and measurements obtained from various combinations of distributed instrumented rock bolts may allow one to create a 3D representation of the state of stress or change of the state of stress with time in the rock face, showing zones of risk. This representation of stress may be further refined by combining it with 3D modeling of the state of stress of the mine. Furthermore, combining the stress distribution measured by distributed instrumented rock bolts with information concerning micro seismic activities as detected by seismic sensors may make the identification of risk areas more reliable.

In another example, measurement of TOF in different sections of a grouted rock bolt may be used to monitor or determine the quality of the grouting. Thus, in some embodiments, it may be possible to assess grout quality shortly following installation of a rock bolt before any ground movement.

Figure 11B:
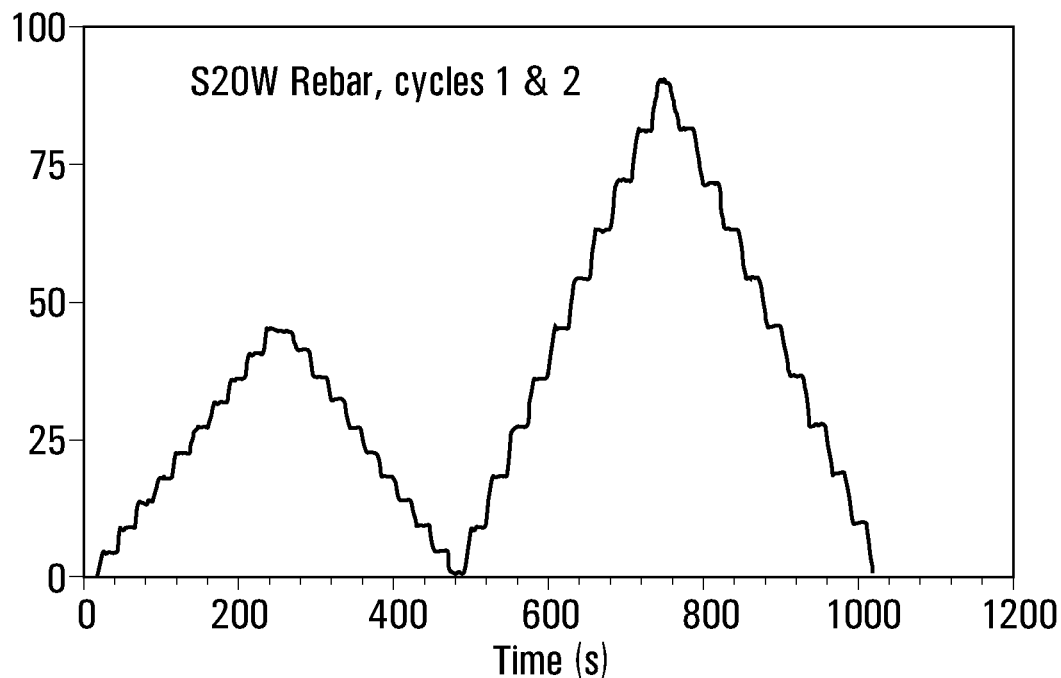
FIG. 11B is a plot of cyclic load applied to a rebar bolt during a pull test.
Figure 11C:
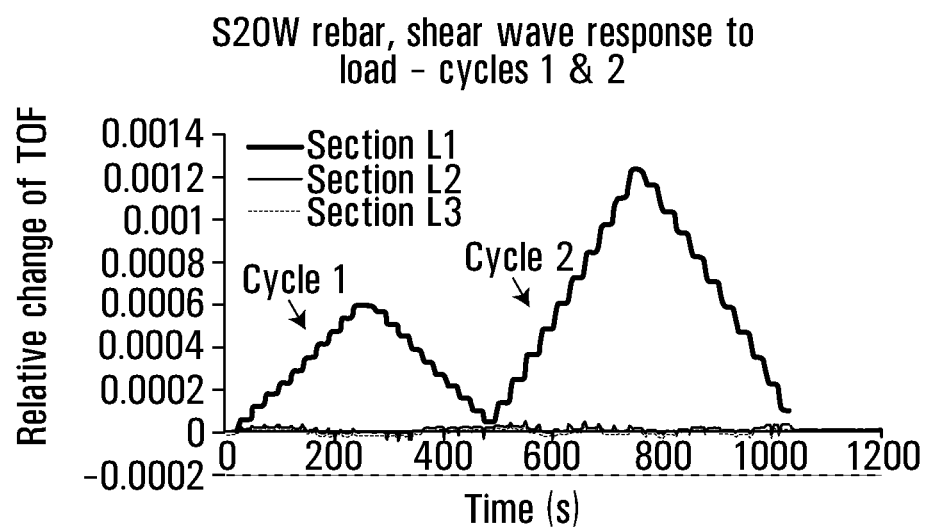
FIG. 11C shows the measured relative change in time of flight of shear waves over three segments during the pull test in FIG. 11B.
Figure 11D:
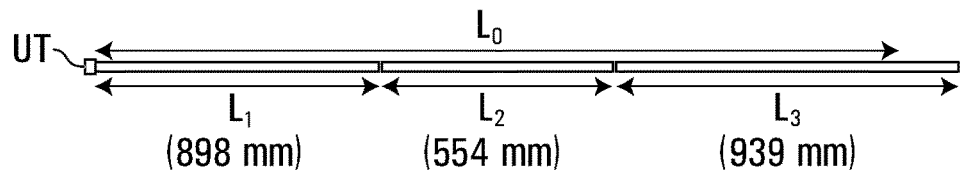
FIG. 11D is a schematic showing the three segments identified in FIG. 11C.

FIG. 11B shows cyclic load applied to a S20W rebar bolt during a pull test. FIG. 11C shows measured relative change of TOF of shear ultrasonic waves over three segments delimited by two thru holes of 1 mm each on the bolt (FIG. 11D). The rock bolt was fully grouted. The load was exerted to the rock bolt from a load cell between two bearing plates.

As shown in FIG. 11C, section L1 experienced noticeable TOF changes at every step change of load whereas sections L2 and L3 did not show any TOF changes beyond measurement errors. This means that load was not transferred to sections L2 and L3 due to the grouting quality in section L1 closer to the rock bolt head.

As an example, if section L1 were not well grouted, more load would have been transferred to section L2 and, consequently, larger TOF change for section L2 would have been observed, in addition to large TOF change for section L1. If neither of sections L1 and L2 were well grouted, changes in TOFs would have been observed for all three sections.

In some embodiments in practice, a reference state may be taken before or even after the rock bolt has already been slightly tightened. At a second point in time, after the rock bolt has been further tightened, measurements of TOFs for each section may be taken again. Relative change of TOFs with respect to respective references and relative importance of these changes among different sections may provide a measure of grouting quality shortly following the installation of the rock bolt.

Figure 11E:
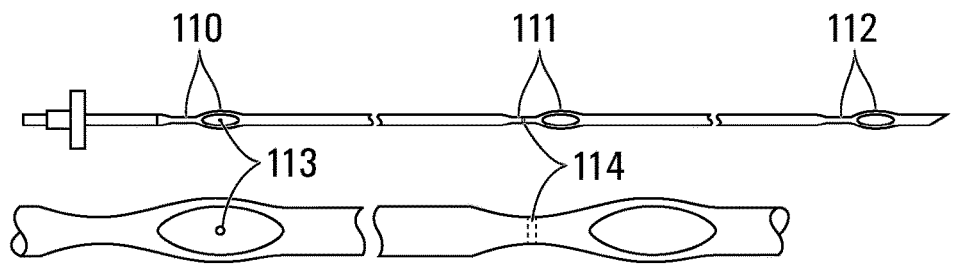
FIG. 11E is a schematic showing the anchoring sections of a Normet D-bolt.

In practice, in some embodiments, some types of bolts may be anchored at discrete locations whereas the sections between the anchored locations are free to move. For example, the Garford™ type yielding rock bolt discussed above was anchored at the bearing plate and the toe during the pull-test. As seen in FIG. 11E Normet™ D-bolt may be anchored at peddled sections marked as 110, 111 and 112. Therefore, load may be freely transferred between the anchor points. In such embodiments, it may be possible to detect and estimate plastic deformation between the anchor points using only one type of ultrasonic wave.

As an example, in order to inspect the section between anchored sections 110 and 111 of the D-bolt in FIG. 11E, a reference hole is drilled in each of the sections, preferably in the middle of the paddle closest to the straight bar between the anchored sections (marked as 113 and 114). The inspection relies on a pre-established calibration curve between the change of applied load with respect to a reference state (for example, a stress-free state) and the (temperature-corrected) change of TOF of the type of ultrasonic waves selected.

Figure 11F:
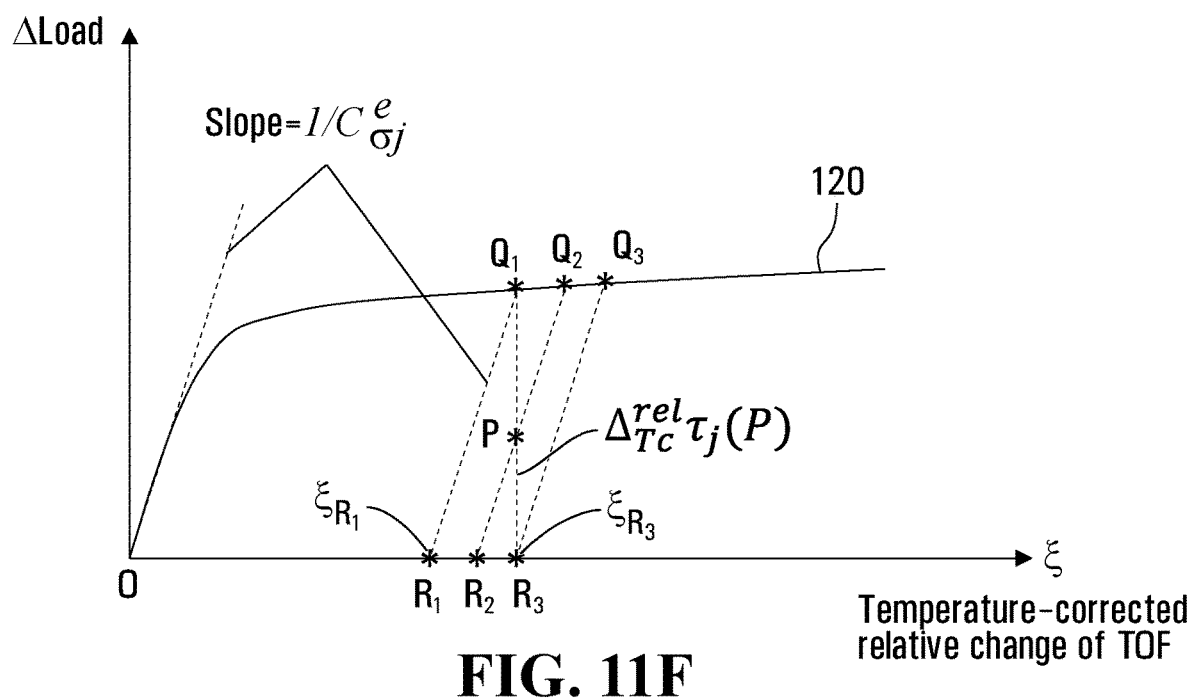
FIG. 11F is a schematic plot of a calibration curve of load change versus temperature-corrected relative change of time of flight.

Referring to FIG. 11F, let calibration curve 120 be the pre-established relation of load change, $\Delta$Load, vs. temperature-corrected relative change of TOF, $\xi$, of the same type of rock bolt being inspected. Let $g(\xi)$ be a function representing this calibrated relation:

$$\Delta \text{Load} = g(\xi) \tag{50}$$

According to Eqs. (1) and (2), the slope corresponding to elastic deformation is given by $1/C_{oj}^{e}$ with j being L or S for longitudinal or shear waves, respectively. Let P be a current state point at which the temperature-corrected relative change of TOF is measured as being $\Delta_{Tc}^{rel}\tau_j(P)$. The value of $\Delta_{Tc}^{rel}\tau_j(P)$ alone does not allow the current load to be determined as any point on the vertical line passing through the point P and between the point $Q_1$ on the calibration curve 120 and the point $R_3$ at the original reference load level would produce the same amount of $\Delta_{Tc}^{rel}\tau_j$ while being under a different load.

The state point P could have been reached after the bolt had previously reached the state point $Q_2$ on the curve and then been load released to the state P following an elastic deformation path along the dashed line from $Q_2$ to P, or after the bolt had previously reached the original reference load level at point $R_2$, and then been reloaded to the state point P following an elastic deformation path along the dashed line from $R_2$ to P.

Let $R_1$ be a state point that may be reached by releasing the load at the state point $Q_1$ to the original reference load. Since unloading is accompanied by elastic deformation, the path from the point $Q_1$ to the point $R_1$ is a straight line with a slope of $1/C_{oj}^{e}$.

Let $Q_3$ be a state point on the calibration curve 120 that may be reached by reloading the bolt from the state point $R_3$ following an elastic deformation path along the dashed line from $R_3$ to $Q_3$. This path is a straight line of slope $1/C_{oj}^{e}$. The load value of point $Q_3$ provides an estimate of the highest load change that may have been experienced by the bolt because the bolt may have reached the state point $Q_3$ and then came back to the state point $R_3$ following an elastic deformation path from $Q_3$ to $R_3$. The values of $\Delta_{Tc}^{rel}\tau_j(R_1)$ and $\Delta_{Tc}^{rel}\tau_j(R_3)$, also noted as $\xi_{R_1}$ and $\xi_{R_3}$ on the horizontal axis of provide estimates of the lower and upper limits, respectively, of the relative plastic elongation of the bolt section with respect to the length of this bolt section at the reference state.

Mathematically, an estimate of the maximum load change that the rock bolt may have experienced, i.e., the load change at the state point $Q_3$, may be determined by solving system of equation 50 and the following equation for $\Delta$Load:

$$\Delta \text{Load} = [\xi - \Delta_{Tc}^{rel}\tau_j(P)]/C_{oj}^{e} \tag{51}$$

where Eqs. (50) and (51) represent respectively the calibration curve 120 and the straight line passing through points $R_3$ and $Q_3$. The solution is their intersection point. Refer again to FIG. 11F. Estimates of the minimum and maximum plastic elongation with respect to the reference state may be obtained as follows:

$$\Delta_{min}^{plastic} l = \xi_{R_1} * l_0 = [\xi_{R_3} - (\xi_{R_3} - \xi_{R_1})] * \quad (52)$$

$$l_0 = [\xi_{R_3} - C_{\sigma,j}^e * \Delta Load(Q_1)] * l_0 = [\Delta_{Tc}^{rel} \tau_j(P) - C_{\sigma,j}^e * g(\Delta_{Tc}^{rel} \tau_j(P))] * l_0$$

$$\Delta_{max}^{plastic} l = \Delta_{Tc}^{rel} \tau_j(P) * l_0 \quad (53)$$

where $l_0$ is the length of the rock bolt section being inspected when it was in the reference state.

It is noted that the calibration function $\Delta Load = g(\xi)$ does not have to be in an explicit mathematic form but rather in the form of a table of measurement data. The solutions to Eqs. (50) and (51) and the calculation of $\Delta_{min}^{plastic} l$ may be achieved via numerical means comprising numerical interpolation to find the value of $\Delta Load$ at a given value of the temperature-corrected relative change of TOF.

It is understood that although the above discussions were mainly directed to longitudinal and shear waves, the same measurement principles may apply to other types of acoustic waves, for example, guided acoustic waves of different modes and frequencies, and to types of rock bolts that are not explicitly discussed in this disclosure, for example thin wall inflatable rock bolts or thin wall split set rock bolts, etc.

The above disclosed embodiments include detection and/or measurement of TOFs of ultrasonic longitudinal and/or shear waves travelling a section or entire length of a rock bolt. Thus, analysis of the signals obtained from the measurement of the ultrasonic waves may be needed to determine, for example, the TOFs. In this regard, some principles of ultrasonic wave propagation and embodiments for detection of ultrasonic wave echoes will now be described.

Figure 12:
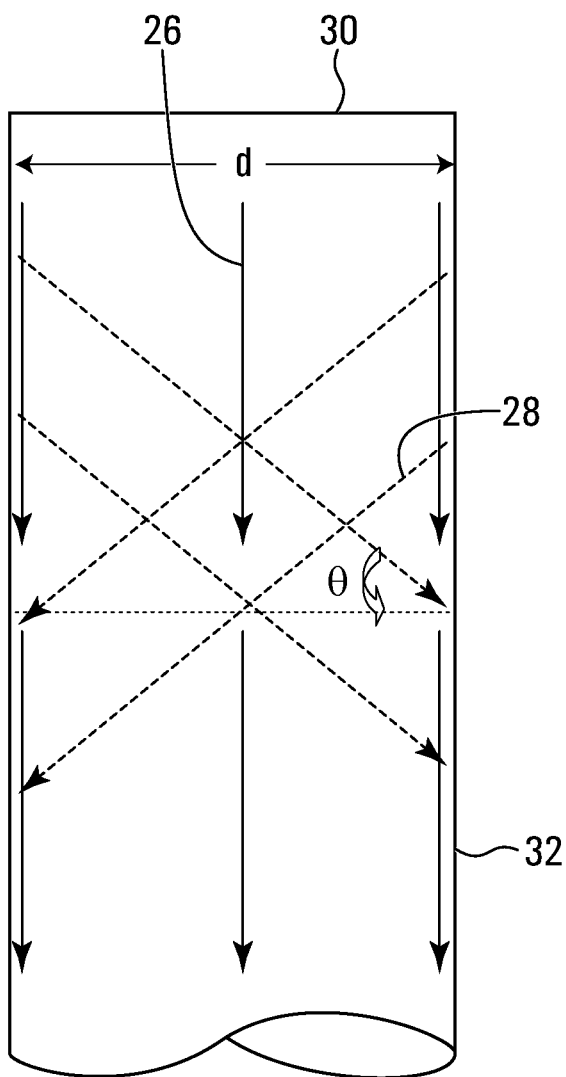
FIG. 12 is a schematic showing propagation of longitudinal and shear ultrasonic waves in a rock bolt shank.

Referring to FIG. 12, in general, when a high frequency longitudinal wave 26 (indicated by parallel arrows) propagates inside a cylindrical rod 30 of a rock bolt 12 along a shank or axial direction, some energy will be converted to shear ultrasonic waves 28 (indicated by dotted arrows) propagating obliquely at an angle θ. This conversion may be referred to as "mode conversion".

In turn, as converted shear ultrasonic waves 28 travel, some of its energy will be converted back to longitudinal ultrasonic waves 26. The conversions between longitudinal and shear ultrasonic waves take place at every point on the rod boundary 32, resulting in multiple echoes from a reflecting surface (not shown), for example, a reference hole in the rod or the toe end of the rod. The time delay between consecutive echoes may be defined as:

$$\tau = (d/\cos\theta)/v_s - d \tan\theta/v_L \quad (54)$$

where d is the rod diameter, $V_s$ and $V_L$ are velocities of the shear and longitudinal ultrasonic waves, respectively, and 0 may be given by $$\theta = \sin^{-1}(v_s/v_L) \quad (55)$$

Figure 13:
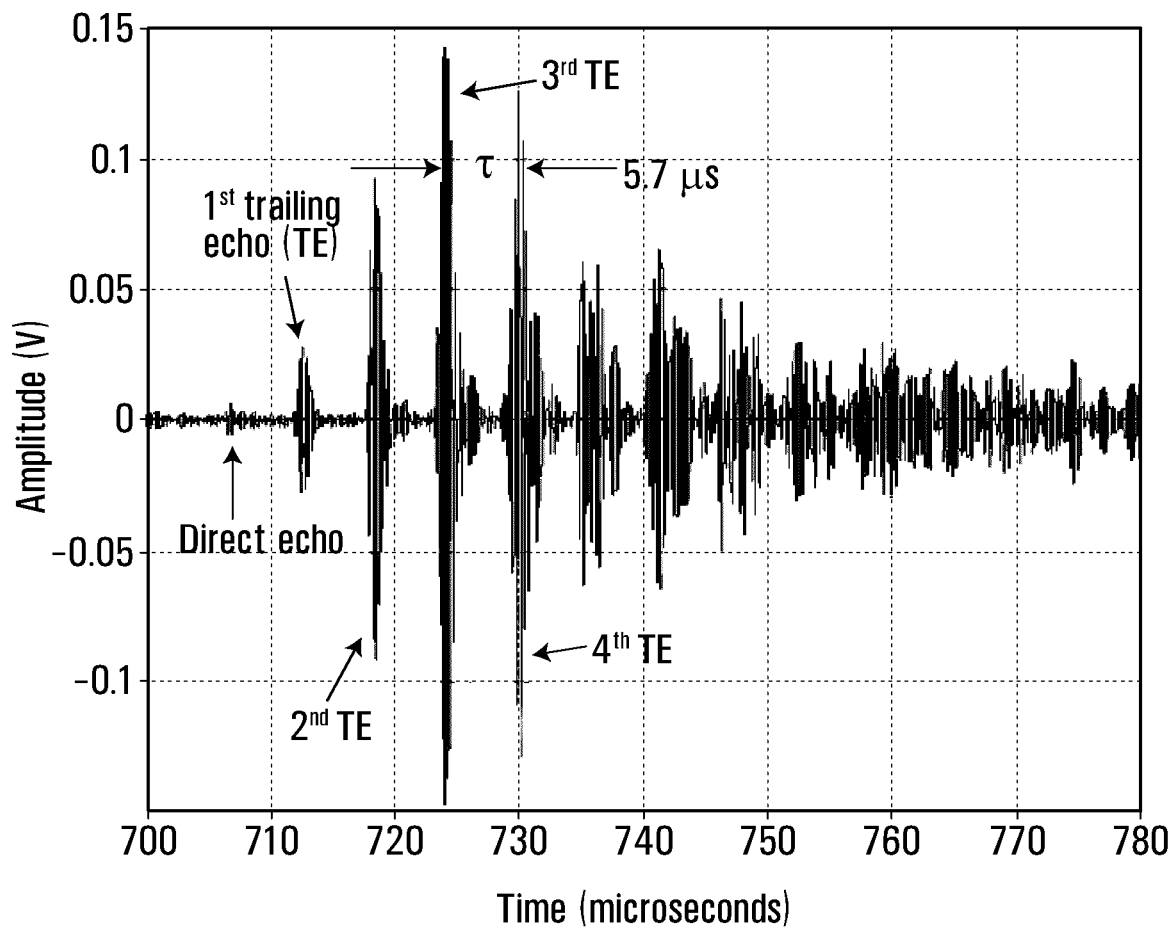
FIG. 13 shows a longitudinal ultrasonic wave echo signal.

As an example, FIG. 13 shows a longitudinal wave echo signal reflected from the toe end of a Garford™ dynamic bolt before an axial load was applied. The signal was led by a direct echo of relatively weak amplitude, which was followed by trailing echoes of stronger amplitude resulting from the mode conversion between longitudinal and shear ultrasonic waves.

While, in some embodiments disclosed above, one may be interested in determining the TOF of the direct echo, it may be difficult to do so if the echo's amplitude is too weak compared to the noise in the signal and the amplitude of the trailing echoes.

In some embodiments, it may be possible to determine the TOF of the direct echo by measuring the TOF of a trailing echo with a stronger amplitude than the direct echo, for example, that of the $3^{rd}$ trailing echo. The TOF of the direct echo may then be determined using the general formula:

$$\tau_{L\_direct} = \tau_{TE\_n} - n * \tau \quad (56)$$

where $\tau_{TE\_n}$ denotes the TOF of the $n^{th}$ trailing echo of longitudinal ultrasonic waves. In the above example, if the $3^{rd}$ trailing echo were used, one would substitute 3 for n.

The delay between consecutive echoes, τ, may then be determined by applying a cross-correlation method to a pair of relatively good quality neighboring trailing echoes. Other combinations of trailing echoes may also be used. For example, if the $1^{st}$ and $3^{rd}$ trailing echoes are used, then the r value would be the time delay between these two trailing echoes divided by 2.

Figure 14:
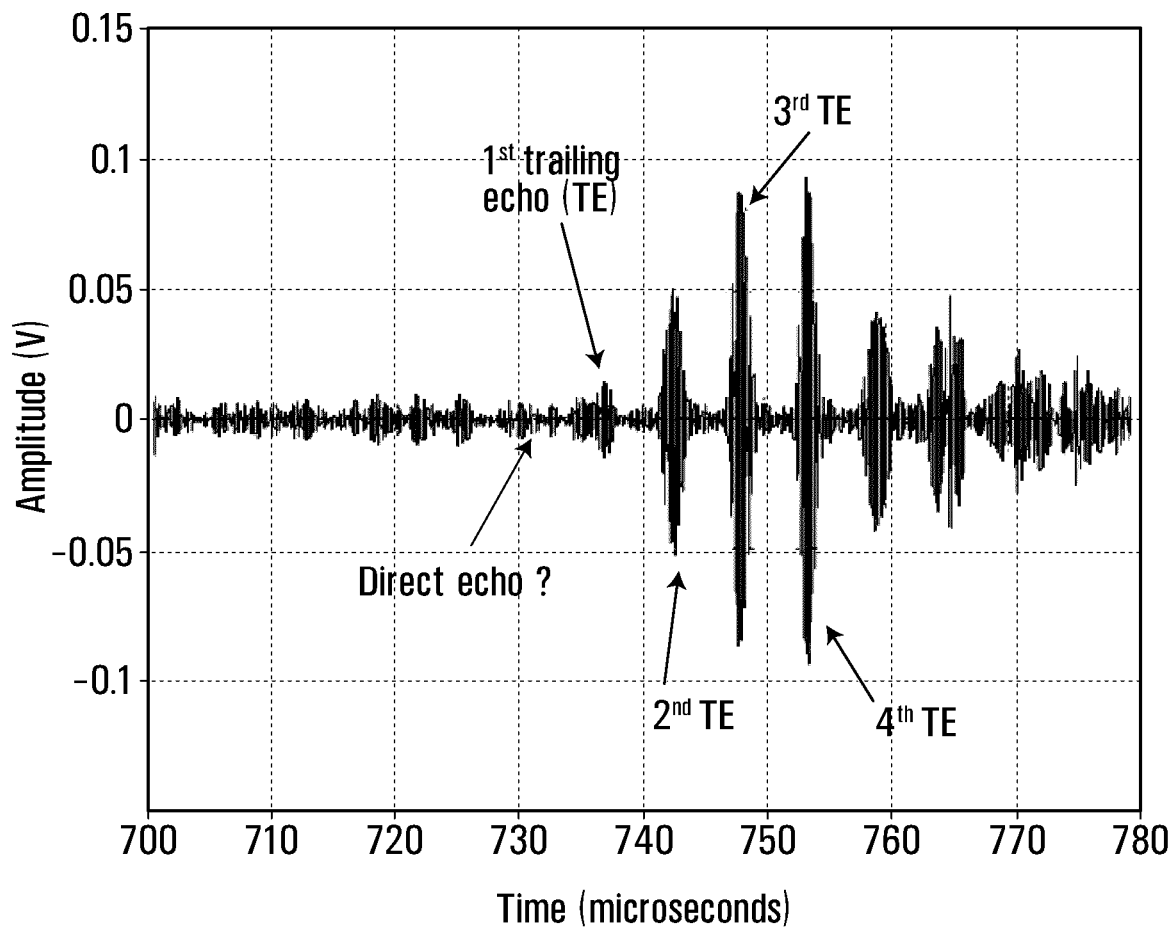
FIG. 14 shows a further longitudinal ultrasonic wave echo signal.

When a rod is stressed, the ultrasonic signal waveform can change either due to a stress change or a bolt deformation. FIG. 14 shows an echo signal obtained for the same rock bolt as in FIG. 13 after eight load cycles and following a load release. Compared to FIG. 13, in addition to an increase of TOF, the direct echo is more difficult to discern due to noise, as is indicated by the question mark next to the words "Direct echo". Thus, if a user were to proceed to monitor the condition of a rock bolt, he or she may not be able to identify which echo should be used. For instance, he or she may mistake the $4^{th}$ trailing echo for the $3^{rd}$ one and as a result produce an erroneous assessment of the condition or change in condition of the rock bolt.

In some embodiments, it may be possible to identify the desired longitudinal ultrasonic echo by tracking the corresponding shear ultrasonic waves or echoes.

Figure 15A:
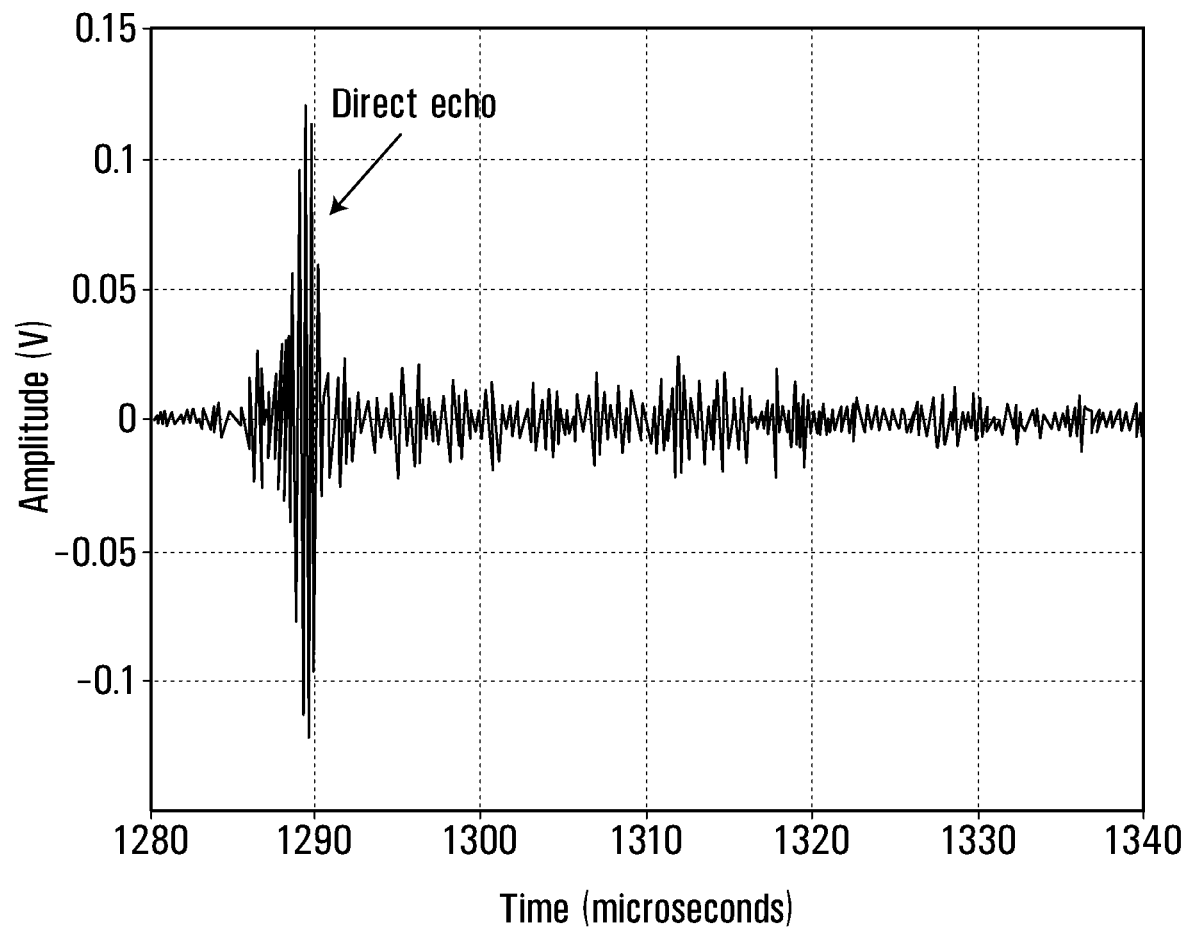
FIG. 15A shows a shear ultrasonic wave echo signal obtained at the same time as the longitudinal ultrasonic wave echo signal in FIG. 13.
Figure 15B:
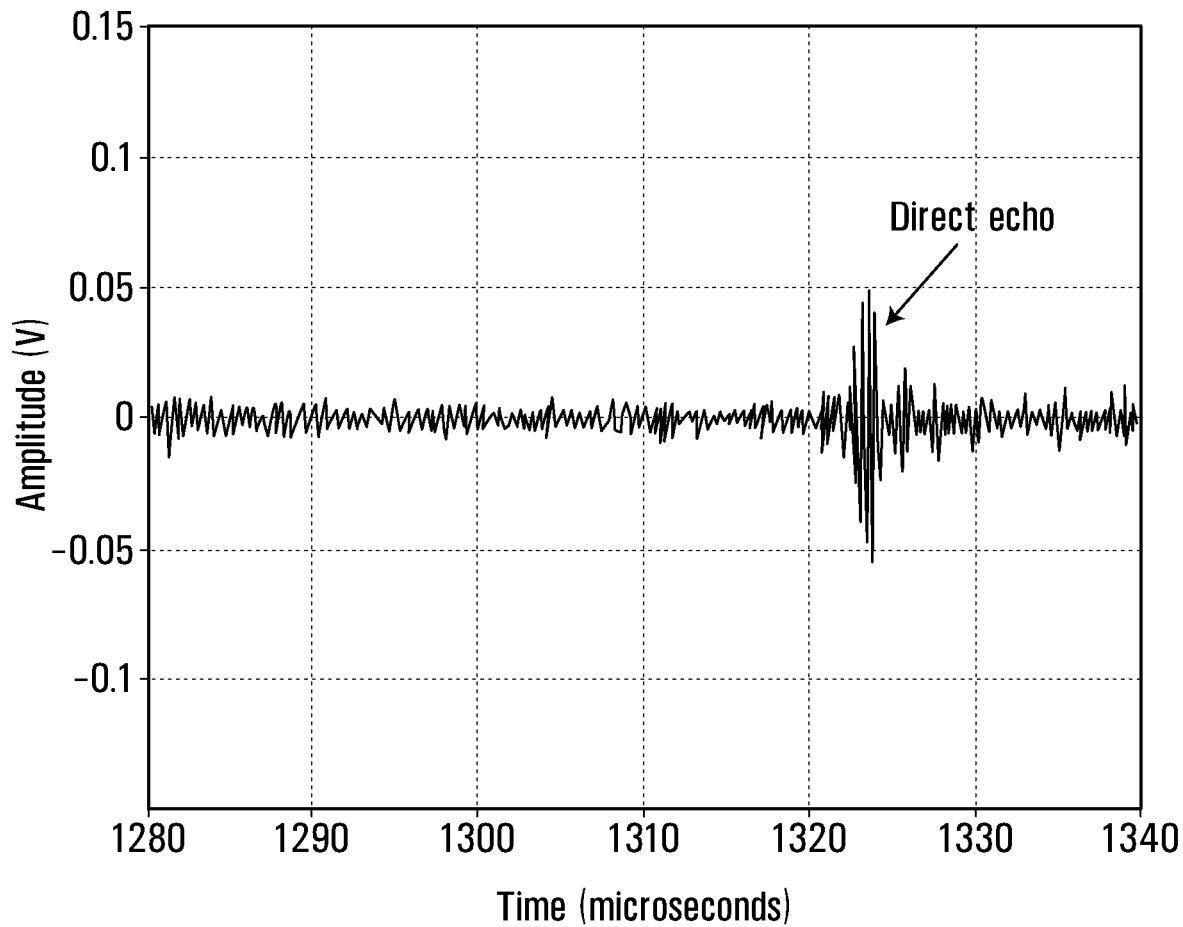
FIG. 15B shows a shear ultrasonic wave echo signal obtained at the same time as the longitudinal ultrasonic wave echo signal in FIG. 14.

FIG. 15A and FIG. 15B show shear ultrasonic wave echo signals obtained at the same moments that the longitudinal ultrasonic wave signals shown in FIGS. 13 and 14, respectively, were obtained. FIG. 15A corresponds to FIG. 13 and FIG. 15B corresponds to FIG. 14.

In this regard, it is noted that a shear ultrasonic wave propagating along the shank direction of a rock bolt does not undergo mode conversion and thus does not convert to longitudinal ultrasonic waves. As such, there are no trailing echoes identified in FIGS. 15A and 15B. Accordingly, tracking of shear ultrasonic wave echoes may be easier than tracking longitudinal ultrasonic wave echoes.

Figure 16:
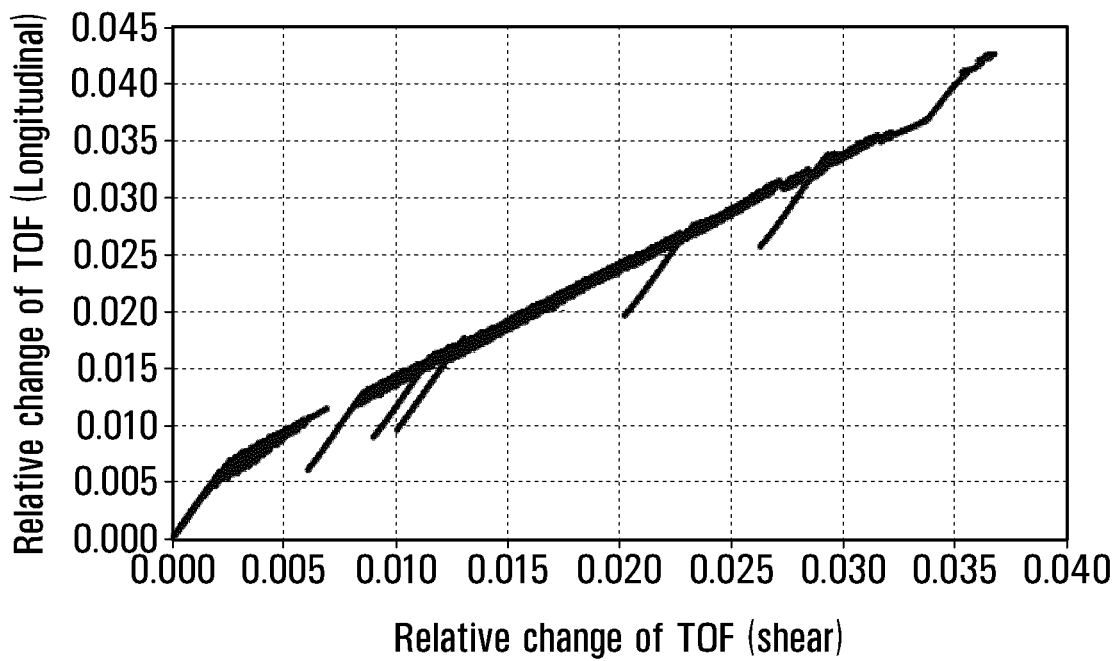
FIG. 16 is a plot of the relationship between the temperature-corrected relative changes of the time of flights of longitudinal and shear ultrasonic waves during a pull test on a Garford™ yielding-type rock bolt.

Moreover, it is noted that the TOF of a longitudinal ultrasonic wave is more sensitive to load than that of a shear wave. This may be seen in FIG. 16, which shows results obtained in a pull test on a Garford™ dynamic bolt. The relative change of TOF of a longitudinal ultrasonic wave was always larger than that of a shear ultrasonic wave when the bolt was stressed. In other words, the following relation may be given:

$$\frac{\Delta \tau_{L\_direct}}{\tau_{L\_direct0}} > \frac{\Delta \tau_s}{\tau_{s0}} \quad (57)$$

where $\Delta \tau_{L\_direct}$ and $\Delta \tau_s$ are changes of TOF of the direct longitudinal ultrasonic wave echo and of the shear ultrasonic wave echo, respectively, with respect to their respective initial values at a reference or first point in time $\tau_{L\_direct0}$ and $\tau_{s0}$, both after temperature effects having been removed. Relation (57) may be rewritten as $$\Delta\tau_{L\_direct} > \frac{\Delta\tau_s}{\tau_{s0}} * \tau_{L\_direct0} \tag{58}$$

Figure 17:
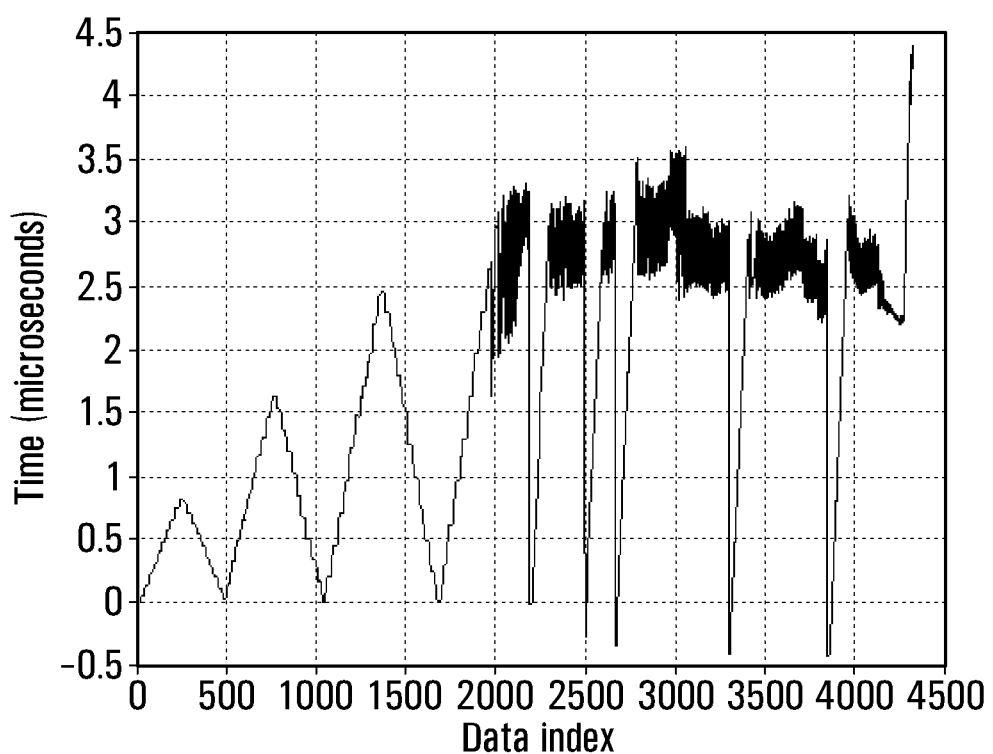
FIG. 17 is a plot of the difference between measured and lower limit estimates of changes of the time of flights of direct echoes of longitudinal ultrasonic waves during the pull test of FIG. 16.

FIG. 17 shows the difference between measured $\Delta\tau_{L\_direct}$ and $(\Delta\tau_s/\tau_{s0})*\tau_{L\_direct0}$ for the same pull test on the Garford™ dynamic bolt. Negative values are a result of measurement errors. It is noted that for this type of rock bolt and for this particular test, $\Delta\tau_{L\_direct}$ does not deviate from $(\Delta\tau_s/\tau_{s0})*\tau_{L\_direct0}$ by more than the time delay, $\tau$, between two sequential trailing echoes, which is shown in FIG. 13.

Accordingly, in some embodiments, it may be possible to determine the TOF of the direct echo of a longitudinal ultrasonic wave by:
(1) Selecting the longitudinal ultrasonic wave echo with the best quality;
(2) Determining the TOF of the selected echo and correcting for the effect of temperature, thereby denoting the temperature-corrected TOF as $\tau_{L\_select}$;
(3) Determining the time delay, $\tau$, between two consecutive echoes of the measured signal;
(4) Calculating $\tau_{L\_select}$-$\tau_{TE\_n\_0}$, where $\tau_{TE\_n\_0}$ is the initial TOF value of the $n^{th}$ trailing echo when the reference was taken at the first point in time, using $\tau_{TE\_0\_0}$ to denote $\tau_{L\_direct0}$ and continuing to do so for all $\tau_{TE\_n\_0}$;
(5) Identifying the value of n (i.e., the $n^{th}$ echo) for which the following condition holds: $0<\tau_{L\_select}-\tau_{TE\_n\_0}<\tau$ (59), discarding the current signal if none of $\tau_{TE\_n\_0}$ satisfies the above condition, because the current signal could have been corrupted by noise; and
(6) Determining $\Delta\tau_{L\_direct}$ as follows: $\Delta\tau_{L\_direct}$= $\tau_{L_{select}}$-n*$\tau$-$\tau_{L\_direct0}$ (60).

It is noted that the above described embodiment may only be applicable as long as $\Delta\tau_{L\_direct}$ does not deviate from $(\Delta\tau_s/\tau_{s0})*\tau_{L\_direct0}$ by more than the time delay between two neighboring trailing echoes. Thus, the applicability of the embodiment to a given type of rock bolt and applicable stress range may be pre-determined in a laboratory or other preliminary test. However, Eq. (56) may be applicable to many or all known types of rock bolts.

Furthermore, compared with fully grouted rock bolts for which trailing echoes are partially absorbed by the grouting material, inspection of high end dynamic bolts (e.g., Garford™ dynamic bolts and Normet™ D-bolts) may be more likely to benefit from the above-described embodiment because they tend to be less grouted. Therefore, trailing echoes may be more pronounced in these rock bolts.

Lab tests have shown that the waveform of a longitudinal wave echo signal may be more sensitive to deformation, for example, bending, of a rock bolt than a shear wave echo signal. Therefore there is provided a method for detecting the bending of a rock bolt. The method comprises measuring changes in waveforms of longitudinal and shear wave echo signals, for example, in terms of amplitude or cross-correlation coefficient of the current waveform with respect to a reference waveform, and then comparing the change in the waveform of the longitudinal wave echo signal with that of the shear wave echo signal. A relatively big change in the waveform of the longitudinal wave echo signal accompanied with a stable waveform of the shear wave echo signal would suggest a deformation of the rock bolt. Furthermore, the difference between the change of the longitudinal waveform and that of the shear waveform may provide a measure of rock bolt deformation, for example, bending.

One way to determine the change of TOF of an echo signal with respect to that of a reference state is to calculate by how much the waveform of the current echo signal has been shifted relative to the reference signal. Doing so would require that the waveform of the reference signal be stored in a digital form in a storage media and recalled when comparison is needed. Since the waveform of a reference signal is unique to each individual bolt, it may be preferable that the waveforms of signals from the same reference reflector of the very same bolt be compared.

If a large number of rock bolts need to be inspected, it may be beneficial to tag each instrumented rock bolt, preferably in an electronic manner, such as with Radio Frequency Identification (RFID) tagging. When inspecting a rock bolt, the inspection system may read the tag, then recall the pre-stored reference waveforms associated with the tag (i.e., associated with the rock bolt being inspected), and then compare the current waveforms with the recalled reference waveforms for determination of TOFs for respective echo signals, and finally record and/or transfer newly obtained inspection information under the same tag identification number. Depending on signal processing and data analysis needs, more historical signals and inspection information associated with the same tag identification number may be recalled.

Moreover, it is noted that, in practice, many rock bolts have a pointed toe to facilitate penetration of the bolt trough the grout during installation. In order to obtain improved quality ultrasonic echo signals from the toe of the rock bolt, it may be desirable to make a square cut at the toe to increase the reflection area. A pointed plastic sheath may be pushed onto the toe end to ease its installation into the grout. A further benefit of such a plastic sheath may be that less ultrasonic energy may be lost to the grout because even a small air gap between the toe and the plastic sheath may prevent the ultrasonic energy from being lost at the toe.

Embodiments of a system for use in rock bolt condition monitoring will now be described in more detail. Embodiments of the system may be used to perform one or more of the above-described embodiments of methods.

In some embodiments, the system for use in rock bolt condition monitoring may be a system for contactless and simultaneous excitation of and detection of ultrasonic waves.

Figure 18A:
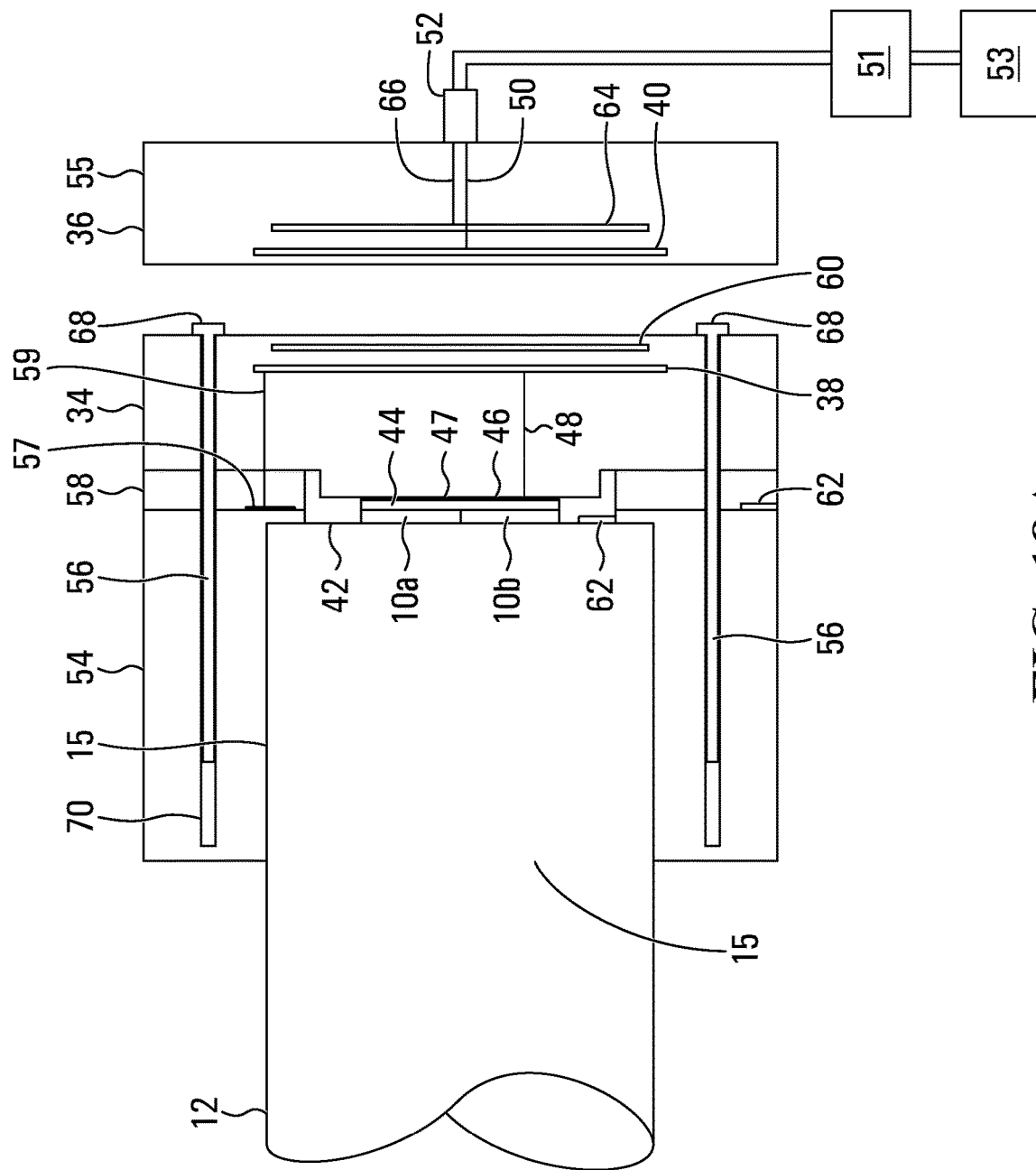
FIGS. 18A and 18B are schematics of systems according embodiments of the present disclosure.

FIG. 18A illustrates a cross-sectional schematic of one embodiment of a system according to the present disclosure. The system may include a first component 34 for fixing to a head 15 of a rock bolt 12 extending out of the rock face and one or more ultrasound transducers 10a, 10b, etc. It is noted that only two ultrasound transducers are shown in FIG. 18A and, as such, some of the following description will refer to two ultrasound transducers. However, as discussed below in respect of FIGS. 21 to 24, the system may include additional ultrasound transducers. The system also includes a second component 36 for bringing into proximity with the first component 34.

In some embodiments, the first component 34 includes a transducer induction coil 38 operably connected, e.g. electrically connected, with the one or more ultrasound transducers 10a, 10b. The second component 36 includes an induction coil 40.

As shown, in use, the one or more ultrasound transducers 10a, 10b may be arranged between the first component 34 and the rock bolt 12. Specifically, in the embodiment shown, the one or more ultrasound transducers 10a and 10b are in operable engagement, e.g. in conductive engagement, with a front surface 42 of the rock bolt 12. The one or more ultrasound transducers 10a, 10b may be mounted on the front surface 42 using a conductive adhesive, such as silver epoxy paste (not shown).

Similarly, the one or more ultrasound transducers 10a, 10b may operably engage the first component 34. For example, a conductive rubber layer 44 may be positioned between the one or more ultrasound transducers 10a, 10b and the first component 34, being in direct contact with the one or more ultrasound transducers 10a, 10b.

Specifically, in some embodiments, the one or more ultrasound transducers 10a, 10b may be coated with a thin electrically conductive layer on both the top and bottom surfaces. These conductive layers may serve as electrodes. The bottom electrode may be conductively bonded, e.g. with the silver epoxy paste, to the front surface 42 of the rock bolt, which is also a conductor. The top electrode would then be in contact with the conductive rubber layer 44.

Moreover, a metallic foil 46 may be arranged between the conductive rubber layer 44 and the first component 34, the metallic foil 46 contacting the conductive rubber layer 44 and a contact surface 47 of the first component 34. A first lead or lead wire 48 may also be provided to operably connect, e.g. electrically connect, the metallic foil 46 to the transducer induction coil 38. Specifically, in some embodiments, the metallic foil 46 may be soldered to one electrical lead of the coil, e.g. lead wire 48.

Because, in some embodiments, the one or more ultrasound transducers 10a, 10b are made of a brittle, piezoelectric ceramic material, which may easily break under an uneven or a pointed force, if the transducer induction coil 38 were directly wired to the one or more ultrasound transducers 10a, 10b, the first lead 48 of the coil could break the material that the one or more ultrasound transducers 10a, 10b are made from when the first component 34 is fixed to the head 15 and a clamping force is applied. The conductive rubber layer 44 may be used to even out the clamping force.

Furthermore, since it may be difficult or impractical to solder the first lead 48 directly to the conductive rubber layer 44, in some embodiments the metallic foil 46 is provided to act as a bridge between the first lead 48 and the conductive rubber layer 44.

In some embodiments, the contact surface 47 may be shaped to accommodate ultrasound transducers of different thicknesses, if multiple ultrasound transducers are to be used simultaneously.

Accordingly, in some embodiments, when in use, the first component 34 may be fixed to the rock bolt head 15 and thereby secure the one or more ultrasound transducer 10a, 10b in place and in operable engagement with the first component 34 and the rock bolt 12.

The second component 36 may include a second lead or lead wire 50 leading from the induction coil 40 to a cable connector 52, which, in use, may be operably connected to signal detection and processing means, such as electronic signal generation, detection and processing means. For example, the system may include an ultrasonic pulser/receiver 51 for powering the induction coil 40 and for capturing electrical signals detected by the induction coil 40. The pulser/receiver 51 may also be connected to an electronic device 53 for data recording, processing and/or display and communication of rock bolt conditions. The pulser/receiver 51 may be controlled either manually or through the electronic device 53, when present.

In some embodiments, the electronic device 53 may be a portable computer equipped with a data acquisition board. The electronic device 53 may be hardwired to an electric outlet, may be powered by battery, and/or may be powered by battery and operable in a wireless manner. The pulser/receiver 51 may be powered directly by the electronic device via a USB port, by battery, or by an AC power source.

In some embodiments, the cable connecting the cable connector 52 to the ultrasonic pulser/receiver 51 may be a 50 ohm coaxial cable. Similarly, the cable connecting the pulser/receiver 51 and the electronic device 53 may be a 50 ohm coaxial cable. In some embodiments, twisted wires or a USB cable may be used for transmission of digitized ultrasound and digital control signals between the pulser/receiver 51 and the electronic device 53.

The electronic device 53 may also include other electronic components known to a person skilled in the art such as a microcontroller, digital signal processing chip, and a RF module.

Moreover, in some embodiments, the functions of the pulser/receiver 51 and the electronic device 53 may be combined in a single integrated device.

In some embodiments, the signal cable connector 52 may be located at a desired location on the second component 36. For example, the signal cable connector 52 may be centred, facing the rock bolt head 15 or on a circumferential side 55 of the first component.

As shown in FIG. 18A, in some embodiments, the first component 34 may be fixed to the rock bolt 12, specifically the head of the rock bolt 15. The first component 34 may be fixed to the rock bolt head 15, via an adaptor 54 mounted on the rock bolt head 15. The first component 34 may be mounted to the adaptor 54 via screws or bolts 56, the adaptor 54 being in turn mounted to the rock bolt head 15. In the embodiment shown, the adaptor circumferentially surrounds the rock bolt head 15.

The adaptor 54 may be affixed to the rock bolt 12 with help of a pair or two pairs of anti-vibrations screws (not shown) through threaded holes (not shown) on opposing sides of the adaptor across the centreline of the rock bolt 12 and in a direction perpendicular to the bolt shank. The screws may be secured with an adhesive, for example, a type of Loctite® Threadlocker glue or a safety wire.

The anti-vibration feature of the screws may be required in field applications to cope with vibrations caused by blasts, seismic activities, or even vibrations of certain rock bolts themselves when stressed beyond the yield (for example, Garford™Dynamic rock bolts).

In some embodiments, the adaptor 54 may also be designed in such a way that it may be screwed directly on the threaded rock bolt head 15. In this case, the adaptor 54 may be secured with application of an adhesive between the threaded surfaces of the rock bolt head 15.

In some embodiments, the adaptor 54 and the first component 34 may be designed and made to be an integral part to be screwed on directly onto the threaded rock bolt head 15.

As shown in FIG. 18A, a further metallic foil 57 may be provided to operably connect, i.e. electrically connect, the adaptor 54 to the transducer induction coil 38 via second lead or lead wire 59. Thus, the further metallic foil 57 may serve to operably, i.e. electrically, connect the bottom electrodes of the one or more ultrasound transducers 10a, 10b to the transducer induction coil 38. Specifically, this may be accomplished if adaptor 54 is made of an electrically conductive metal, and the metallic adaptor 54 is in electrical contact with the rock bolt 12 (another conductor), which is in turn in conductive contact with the bottom electrodes of the one or more ultrasound transducers 10a, 10b.

A rubber spacer 58 may be positioned between adaptor 54 and first component 34. The rubber spacer 58 may be used to allow an adjustable clamping force to be applied to the first component 34 when it is mounted onto adaptor 54 in order to aid in maintaining a suitable operable, e.g. electrical, contact between the various elements of the system that are in operable, i.e. electrical and/or conductive, contact without causing excessive force that may damage the one or more ultrasound transducers 10a, 10b. This may be further aided by the presence of the conductive rubber layer 44, as described above.

Furthermore, in some embodiments, the adaptor 54 and the first component 34 may be fully encapsulated to the rock bolt, for example, with the help of a heat-shrinkable capsule, or other types of capsules that may be shrunk with application of sources other than heat, such as UV irradiation and other chemical or physical means. Encapsulating the adaptor 54 and first component 34 in a capsule may aid in protecting the one or more ultrasound transducers 10a, 10b, the transducer induction coil 38, and any other components from humidity and other contaminants in the environment of the mine or excavation.

Similarly, in some embodiments, the second component 36 may also be encapsulated.

In operation, the second component may be brought into sufficiently close proximity with the first component so as to inductively power the one or more ultrasound transducers 10a, 10b, thereby exciting these ultrasound transducers to emit ultrasonic waves.

As described above, in embodiments where the two or more ultrasound transducers 10a, 10b are arranged in a side-by-side configuration, their bottom electrodes are electrically connected by being in contact electrically with the front surface 42 of the rock bolt 15 (i.e. an electrical conductor); and the top electrodes are also electrically connected by being in contact electrically with the conductive rubber layer 44.

Therefore when the transducer induction coil 38 receives an electromagnetic excitation from the induction coil 40, excited electrical voltage between two lead wires 48, 59 of the induction coil 38 will apply to all of the one or more ultrasound transducers 10a, 10b. In other words, all of the one or more ultrasound transducers 10a, 10b may be excited concurrently.

When two or more ultrasound transducers are arranged in a stacked configuration (as discussed below), electrodes between neighbouring ultrasound transducers that are in contact may be electrically connected with application of an adhesive between the ultrasound transducers for improved acoustical and electrical coupling between the transducers. In some embodiments, the adhesive could be a high performance silver paste. As such, when the top electrode of the top ultrasound transducer and the bottom electrode of the bottom ultrasound transducer are each electrically connected to one of the lead wires of the induction coil 38, all of the ultrasound transducers may be excited concurrently when the transducer induction coil 38 receives an electromagnetic excitation from the induction coil 40.

Moreover, when the ultrasonic echoes are then detected by the one or more ultrasound transducers 10a, 10b, the generated signals would then be transmitted inductively from the transducer induction coil 38 to the induction coil 40.

In some embodiments, a Radio Frequency Identification (RFID) tag 60 may be included with, positioned in or embedded in the first component 34 either in front, behind, or beside the transducer induction coil 38. In the embodiment shown in FIG. 18A, the RFID tag 60 is positioned in front of the transducer induction coil 38. The RFID tag 60 may serve to identify the rock bolt 12 whose condition is being monitored.

In some embodiments of a system, a passive RFID temperature transponder 62 may be included for measurement of a temperature of the rock bolt head 15. The RFID temperature transponder 62 may be mounted onto the rock bolt head 15 or onto the adaptor 54, two possible placements being shown schematically in FIG. 18A.

Accordingly, in some embodiments, the second component 36 may also include an RFID antenna 64. The RFID reader or antenna 64 may be behind the induction coil 40 so it does not get in the way of the induction coil.

Thus, if present, the RFID reader 64 may be used to read the RFID tag 60 and/or the passive temperature transponder 62 and pass these readings via signal wire 66 to the cable connector 52 and on to the signal processing means.

Figure 18B:
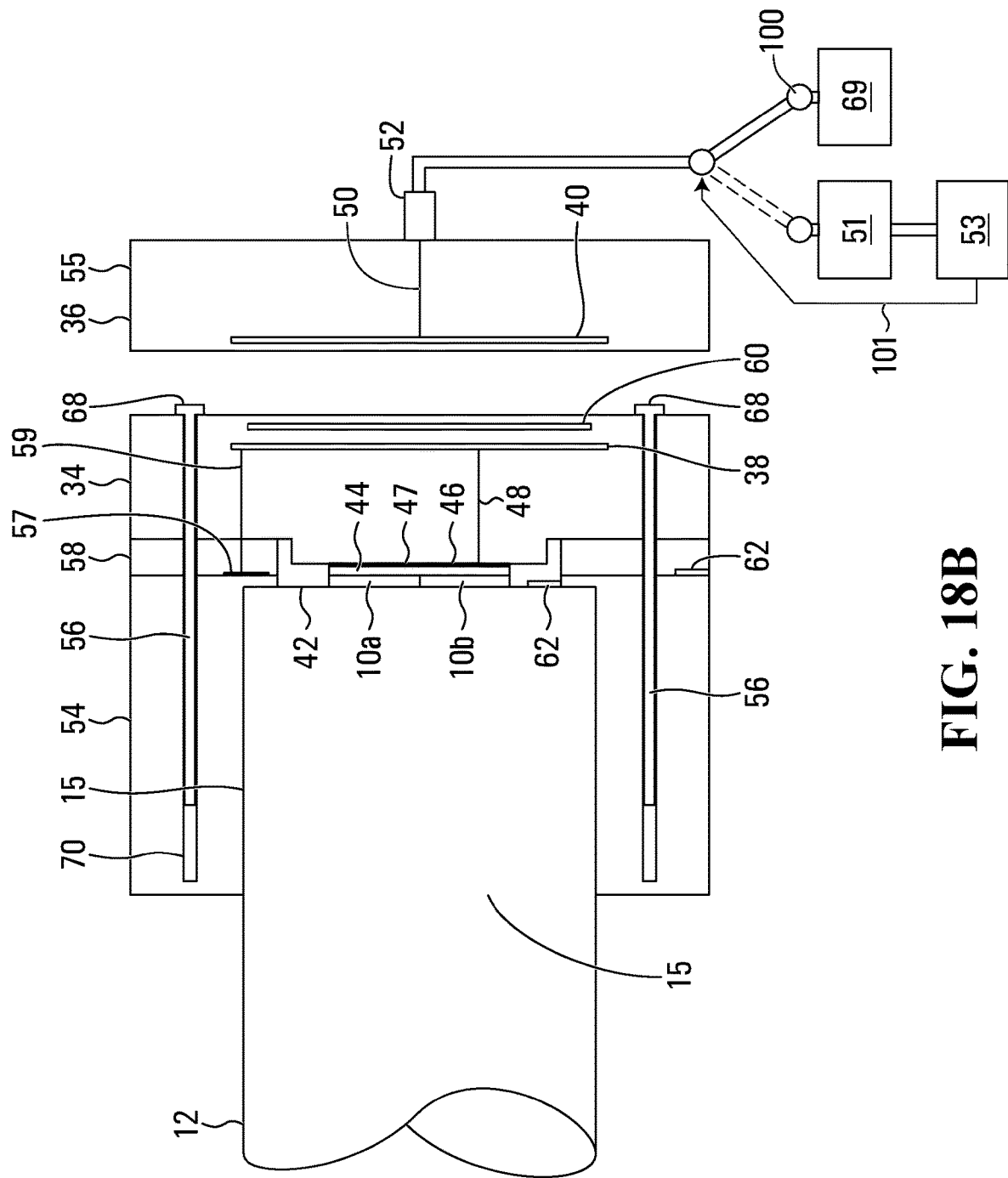

FIG. 18B presents a variant of what was presented in FIG. 18A. As shown in FIG. 18B, in some embodiments, the induction coil 40 may be used for RFID tag reading in place of the antenna 64, in which case the antenna 64 is not necessary. Conversely, the antenna 64 may be used in place of the induction coil since RFID antenna itself may be a coil and in which case the induction coil 40 may not be necessary. In short, the induction coil 40 and the antenna 64 may be replaced with a single coil (for example, coil 40). When starting the inspection, the coil 40 may be connected to an electronic device 69 for reading the RFID. Then, the coil 40 may be switched to different electronic devices 51 and 53 for generating, detecting and processing of ultrasound signals and displaying of results. Switching between the device 69 and the device 51 (and/or device 53) may be achieved via a switch 100. The switch 100 may be manual or electronic such as a solid state relay. In the latter case the switch 100 may be controlled by the electronic device 53 via a command signal 101.

The first and second components 34, 36 may be manufactured or produced in a variety of ways, such as by 3D printing, injection molding or cold-molding in a nonconductive resin. Thus, various components such as the transducer induction coil 38, the inducer coil 40, the RFID reader 64, the first and second lead wires 48, 59, the signal wire 66 and other possible components may be embedded in the cold-molded resin or injection-molded or 3D-printed component. However, there may be other suitable ways known to persons skilled in the art to produce the first and second component 34, 36 and attach the various components.

The adaptor 54 may be made of steel or another suitable metal such as aluminium.

Different configurations, geometries and shapes of the first and second components 34, 36 are possible. In some embodiments, the second component 36 is configured for selective mounting to the first component 34.

In some embodiments, due to the configuration and shape of the first and/or second components 34, 36, it may be possible to bring the second component 36 into close proximity or into contact with the first component 34 despite the presence of bolt heads 68 of the bolts 56 or mount the second component 36 to the first component 34, as desired.

One possible such configuration of the first and second components 34, 36 will now be described in reference to FIGS. 19A and 19B.

Figure 19A:
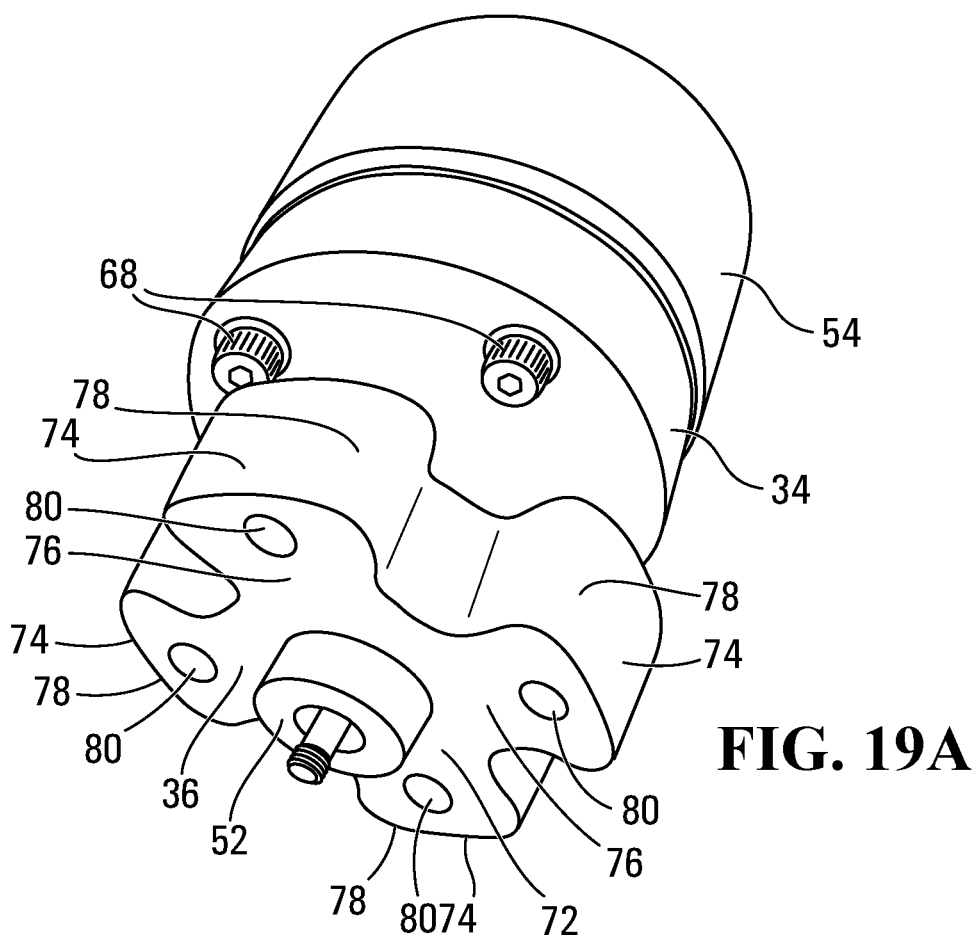
FIGS. 19A and 19B are perspective views of embodiments of the components of the systems of FIGS. 18a and 18B.

As shown in FIG. 19A, the first component 34 may be cylindrical with boreholes 70 (shown in cross-section in FIG. 18A) spaced at approximately equal distances around the circumference of the first component 34, with which the first component 34 may be mounted to the adaptor 54.

Figure 19B:
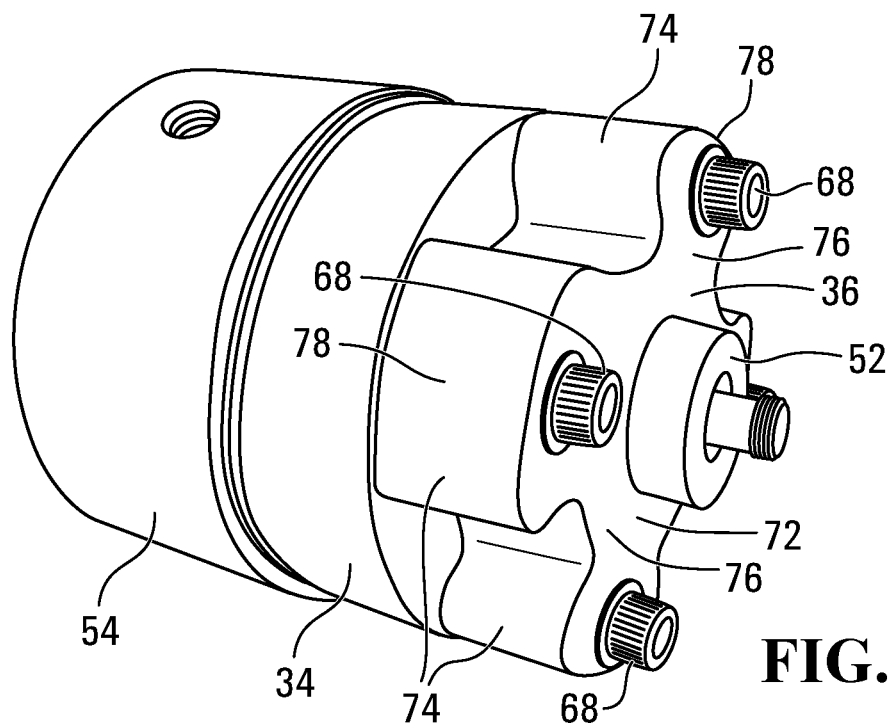

As shown in FIGS. 19A and 19B, in some embodiments, the second component 36 may be configured to have a center portion 72 and multiple projections 74 projecting outward from the center portion 72 in the same plane as the center portion 72. As they extend from the center portion 72, the projections 74 flare out from a narrower proximal portion 76 to a wider, distal portion 78. Thus, the projections 74 provide for a gear-like shape of the second component 36.

The projections 74 are spaced from each other such that, in one orientation, the second component 36 may be brought into close proximity or contact with the first component 34, with the heads 68 of the bolts 56 extending out from the first component 34 and into the spaces between the projections 74.

Meanwhile, in another orientation in which the second component 36 is rotated clockwise or counterclockwise, as seen in FIG. 19B, boreholes 80 in each of the projections 74 line up with the boreholes 70 in the first component 34. Thus, the second component 36 may be mounted to the first component 34 using the same bolts 56 that are used to mount the first component 34 to the adaptor 54.

The above described one or more ultrasound transducers 10a, 10b may be piezoelectric ultrasound transducers. Specifically, in some embodiments, one or more of the ultrasound transducers may be Lead zirconate titanate (PZT) ultrasound transducers.

As one example, the ultrasound transducers may be made of APC™ 855 (Navy type VI) material produced by APC International, Ltd. Specifically, in some embodiments, one or more of the ultrasound transducers may be PZT discs or plates.

Under excitation by a high voltage pulse, the converse piezoelectric effect will cause a piezoelectric ultrasound transducer to vibrate at a resonance frequency of its thickness. The vibrations thus created will transmit to and propagate through the rock bolt 12 as an ultrasonic wave. When an echo reflected from a reflector inside the rock bolt 12 hits the same ultrasound transducer, the piezoelectric effect of the ultrasound transducer will convert the mechanical vibration of this echo to an electrical voltage signal which may be captured with an ultrasonic receiver, such as the pulser/receiver 51. As one example, excitation pulses of 475 volts with a pulse energy of 300 microjoules were applied to the induction coil 40 to produce echo signals of sufficient strength and quality during a pull test on a CW20 rebar rock bolt.

Since ultrasound transducers may be operated in thickness vibration mode, the operating frequency of the ultrasound transducers is mainly determined by the thickness of the PZT disc or plate. It may be possible to select a thickness at which the PZT disc/plate resonates at a desired operating frequency for optimal performance at that frequency. Moreover, besides the thickness, the other geometric dimensions of the ultrasound transducers may be determined based on available area on the front surface 42 of the rock bolt 12, as well as the acoustic properties and the geometry and length of the rock bolt 12.

Furthermore, because the size of an ultrasound transducer may affect its performance, when multiple ultrasound transducers are used concurrently, it may be necessary to use different dimensions for different types of ultrasound transducers in order to achieve balanced performances. For example, it may be desirable to have similar amplitudes for longitudinal and shear ultrasonic wave echoes from the toe end of the rock bolt.

As one example, concurrent use of a 7.5 MHz, 4.0 mm×6.5 mm longitudinal ultrasonic wave PZT of APC™ 855 and a 2.5 MHz, 7.4 mm×7.4 mm shear ultrasonic wave PZT of APC™ 855 in a side-by-side configuration produced sufficiently strong longitudinal and shear ultrasonic wave echo signals of sufficient quality in the pull test of a Garford™ Dynamic rock bolt. Sensor layout in FIG. 21A was used.

As for the design of induction coils, the wire diameter, size and number of turns of the coil may be optimized to match the electromechanical characteristics of the ultrasound transducers being used for optimal excitation and detection performance at a desirable and/or predetermined operation frequency of the ultrasound transducers. In one example, five-turn coils of 30 mm coil dimeter and made of 0.15 mm diameter enamel copper wire produced satisfactory results.

As noted above, each ultrasound transducer may be sized to the specific type of rock bolt and/or condition to be monitored. Thus, one may be able to obtain an ultrasound transducer plate and cut portions of the plate into a desired shape and size for use in the above-described systems and methods.

Moreover, under a pulse excitation, an ultrasound transducer may resonate not only in the thickness direction to produce ultrasonic waves of desired frequencies, but also in lateral directions to create undesired vibrations at much lower frequencies. Those noises may overlap desired ultrasound signals and echoes for measuring TOFs. Furthermore, when more than one ultrasound transducers are used concurrently, ultrasonic waves generated by those ultrasound transducers may overlap each other as well.

Therefore, it may be desirable to use ultrasound transducers of distinct frequency bands and individually apply a band-pass digital filter to the frequency band of each ultrasound transducers to single out a useful echo signal. Such a band pass filter may be part of the signal processing means, such as the electronic device 53.

Figure 20A:
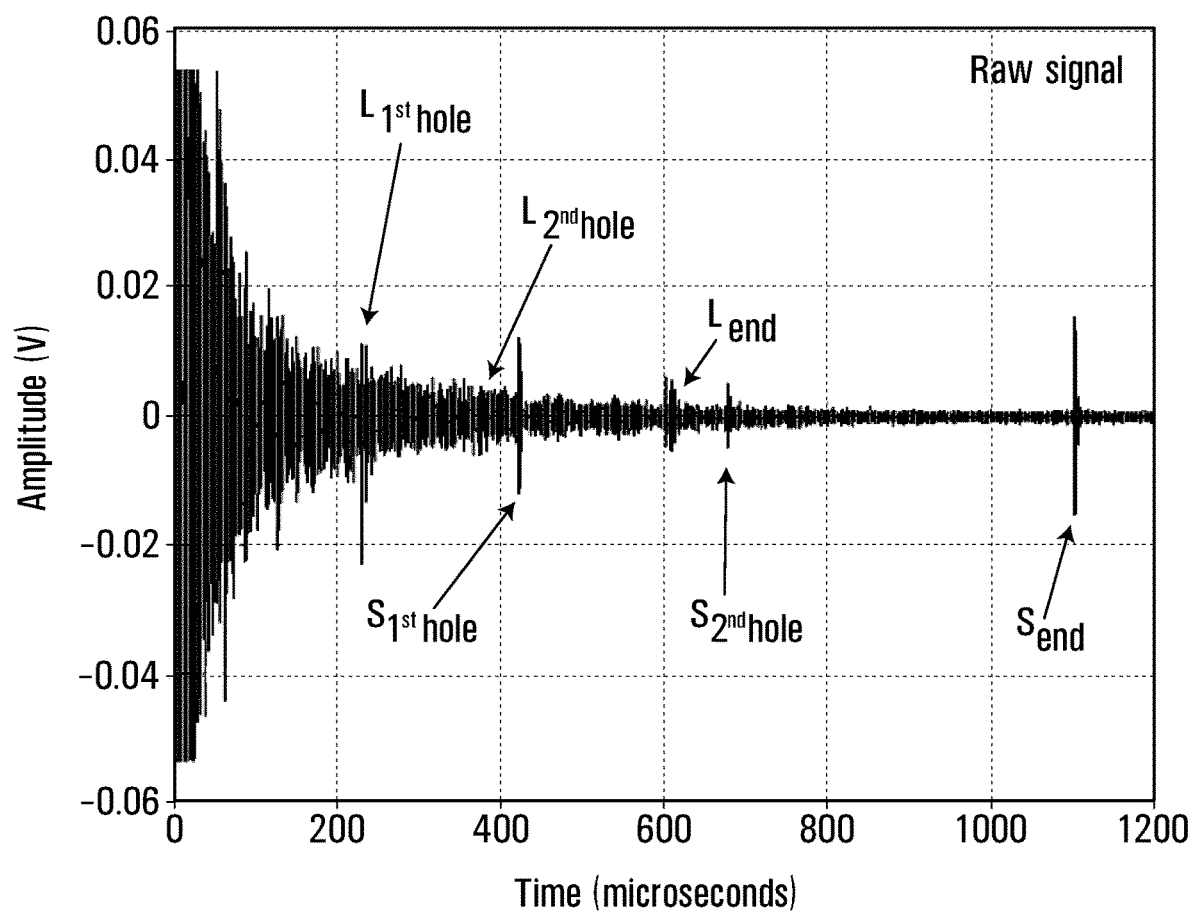
FIG. 20A shows a raw echo signal from various reference points on a C20W rebar bolt grouted in a steel tube.
Figure 20B:
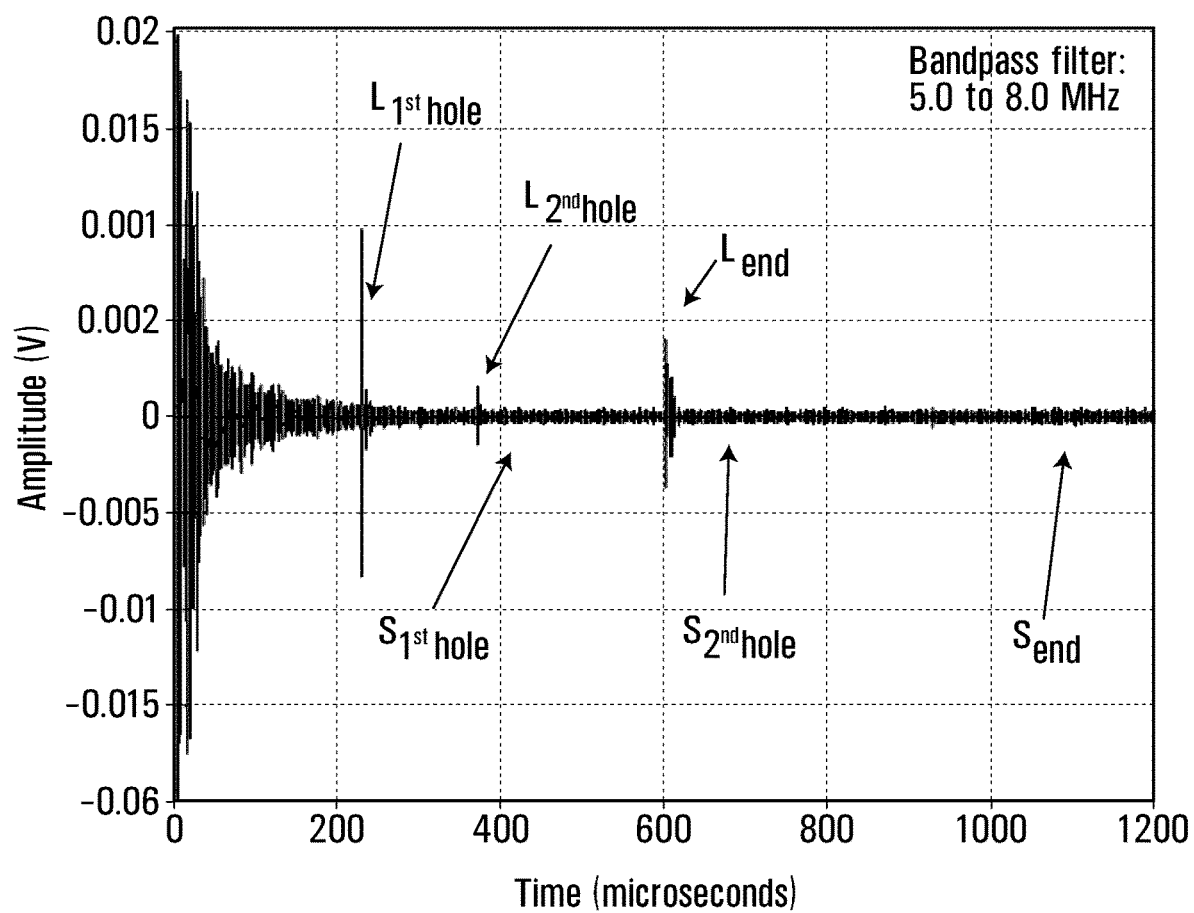
FIGS. 20B and 20C show the effect of applying bandpass filters to the signal of FIG. 20A.
Figure 20C:
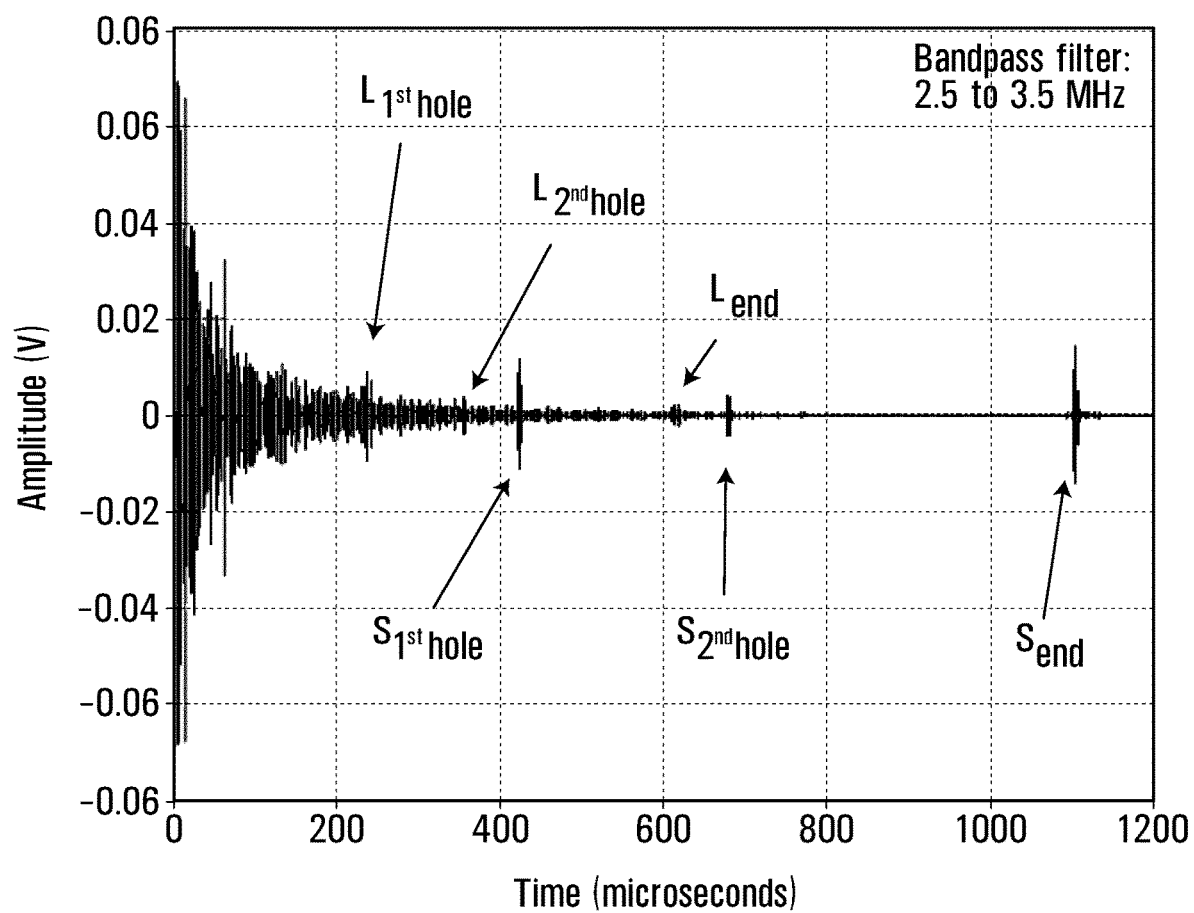

One example of the application of a band-pass filter will now be described in reference to FIGS. 20A to 20C. FIG. 20A displays a trace of raw ultrasound echo signal from various reference points on an instrumented C20W rebar bolt grouted in a resin. $L_{1st\ hole}$, $L_{2nd\ hole}$ and $L_{end}$ represent echoes of longitudinal waves from a $1^{st}$ and $2^{nd}$ 1 mm diameter through holes and from the rock bolt toe end, respectively, and $S_{1st\ hole}$, $S_{2nd\ hole}$ and $S_{end}$ are the echoes of shear waves from corresponding reference points. Since a longitudinal ultrasonic wave transducer and a shear ultrasonic wave transducer were excited and used to receive echoes simultaneous, all the echoes appear in the same trace of signal. Furthermore, lateral vibrations of each ultrasound transducer create low frequency noises in the signal, making the signal-to-noise ratio sufficiently low such that the signal may be less useful than desired. Because the longitudinal and shear ultrasound transducers operate at quite distinct nominal center frequencies, i.e., 7.5 MHz and 2.5 MHz, respectively, the quality of the signal may be improved by applying a proper digital filter. In this regard, FIG. 20B displays the same signal as in FIG. 20A but with a 5.0 to 8.0 MHz band-pass filter applied. Similarly, FIG. 20C displays the same signal as in FIG. 20A but with a 2.5 to 3.5 MHz band-pass filter applied. As can be seen, application of the bandpass filter may aid in differentiating between echoes and noise in the signal. In some embodiments, a different digital filter may be applied to each individual echo for improved signal to noise ratio.

While embodiments of a contactless system for use in rock bolt condition monitoring has been described, other embodiments of a system for use in rock bolt condition monitoring are possible where induction coils are not used.

For example, in some embodiments, the bottom and top electrodes of the one or more ultrasound transducers 10a, 10b may be operably connected directly to the cable connector 52 without using any induction coils. This may be the case where an automated wireless inspection system is integrated to the first component 34.

Moreover, in some embodiments, the functions of pulser/receiver 51 and/or the electronic device 53 may be incorporated directly into the first component 34, for example cold moulded directly into the first component 34, or incorporated into an electronics box that is fixed to the first component 34. In some embodiments, everything shown in FIG. 18A, except the rock bolt, may be provided as a single component that is to be screwed and/or glued onto the threaded head 15 of the rock bolt 12.

In some such embodiments, only one temperature transponder (RFID or otherwise) may be included, either directly on the rock bolt head 15 or on another portion of the system that is in thermal equilibrium with the rock bolt head 15.

Furthermore if one of the one or more ultrasound transducers 10a, 10b are used in a passive way as a vibration sensor, as discussed below, the use of inductions coils may be undesirable because they may cut off all frequencies lower than 1 MHz that would have been detected by the one or more ultrasound transducers 10a, 10b without the coils.

Various possible configurations of the one or more ultrasound transducers 10a and 10b will now be described in reference to FIGS. 21A-F, 22, 23A, 23B, and 24A-F.

At the outset, it is noted that the various configurations of the ultrasound transducers described below may be used in the embodiments of the contactless system described above, or in different embodiments of a system for use in rock bolt condition monitoring, for example embodiments that are not contactless.

Figure 21A:
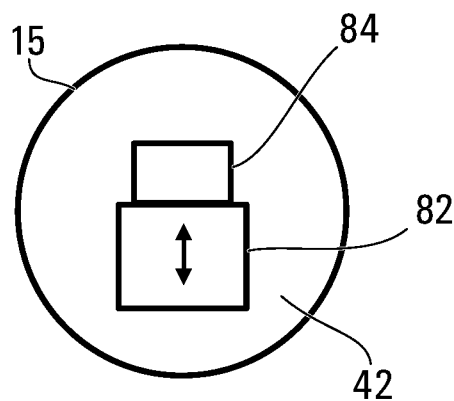
Figure 21B:
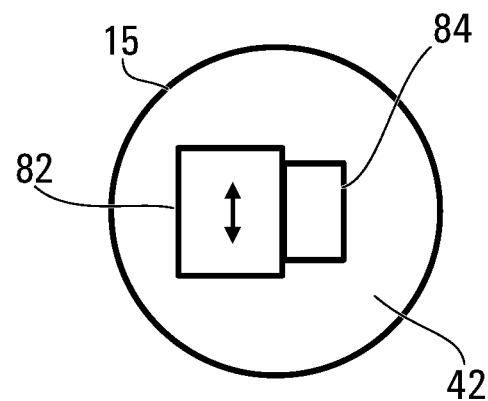

Referring to FIGS. 21A and 21B, in some embodiments, a system may include a first ultrasound transducer 82 configured to emit shear ultrasonic waves and a second ultra sound transducer 84 configured to emit longitudinal ultrasonic waves. In use, the first and second ultrasound transducers 82, 84 are arranged in a side-by-side configuration on the head 15 of a rock bolt 12, particularly on the front surface 42 of rock bolt head 15. For example, the first and second ultrasound transducers 82, 84 may be mounted on the front surface 42 using conductive silver epoxy paste, as described above.

In some embodiments, the first ultrasound transducer 82 is configured to emit shear ultrasonic waves at a first frequency. The first frequency may be between 1 to 10 MHz, for example 2.5 MHz.

In some embodiments, the second ultrasound transducer 84 is configured to emit longitudinal ultrasonic waves at a second frequency. The second frequency may be between 1 to 10 MHz, for example 7.5-8 MHz.

The first and second ultra sound transducers 82, 84 may be configured as rectangular piezoelectric plates that are arranged in parallel and side-by-side in substantially the same plane on the front surface 42 of the rock bolt head 15.

Due to the side-by-side configuration of the first and second transducers 82, 84, it may be possible to better separate the signal response of each of the shear and longitudinal ultrasonic waves. For example, by applying a band-pass filter to the signal received from the ultrasound transducers, it may be possible to better isolate the signal of each of the shear and ultrasonic longitudinal waves such that the TOFs may be more accurately determined in the methods disclosed and described above.

Other shapes, configurations and relative arrangements of the ultrasound transducers 10a, 10b, 82, and 84 are also possible. For example, in some embodiments one or more of the ultrasound transducers may be circular or have a different geometric shape. The spacing between the transducers may be varied as well as their relative location to each other. Such variations may depend on a variety of factors, including the shape, material and type of the rock bolt whose condition is being monitored.

Similarly, the frequency at which each of the one or more ultrasound transducers is configured to emit waves may vary depending on the characteristics of the rock bolt being monitored. Certain frequencies or frequency ranges may be more desirable for a given wave type depending on the type of rock bolt being monitored, as noted above.

Thus, prior to installation of the apparatus in situ one may conduct initial testing, for example in a laboratory setting, to determine the optimal frequency, shape, configuration and arrangements of the ultrasound transducers for a particular rock bolt. In this sense, embodiments of the system for use in rock bolt condition monitoring may be tailored to a particular type of rock bolt or rock bolt class.

Figure 21C:
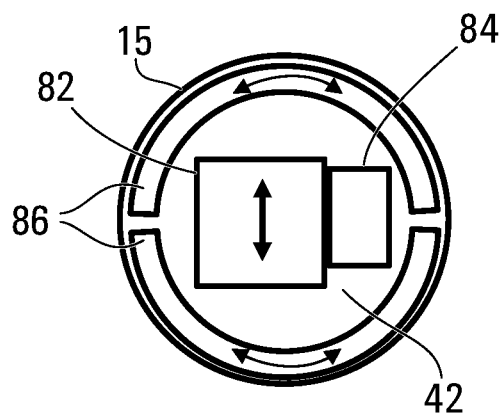

As also shown in FIG. 21C, some embodiments of the system include additional ultrasound transducers, such as torsional ultrasound transducers 86. This may be desirable if, for example, different characteristics of the rock bolt are of interest. Specifically, a torsional wave propagating along the rock bolt may cause the bolt shank surface to vibrate in a circumferential direction parallel to the surface. The presence of grout may absorb torsional wave energy and affect its propagation speed. Therefore torsional ultrasonic waves may possibly aid in sensing the grouting quality. Accordingly, in some embodiments, additional transducers may also aid in acquiring additional information about the condition or change in condition of the rock bolt.

The torsional ultrasound transducers 86 may be arranged along the circumference of the front surface 42 of the rock bolt head 15. Torsional ultrasonic waves may be well suited for monitoring the grout surrounding the rock bolt when the rock bolt is installed.

Figure 21D:
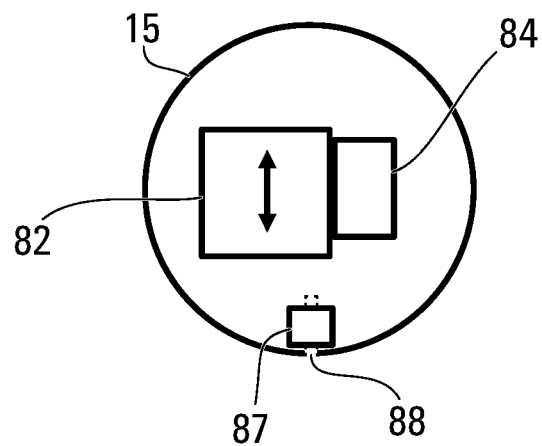

As shown in FIGS. 21D and 21E, an additional ultrasound transducer 87 may be a longitudinal or a shear wave ultrasound transducer placed next to the transducers 82 and 84 for detection of echo signals and determination of the TOF from a reference reflector in the rock bolt head 15 stress-free zone. Owing to the short distance between the transducer 87 and this reference reflector, the reflector may be a shallow hole 88 that can be seen by the transducer 87 but not too deep to interfere with ultrasonic waves generated by the transducers 82 and 84.

Furthermore, the transducer 87 may be of a smaller size than the transducers 82 and 84 to minimize its energy consumption. Moreover, the transducer 87 may be of a higher center frequency in such a way that the higher frequency waves generated and detected by the transducer 87 die out significantly before the lower frequency waves generated by the transducers 82 and 84 and reflected from farther reference reflectors are detected. It is to be noted that a higher frequency ultrasonic wave may only be able to travel a much shorter distance than a lower frequency one due to a much higher acoustic attenuation of the higher frequency wave. This arrangement of transducer 87 may be used for determining temperature-corrected relative change in the TOF using one of Eqs. (45), (46), (48) and (49) where the TOF between the transducer 87 and the reference hole 88 is needed.

The two-headed arrows in FIGS. 21A to 21D, 21F, and 22 indicate the particle vibration direction that is caused by the shear and torsional waves being emitted. This is referred to herein as the polarization of the waves. Depending on the characteristics of the rock bolt being monitored, different polarizations of the ultrasonic waves may be desirable. For example, for a rock bolt with a non-circular circumferential geometry, such as the rebar bolt 89 shown in section in FIG. 22, the orientation of the polarization direction of the shear ultrasonic waves may make a difference in terms of signal quality and information carried by the signal.

Moreover, it may be possible to selectively orient the shear wave polarization either along or perpendicular to a ridge line 90 of the rebar bolt 89 to either favour the strength of an echo signal or sensitivity to transverse deformation of the bolt. The same may apply to other types of bolts that possess a certain symmetry about the axial direction, for example, a DYWIDAG THREADBARE), or a D-Bolt.

In embodiments where one longitudinal ultrasound transducer 84 and one shear wave transducer 82 are used, it may be preferable to use the shear wave transducer 82 for detection of echo signals and determination of the TOF from a reference reflector in the rock bolt head 15 stress-free zone. This is because the speed of shear waves is more sensitive to temperature (as can be seen in FIG. 2) and slower than that of longitudinal waves (i.e., larger TOF); therefore for a given absolute measurement error in TOF measurement, the shear wave detection may provide a better accuracy on measurement of relative change of TOF. To achieve this, it is preferable to drill the reference hole 88 underneath the location of the shear wave transducer 82 as illustrated in FIG. 21F.

In yet other embodiments, different configurations of the one or more ultrasound transducers are possible. FIGS. 23A and 23B show a configuration of three ultrasound transducers: the first and second transducers 82, 84 in a side-by-side configuration, as described above, and a third ultra sound transducer 92 in a stacked configuration with the first ultrasound transducer 82.

In other embodiments, the third ultrasound transducer 92 may also be stacked on the second ultrasound transducer 84.

Depending on required signal quality, the third ultrasound transducer 92 may be either above or underneath the first or second ultrasound transducers 82, 84.

In some embodiments, the third ultrasound transducer 92 may be configured to emit shear ultrasonic waves, while, in other embodiments, the third ultrasound transducer 92 may be configured to emit longitudinal ultrasonic waves.

In embodiments where the third ultrasound transducer 92 is configured to emit longitudinal ultrasonic waves, it may be desirable that the third ultrasound 92 transducer emit waves at a third frequency that is higher than the first and second frequencies of the first and second ultrasound transducers 82, 84. This may favor detection of echo signals and determination of the TOF from a reference reflector in the rock bolt head 15 stress-free zone, as discussed above. Accordingly, the operating frequency of the third ultrasound transducer 92 may be chosen in such a way that high frequency waves generated by the third ultrasound transducer 92 are fast attenuated so as not to interfere with detection of echo signals generated by the other two ultrasound transducers that arrive later.

In embodiments where the third ultrasound transducer 92 is configured to emit shear ultrasonic waves, its polarization direction may be perpendicular to that of the first ultrasound transducer 82 so that the difference in polarization is 90°. Moreover, in addition to measurement of axial stress and plastic deformation, having two shear ultrasound transducers configured with perpendicular polarizations may provide an extra means for detection of rock bolt bending as shear waves with two different vibration directions could behave differently when the rock bolt is bent.

FIGS. 24A and 24B shows a further embodiment, where there are three stacked ultrasound transducers, two of which are ultrasound transducers for emitting shear ultrasonic waves with polarization directions perpendicular to each other and one of which, namely the most bottom one, is a ultrasound transducer for emitting longitudinal ultrasonic waves. Thus, for example, the bottom most transducer is the second ultrasound transducer 84, the middle transducer is the first ultrasound transducer 82 and the top transducer is the third ultrasound transducer 92. The order of these ultrasound transducers may be altered to suit specific rock bolts and detection needs. In addition to measurement of axial stress and plastic deformation, this sensor configuration may also detect whether the rock bolt is bent because shear waves with two different vibration directions could behave differently under bending.

It is noted that in the embodiments described above, the shape, dimensions, locations and stack order may be altered and tailored to specific rock bolts and monitoring needs.

Figure 24C:
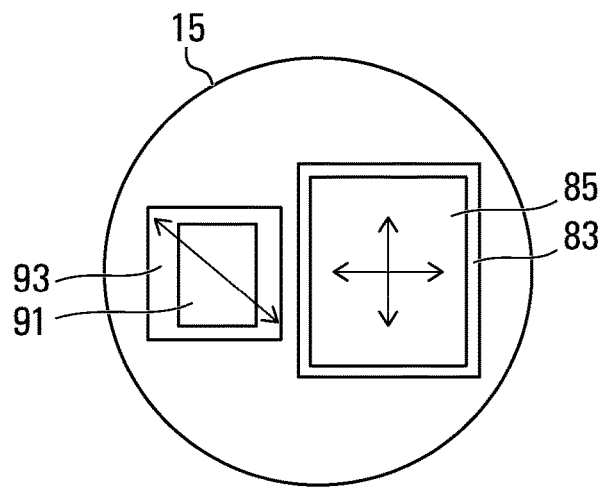
FIGS. 24C and 24D are top and side schematic views of a transducer configuration of a system according to another embodiment of the present disclosure.
Figure 24D:
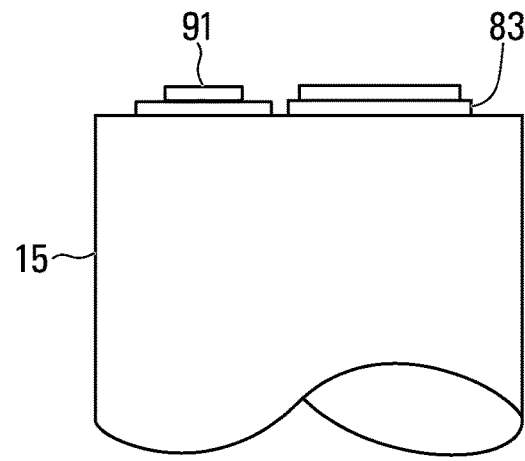

Moreover, in some embodiments, a fourth ultrasound transducer configured to emit shear ultrasonic waves could be stacked on any of the ultrasound transducers configured to emit shear or longitudinal ultrasonic waves. The fourth ultrasound transducer may have a polarization such that the polarization of the ultrasound transducers configured to emit shear ultrasonic waves differ from each other by 45°. One such possible configuration is shown in FIGS. 24C and 24D, where first and second shear ultrasound transducers 83 and 85, respectively, are stacked, their polarizations being 90° apart, and a longitudinal ultrasound transducer 91 is stacked on a third shear ultrasound transducer 93, the polarization of the third shear ultrasound transducer being at 45°.

Moreover, the additional transducer 87 shown in FIGS. 21D and 21E, may be added to any other configurations of sensors disclosed herein, for detection of the reference hole 88 in the stress-free zone of the bolt head.

In some embodiments, one or more ultrasound transducers may have a function instead of or in addition to the function of being used to excite and detect ultrasonic waves. For example, one of the ultrasound transducers may be configured to also or only be used in a passive way as a vibration sensor. In such an embodiment, if a seismic or blasting event is detected by this ultrasound transducer, the electronic system may automatically switch to an active mode and use all the ultrasound transducers or the other ultrasound transducers to measure and/or monitor any change in the rock bolt condition.

Figure 24E:
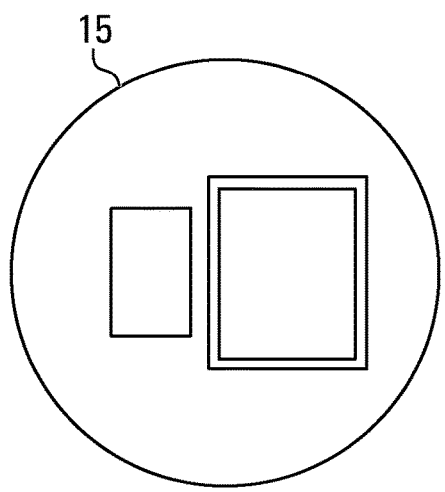
FIGS. 24E and 24F are top and side schematic views of a transducer configuration of a system according to another embodiment of the present disclosure.
Figure 24F:
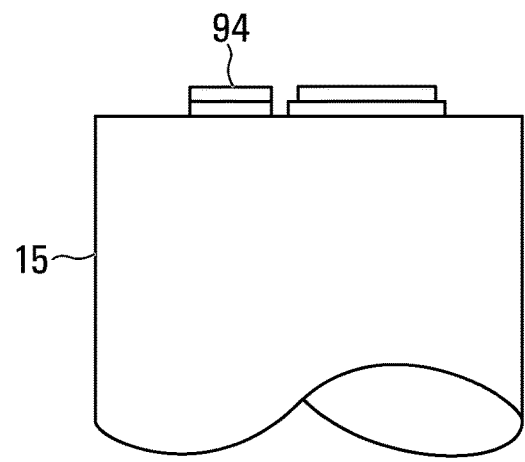

In some embodiments, it may also be possible to add a conductor layer on top of one or more of the ultrasound transducers. This may aid in creating stacks of equal height. For example, if three ultrasound transducers are used, with two of them being stacked, the height of the stacked transducers may be higher than the single ultrasound transducer. Thus, a conductor 94 may be added on top of the single ultrasound transducer to match the height of the two stacked transducers. Such a configuration is shown in FIGS. 24E and 24F. This may aid in creating an even surface for operable connectivity with, for example, the conductive rubber layer 44 of embodiments of the system described above.

It is noted that all the above-described features and embodiments of the ultrasound transducers may be applied to the one or more ultrasound transducers 10a, 10b described in respect of FIG. 18A.

Another embodiment of a system will be described with reference to the exploded views shown in FIGS. 25A to 25C. In this embodiment, nut 201 and threaded collar 203 are used to hold the sensor component 204 (for example, the first component 34 in the embodiments of FIG. 18A) against the exposed end of the rock bolt head 15 whereas the receiver component 207 (for example, the second component 36 in the embodiment of FIG. 18A) is to be attached to the sensor component 204.

Piezoelectric elements 202, such as, for example, the PZT transducers described above, are operatively connected, for example electrically conductively glued, onto the exposed end of the rock bolt head 15.

A rubber ring or washer 205 may be used to provide a seal, such as a waterproof seal.

Spring loaded electrical connectors 206a, b and c may be used to connect an induction coil (such as, for example, induction coil 38 described above) to the top and bottom electrodes of the piezoelectric elements 202.

Figure 25D:
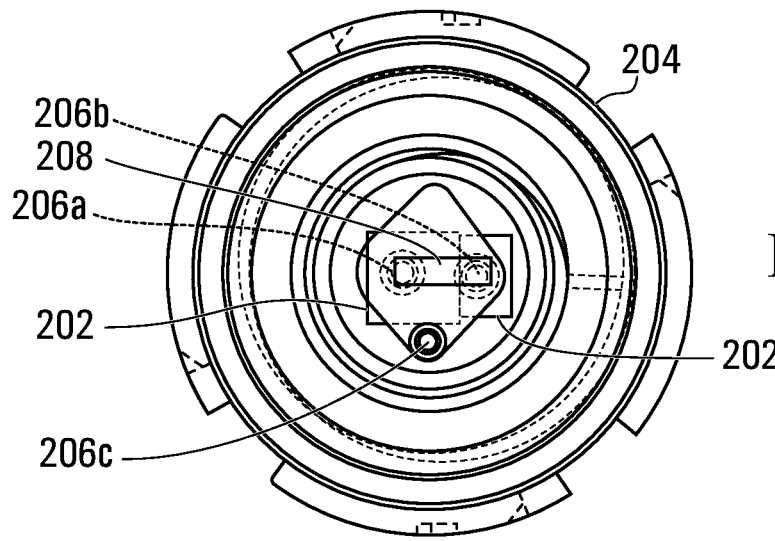
FIG. 25D is a plan view of the sensor component of the system of FIGS. 25A to 25C.

FIG. 25D is a plan view of the sensor component 204 and shows a layout of connectors 206a, b and c overlaid on the layout of the piezoelectric elements 202. The tips of the connectors 206a and 206b are in electrical contact with the top electrodes of the piezoelectric elements 202, and their other ends are connected electrically with a conductive material 208. They are then electrically connected to a lead wire of the induction coil, such as the induction coil 38 described above. The tip of the connector 206c is in electrical contact with exposed end of the rock bolt head 15 while the other end of the connector is electrically connected to the other lead wire of the induction coil. An excitation/detection induction coil (such as the coil 40 described above) is affixed to the internal bottom of the receiver component 207.

Figure 25E:
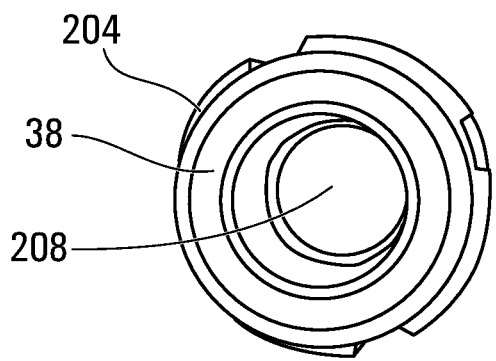
FIGS. 25E to 25G are views of example embodiments of the sensor and receiver components of the system of FIGS. 25A to 25C.
Figure 25F:
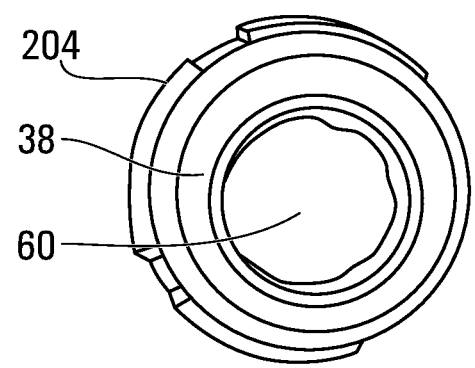
Figure 25G:
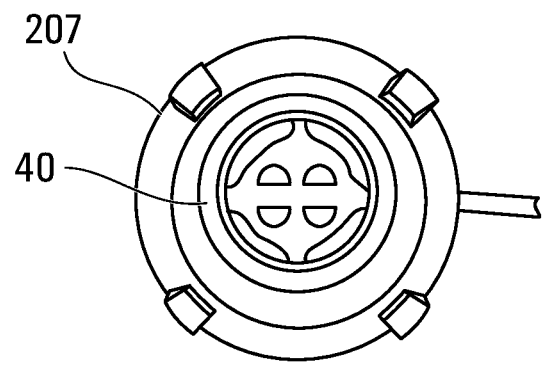

Example embodiments of components 204 and 207 are shown in FIGS. 25E to 25G. In the embodiment of FIG. 25F, RFID tag 60 is present. All plastic parts may be 3D-printed, cold molded, or injection molded.

In some embodiments, the piezoelectric elements 202 may be protected during installation of the rock bolt using a metallic cap (not shown) threaded on the rock bolt end. After installation of the rock bolt, this protective cap may be removed. Then the nut 201 would be slid, screwed or otherwise connected to the rock bolt head 15. Threaded collar 203 would then be treaded onto the rock bolt head 15 until it is fully stopped by the exposed end of rock bolt head 15. The sensor component 204 would be positioned on top of the threaded collar 203 while ensuring that the electrical connectors 206a, 206b and 206c are oriented as desired, for example as shown in FIG. 25D with respect to the position of the piezoelectric elements 202. Next, the nut 201 would be screwed onto the thread of the component 204 to secure the component 204 on the rock bolt head 15. Finally, the component 207 would be attached to the component 204.

FIGS. 25H and 25I show this embodiment in a fully assembled state on the rock bolt head 15.

FIG. 26A shows an assembly 130 that may be integrated in the first component 34 or in the second component 36 for measurement of temperature near the rock bolt head 15 using ultrasound.

The assembly 130 may be composed of a bloc 131 made of a material with relatively high thermal conductivity, such as, for example, aluminum, which is preferably non-magnetic, with parallel first and second surfaces 132 and 133, an ultrasound transducer 134 (e.g. a PZT disc) attached (e.g. glued) to the first surface 132, and an induction coil 135. The two lead wires 136 and 137 of the induction coil 135 are electrically connected to the top and bottom electrodes of the transducer 134, respectively.

In embodiments where the assembly 130 would be integrated into the first component 34, the induction coil 135 may be replaced with the induction coil 38. When excited by the induction coil 40, the transducer 134 generates ultrasonic waves that propagate through the thickness of the bloc 131 and reverberate between the surfaces 132 and 133. The TOF of a reflected echo or the difference between TOFs of selected echoes is a function of the temperature of the bloc and therefore may be used for measuring the temperature of the bloc based on pre-established calibration data for the bloc material. The measured bloc temperature is then used as an estimate of the rock bolt head temperature for calculation of temperature-corrected relative change of TOF using one of the equations discussed above.

Figure 26B:
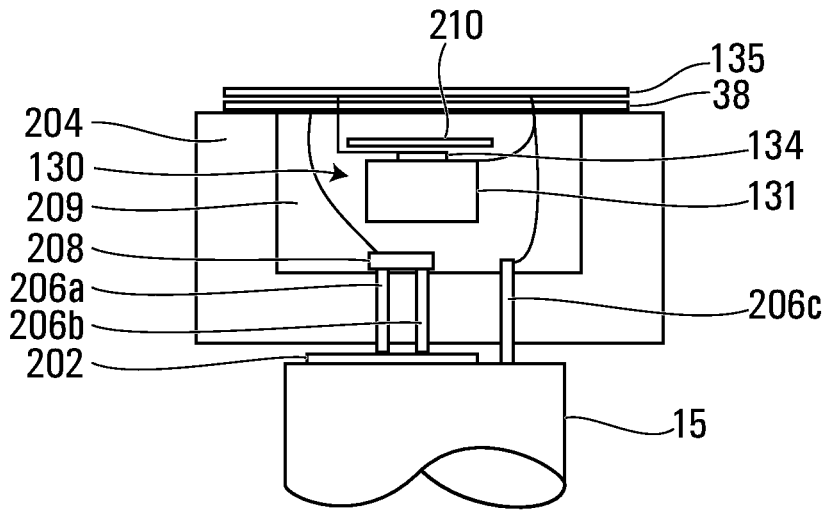
FIG. 26B is a schematic side view of a component with an embedded temperature measurement assembly according to embodiments of the present disclosure.
Figure 26C:
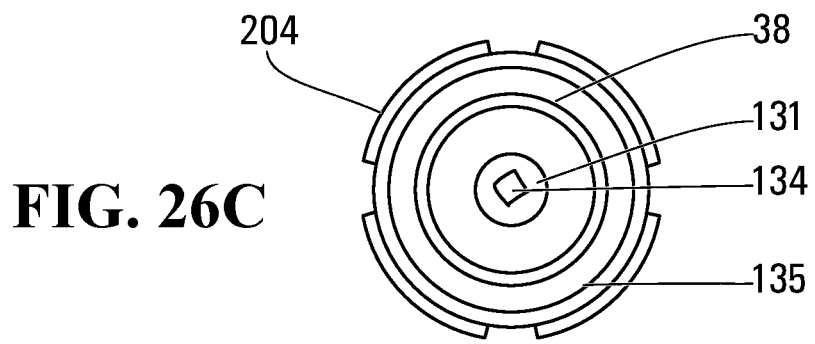
FIG. 26C is a view of a component with an embedded temperature measurement assembly according to embodiments of the present disclosure.

An embodiment of the temperature measurement assembly is illustrated in FIGS. 26B and 26C. FIG. 26B is a schematic view showing the assembly embedded in a sensor component 204 and includes schematic representations of other assembly components discussed above, such as piezoelectric elements 202 and electrical connectors 206a, b and c. A resin 209 is used to secure the assembly 130 while providing waterproofing to all components embedded in the resin. FIG. 26C shows a finished sensor component 204.

As shown, in some embodiments, a piece of ferrite sheet 210 may be placed between the metallic bloc 131 and the induction coils 38 and 135 to reduce loss of inductively induced electromagnetic energy to the conductive metallic bloc 131.

Figure 26D:
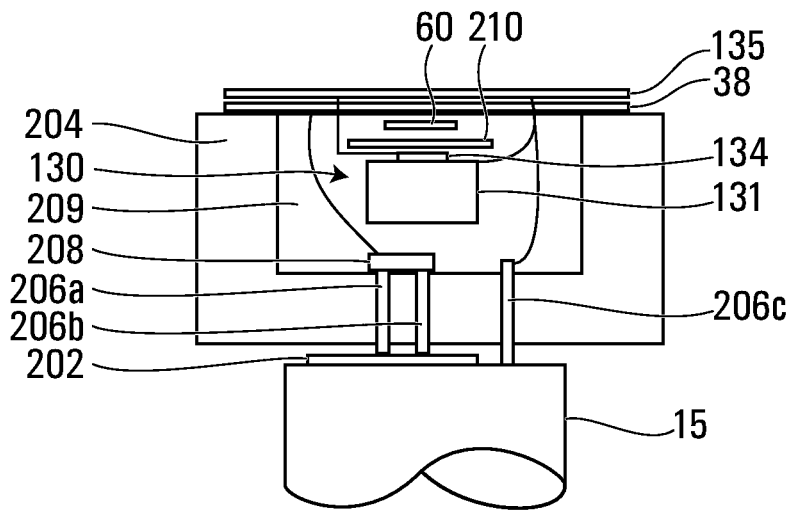
FIG. 26D is a schematic side view of the component of FIG. 26C, including an RFID tag.

Referring to FIG. 26D, in embodiments where an RFID tag 60 is used in conjunction with a metallic bloc 131, a small piece of ferrite sheet 210 may be placed between the RFID tag 60 and the bloc 131 to reduce loss of inductively induced electromagnetic energy to the conductive metallic bloc 131.

Figure 26E:
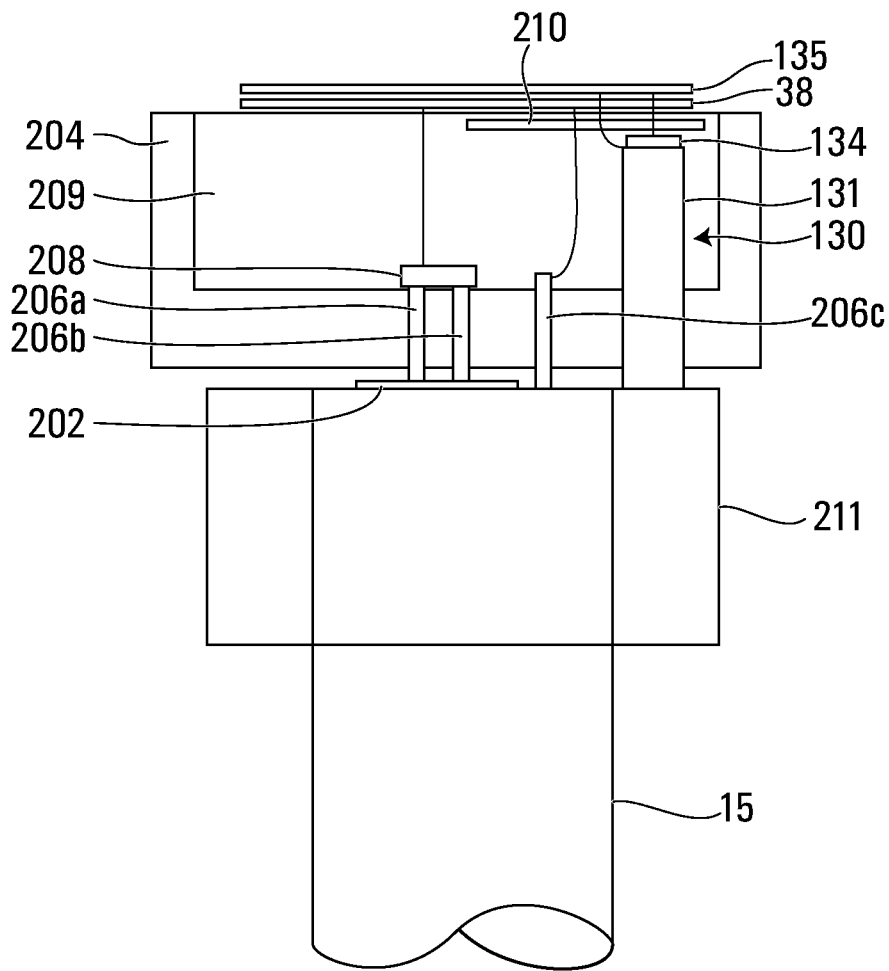
FIG. 26E is a schematic side view of a component of with an embedded temperature measurement assembly according to embodiments of the present disclosure.

In order to improve the accuracy of the measurement and make the bloc temperature a closer approximation of the rock bolt head temperature, it may be desirable to improve thermal contact between the bolc 131 and the rock bolt head 15. In this regard, an embodiment is illustrated in FIG. 26E where the thermal contact between the bloc 131 and the rock bolt head 15 is achieved by connecting a thermally conductive adaptor 211 onto the rock bolt head 15, while maintaining substantial thermal contact between the bloc 131 and the adaptor 211. A thermal paste may be applied between the contacting components to enhance thermal conduction. In some embodiments, part of the bloc 131 may be exposed to ambient air or in direct thermal contact with an exposed area of the rock bolt head 15.

As discussed above, a piece of ferrite sheet 210 may be placed between the metallic bloc 131 and the induction coils 38 and 135 to reduce loss of inductively induced electromagnetic energy to the conductive metallic bloc 131.

Figure 27A:
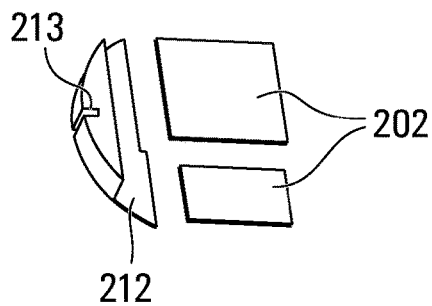
FIG. 27A is a view of an installation guide of piezoelectric elements.
Figure 27B:
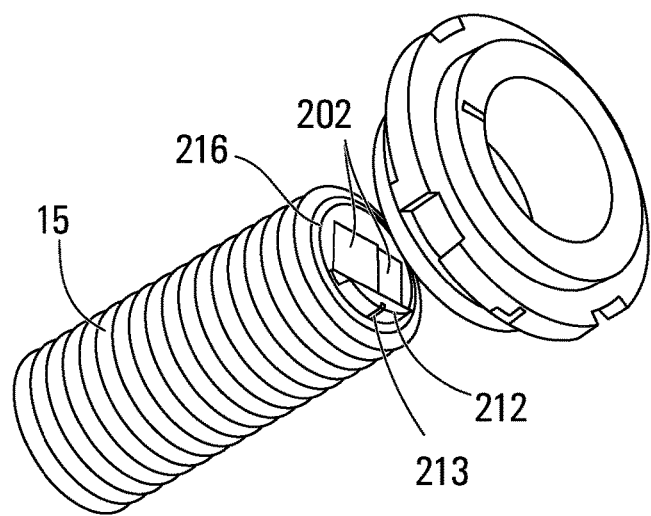
FIG. 27B is an exploded view of the installation guide of FIG. 27A and piezoelectric elements glued onto the exposed end of a rock bolt.
Figure 27C:
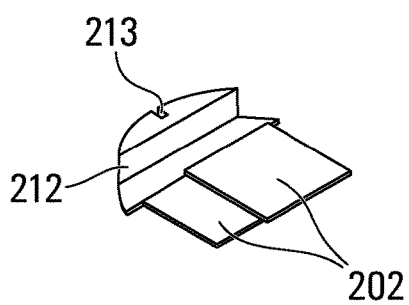
FIG. 27C is a view of the installation guide of FIG. 27A and its position relative to piezoelectric elements once installed.
Figure 27D:
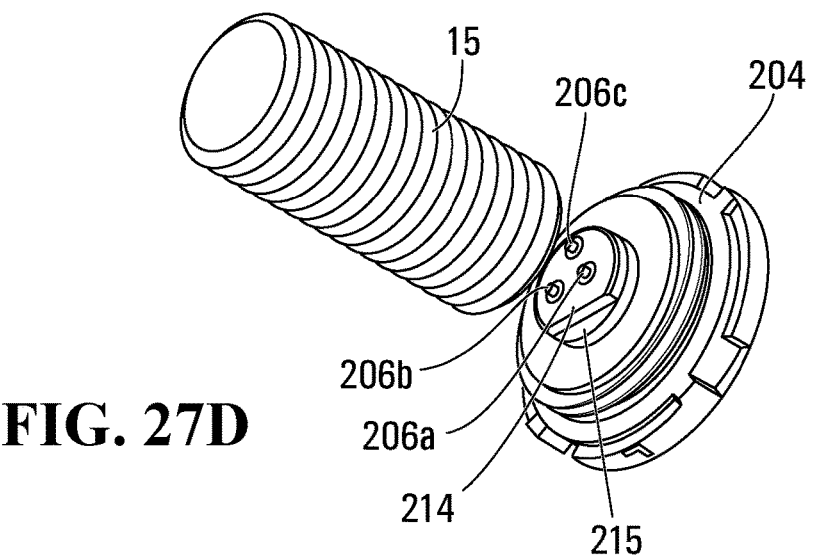
FIG. 27D is a view of a recessed area of a sensor component that mates with the installation guide of FIG. 27A.
Figure 27E:
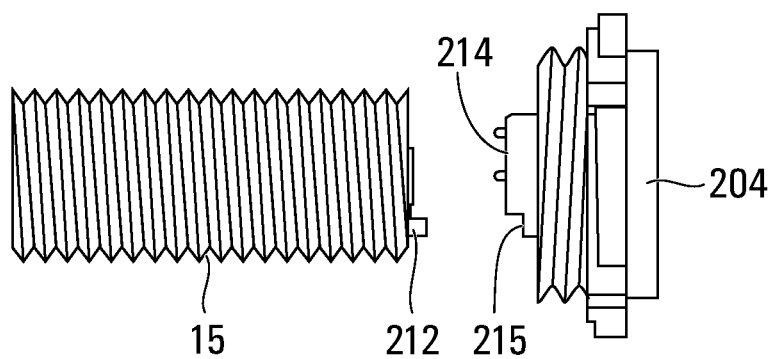
FIG. 27E is a side view of the installation guide of FIG. 27A and its position relative to sensor component of FIG. 27D to be installed.

As discussed earlier, positions of piezoelectric elements can affect significantly the quality of ultrasound signals. Refer to FIG. 27A. To ensure proper installation of ultrasound transducers, a small alignment guide 212 may be used. In practice, a circle 214 is drawn on the exposed end of the rock bolt head 15 as illustrated in FIG. 27B. Then the guide 212 is glued onto the end of the rock bolt head 15 in such a way that the circular edge of the guide is aligned with the circle 216 while the notch 213 of the guide is aligned with a reference, for example, the ridge line 90 of a rebar bolt shown in FIG. 22, or a reference hole found in the middle of the paddle of a D-bolt shown in FIG. 11E. Then piezoelectric elements 202 are glued onto the end of the rock bolt head against the guide 212 (FIGS. 27B and 27C). The bottom 214 of the component 204 has a recessed area 215 (FIG. 27D) to mate with the guide 212 when assembled (FIG. 27E). Therefore the guide 212 also serves to help position the component 204 in such a way that the spring loaded connectors 206a, 206b and 206c have proper alignment with the piezoelectric elements 202 and an exposed area of the front surface 42 of the rock bolt head 15. The guide 212 may be made of a plastic material and may be 3D-printed, cold molded, or injection molded.

Figure 28A:
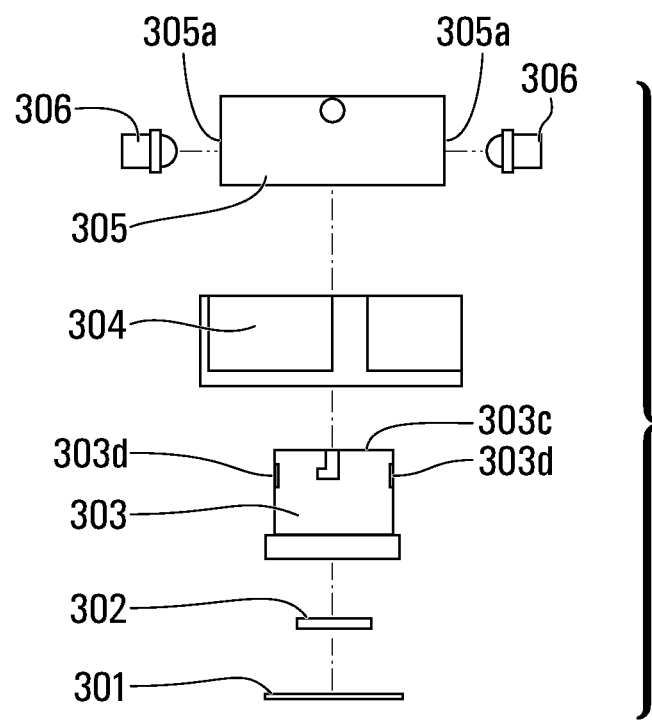
FIGS. 28A to 28C are exploded views of a system according to another embodiment of the present disclosure.
Figure 28B:
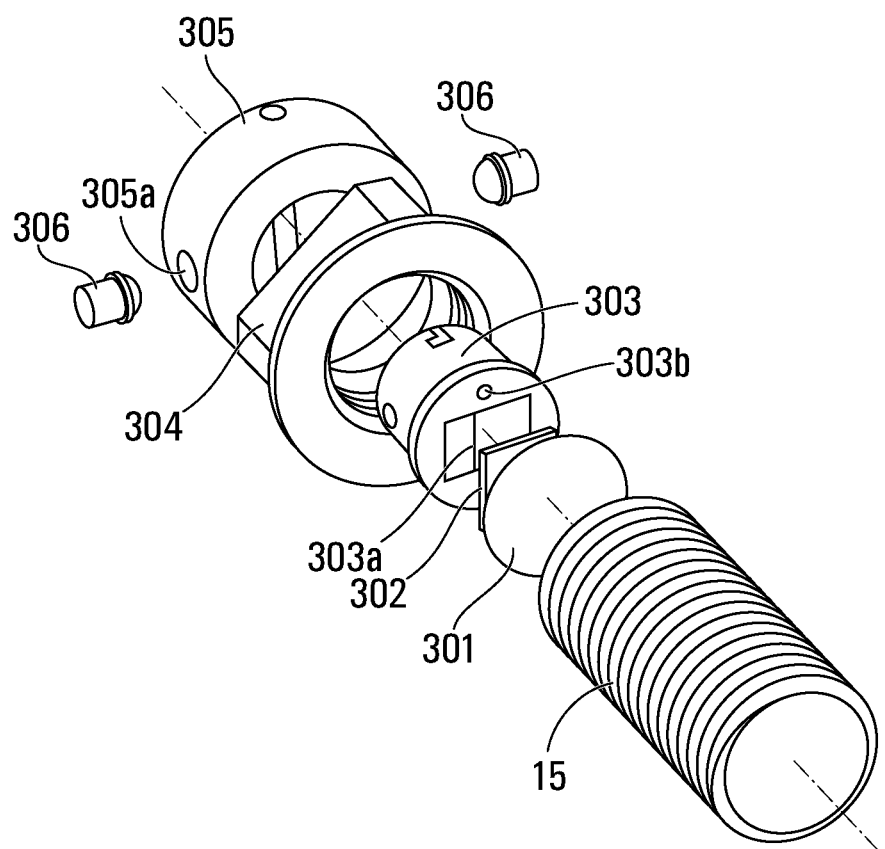
Figure 28C:
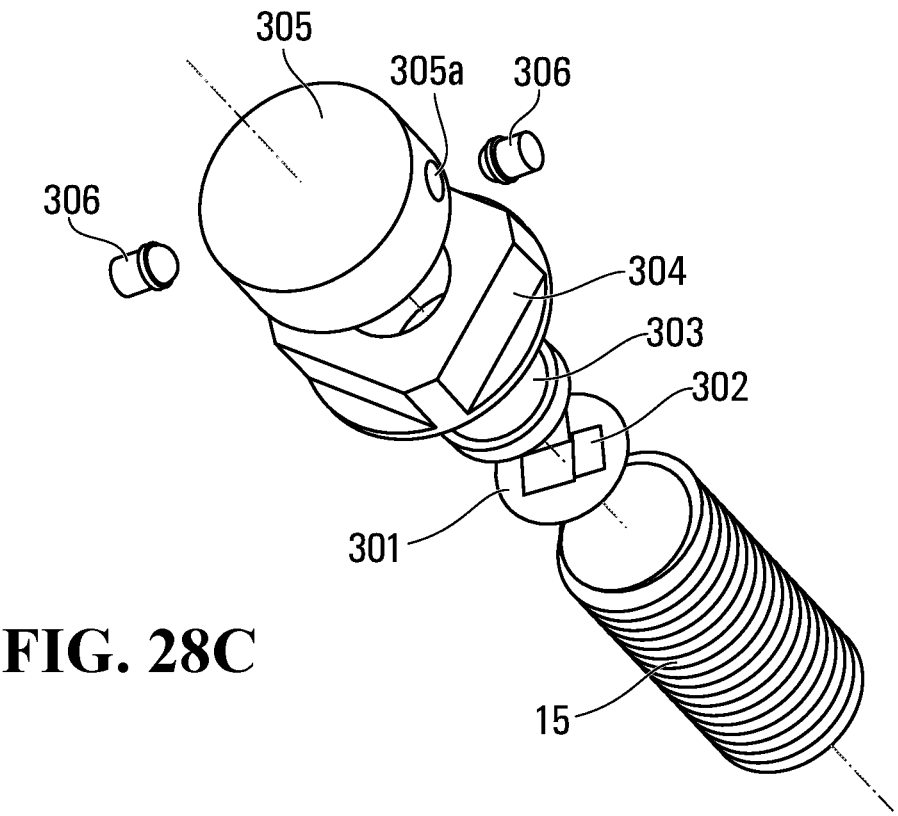

Another embodiment of a system will be described with reference to the exploded views shown in FIGS. 28A to 28C. The system is composed of a metallic foil 301, piezoelectric elements 302, a base 303, a nut 304, a cap 305, two bearing plungers 306 and induction coils (not shown). In this embodiment, the base 303 and the cap 305 are not electrically conductive and may be 3D-printed or molded using a non-conductive plastic material. The nut 304 may be either metallic or plastic or of other suitable materials that allow the nut to be formed or machined. An induction coil, such as, for example the induction coil 38 described above may be glued onto the face 303c of the base 303 with two lead wires passing respectively through two, spaced-apart holes. Hole 303b is shown, while the other hole is not shown and passes through the centre of the bases 303. The piezoelectric elements 302 may be glued on the metallic foil 301 which, for example, may be a 50-micron thick stainless steel foil. The top electrodes of the piezoelectric elements 302 may then be electrically connected to the lead wire that passes through the hole (not shown) near the center of the base 303 (not shown) whereas the metallic foil 301 may be electrically connected to the lead wire that passes through the hole 303b.

The connected foil 301 and piezoelectric elements 302 are then to be glued onto the bottom face 303a of the base 303. The bottom face 303a has a recessed pattern to accommodate the shapes and the thicknesses of the piezoelectric elements 302 in such a way that once the connected foil 301 and piezoelectric elements 302 are glued onto the bottom face 303a, the metallic foil 301 remains plat on the face 303a.

An RFID tag (not shown), such as RFID tag 60 described above, may be embedded in the base 303 using a resin.

Figure 28D:
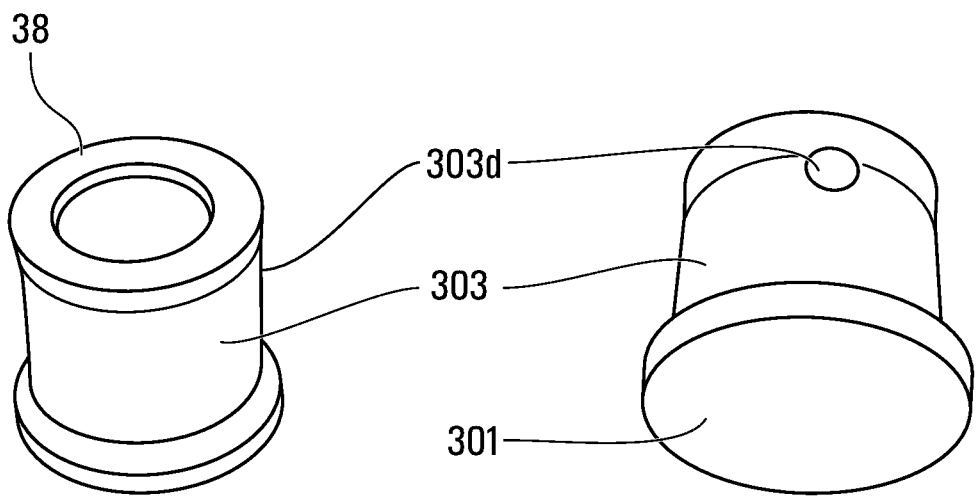
FIG. 28D is a view of an assembled base of the system of FIGS. 28A to 28C.

FIG. 28D shows an assembled, finished base 303. An induction coil 38 is glued onto the bottom face 303c of the base 303.

FIG. 28E shows a finished cap 305. An induction coil 40 is affixed to the internal bottom of the cap 305. The metallic foil 301 of the finished base 303 may be glued onto the exposed end of the rock bolt head 15 after the rock bolt has been installed. Then the nut 304 would be slid over the base 303 and then screwed onto the rock bolt head 15 to secure the base 303 on the rock bolt head 15. The finished cap 305 would be affixed to the finished base 303 by seating two bearing plungers 306 into two shallow hemispherical holes 303d on the base 303.

In some embodiments, the systems and methods described and disclosed herein may be implemented as part of a rock bolt inspection system for inspecting rock bolts anchored in the walls and ceilings of a reinforced cavity. In particular, embodiments where the system comprises separable first and second components 34 and 36 may allow a user to inspect rock bolts installed in high walls or ceiling beyond arm's reach.

Figure 29:
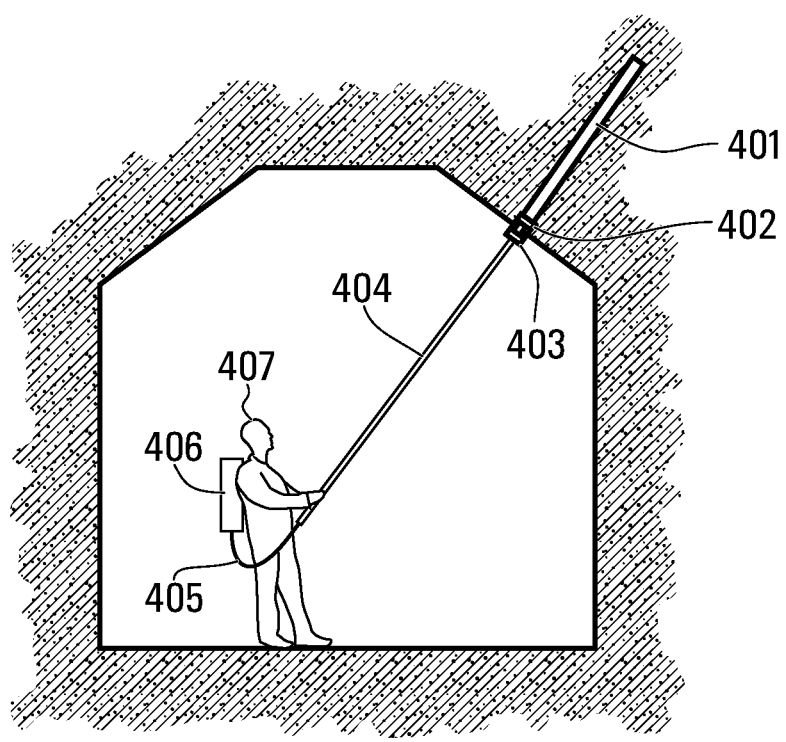
FIG. 29 is a schematic depiction of a rock bolt inspection system according to embodiments of the present disclosure.

Referring to FIG. 29, in some embodiments, such an inspection system may include an instrumented extendable pole 404. A rock bolt 401 would be equipped with, at its exposed end, a passive ultrasonic sensor assembly 402 (such as the first component 34) in which is integrated an induction coil (such as the induction coil 38) and, in some embodiments, an RFID tag (such as the RFID tag 60). The user 407 may use the extendable pole 404, of which the tip is equipped with a reader component 403 (such as the second component 36), including an induction coil (such as the induction coil 40), to approach the sensor assembly 402 and inspect the bolt 401. The induction coil in reader 403 would be wired with a coaxial cable 405 to a portable, battery-powered electronic readout unit 406. In some embodiments, the extendable pole 404 may be composed of a few shorter tubes in a telescopic arrangement, in which case the cable 405 could be passed through the bore holes of these tubes. The cable 405 may also be tied to the outside of the pole 404.

What has been described is merely illustrative of the application of principles of embodiments of the present disclosure. Other arrangements and methods can be implemented by those skilled in the art.

It will be understood that, unless specified otherwise, references to a rock bolt in the description and claims may refer to either an entire rock bolt or a section of a rock bolt; and accordingly, the time of flight, unless specified otherwise, may be associated with either an entire rock bolt or a section of a rock bolt.

Moreover, even where not explicitly stated, features of one embodiment described herein may be combined with features of another embodiment. All such combinations are intended to be included in the present disclosure.

In addition, although described primarily in the context of methods and systems, other implementations are also contemplated. For example, implementations are contemplated where instructions are stored on a non-transitory computer-readable or processor-readable medium, which, when executed, cause the computer or processor to perform the methods, operate a system or perform any other steps, operations, or calculations according to embodiments described herein.

We claim:

1. A method for determining a change in condition of a section of a shank of an installed rock bolt, the section of the shank being less than an entirety of the rock bolt, wherein determining the change in condition of the section of the shank comprises determining a change in axial stress that the section of the shank is experiencing, the method comprising,
  at a first point in time, propagating shear and longitudinal ultrasonic waves along the shank of the rock bolt to measure a first time of flight for each of the shear and longitudinal waves, and determining an average temperature of the section of the shank at the first point in time;
  at a second point in time after the first point in time, propagating shear and longitudinal ultrasonic waves along the shank of the rock bolt to measure a second time of flight for each of the shear and longitudinal waves, and determining an average temperature of the section of the shank at the second point in time;
  using the relative changes of the first and second time of flights, determining the change in condition of the section of the shank;

wherein the shank of the rock bolt is experiencing either non-uniform loading, non-uniform temperature, or both non-uniform loading and non-uniform temperature; and wherein a change in axial stress of the section of the shank is determined according to $$\langle \sigma \rangle - \langle \sigma_0 \rangle = \frac{\beta_\sigma^e \left( \Delta_{Tc}^{rel} \tau_L - \Delta_{Tc}^{rel} \tau_S \right)}{\beta_\sigma^e - 1} \Big/ C_{\sigma L}^e,$$

where $(\sigma)-(\sigma_0)$ is the difference in axial stress between the first and second points in time, $\Delta_{Tc}^{rel}\tau_S$ is the temperature-corrected relative change in the first and second time of flights of the shear ultrasonic waves, $\Delta_{Tc}^{rel}\tau_L$ is the temperature-corrected relative change in the first and second time of flights of the longitudinal ultrasonic waves, $\beta_\sigma^e$ is a ratio of a stress coefficient for the longitudinal ultrasonic waves to a stress coefficient for the shear ultrasonic waves, and $C_{\sigma L}^e$ is the stress coefficient for the longitudinal ultrasonic waves.

2. The method of claim 1, wherein determining the change in condition of the section of the shank further comprises determining elongation of the section of the shank.

3. The method of claim 2, wherein the elongation of the section of the shank is the addition of plastic elongation and elastic elongation.

4. The method of claim 3, wherein the plastic elongation of the section of the shank is determined according to $$\frac{\Delta^p l}{l_0} = \frac{\beta_\sigma^e \times \Delta_{Tc}^{rel}\tau_S - \Delta_{Tc}^{rel}\tau_L}{\beta_\sigma^e - 1},$$

where $\Delta^p l$ is the plastic elongation of the section of the shank at the second point in time with reference to the state of the section of the shank at the first point in time, $l_0$ is the length of the section of the shank at the first point in time, $\Delta_{Tc}^{rel}\tau_S$ is the temperature-corrected relative change in the first and second time of flights of the shear ultrasonic waves, $\Delta_{Tc}^{rel}\tau_L$ is the temperature-corrected relative change in the first and second time of flights of the longitudinal ultrasonic waves, and $\beta_\sigma^e$ is a ratio of a stress coefficient for the longitudinal ultrasonic waves to a stress coefficient for the shear ultrasonic waves.

5. The method of claim 3, wherein the elastic elongation of the section of the shank is determined according to $$\frac{\Delta^e l}{l_0} = \frac{1}{E} \frac{\beta_\sigma^e \left( \Delta_{Tc}^{rel}\tau_L = \Delta_{Tc}^{rel}\tau_S \right)}{\beta_\sigma^e - 1} \Big/ C_{\sigma L}^e,$$

where $\Delta^e l$ is the elastic elongation of the section of the shank at the second point in time with reference to the state of the section of the shank at the first point in time, $l_0$ is the length of the section of the shank at the first point in time, E is Young's modulus, $\Delta_{Tc}^{rel}\tau_S$ is the temperature-corrected relative change in the first and second time of flights of the shear ultrasonic waves, $\Delta_{Tc}^{rel}\tau_L$ Are TL is the temperature-corrected relative change in the first and second time of flights of the longitudinal ultrasonic waves, $\beta_\sigma^e$ is a ratio of a stress coefficient for the longitudinal ultrasonic waves to a stress coefficient for the shear ultrasonic waves, and $C_{\sigma L}^e$, is the stress coefficient for the longitudinal ultrasonic waves.

6. The method according to claim 1, wherein the temperature-corrected relative changes of the first and second time of flights are determined according to:

$$\Delta_{Tc}^{rel}\tau_L = \frac{\tau_L - \tau_{L0}}{\tau_{L0}} - C_{TL} * [\langle T \rangle - \langle T_0 \rangle],$$

$$\Delta_{Tc}^{rel}\tau_S = \frac{\tau_S - \tau_{S0}}{\tau_{S0}} - C_{TS} * [\langle T \rangle - \langle T_0 \rangle],$$

where $\Delta_{Tc}^{rel}\tau_S$ is the temperature-corrected relative change in the first and second time of flights of the shear ultrasonic waves, $\Delta_{Tc}^{rel}\tau_L$ is the temperature-corrected relative change in the first and second time of flights of the longitudinal ultrasonic waves, $\tau_{S0}$ and $\tau_{L0}$ are the first time of flights for the shear and longitudinal ultrasonic waves, respectively, $\tau_S$ and $\tau_L$ are the second time of flights for the shear and longitudinal ultrasonic waves, respectively, $C_{TS}$ and $C_{TL}$ are the temperature coefficients for the shear and longitudinal ultrasonic waves, respectively, and $(T)-(T_0)$ is the average temperature change over the section of the shank between the first point in time and the second point in time.

* * * * *